United States Patent
Tuchman et al.

(10) Patent No.: US 9,036,807 B1
(45) Date of Patent: May 19, 2015

(54) METHOD AND SYSTEM FOR ROUTING MESSAGES AND CONNECTING USERS ASSOCIATED WITH LIVE-CONNECTED CONTENT

(71) Applicants: Kenneth D. Tuchman, Englewood, CO (US); R. Giles Whiting, Charleston, SC (US); Bruce A. Sharpe, Aurora, CO (US); Henry D. Truong, Chelmsford, MA (US)

(72) Inventors: Kenneth D. Tuchman, Englewood, CO (US); R. Giles Whiting, Charleston, SC (US); Bruce A. Sharpe, Aurora, CO (US); Henry D. Truong, Chelmsford, MA (US)

(73) Assignee: TeleTech Holdings, Inc., Englewood, CO (US)

( * ) Notice: Subject to any disclaimer, the term of this patent is extended or adjusted under 35 U.S.C. 154(b) by 0 days.

(21) Appl. No.: 14/521,783

(22) Filed: Oct. 23, 2014

Related U.S. Application Data

(60) Provisional application No. 61/895,963, filed on Oct. 25, 2013, provisional application No. 62/014,434, filed on Jun. 19, 2014.

(51) Int. Cl.
| | |
|---|---|
| H04M 3/00 | (2006.01) |
| H04M 5/00 | (2006.01) |
| H04M 1/64 | (2006.01) |
| H04M 11/00 | (2006.01) |
| H04M 3/523 | (2006.01) |
| H04W 4/02 | (2009.01) |
| H04M 3/487 | (2006.01) |
| H04M 3/51 | (2006.01) |

(52) U.S. Cl.
CPC ............ H04M 3/5233 (2013.01); H04W 4/021 (2013.01); H04M 3/4878 (2013.01); H04M 3/5133 (2013.01)

(58) Field of Classification Search
USPC ............ 379/265.09, 265.11, 265.12, 265.13, 379/265.01, 265.05, 88.12, 88.11, 88.13
See application file for complete search history.

(56) References Cited

U.S. PATENT DOCUMENTS

| | | | |
|---|---|---|---|
| 6,912,563 B1 * | 6/2005 | Parker et al. | ............ 709/204 |
| 7,730,135 B2 * | 6/2010 | Petrovykh | ............ 709/205 |

* cited by examiner

*Primary Examiner* — Thjuan K Addy
(74) *Attorney, Agent, or Firm* — Blakely, Sokoloff, Taylor & Zafman LLP

(57) ABSTRACT

According to one embodiment, a first request of a first user is received for communicating with an agent concerning a content item of a media presentation presented to the first user. In response, agents associated with the content identifier are identified. Status of the identified agents is determined. Agent identifiers are transmitted to the second server, the agent identifiers identifying one or more available agents, including a geographic location of the agents. A second request is received from a first user device of the first user, including an agent identifier identifying a first agent selected by the first user from the list and contact information of the first user. In response, a first message is transmitted to a first agent device of the first agent, the first message including the content identifier identifying the content item and the contact information of the first user.

27 Claims, 35 Drawing Sheets

| Live Content ID | Owner/Group ID | SME IDs | Dispatcher/ Overflow SME IDs | Terminology | Rules | Comm. Channels |
|---|---|---|---|---|---|---|
| ⋮ 253 | ⋮ 254 | ⋮ 255 | ⋮ 256 | ⋮ 257 | ⋮ 258 | ⋮ 259 |

| SME IDs | Live Content ID(s) | Geographic Location | State | Status | Contact Info | Skill Set | Others (e.g., preferences) |
|---|---|---|---|---|---|---|---|
| ⋮ 261 | ⋮ 262 | ⋮ 263 | ⋮ 264 | ⋮ 265 | ⋮ 266 | ⋮ 267 | ⋮ 268 |

```
{
  "id": "2343A",
  "available": "true",
  "vehicles": [
    {
      "id": "1234",
      "available": "true",
      "lat": "-38.908124",
      "lon": "56.12345"
    },
    {
      "id": "1235",
      "available": "true",
      "lat": "-38.908124",
      "lon": "56.12345"
    },
    {
      "id": "1236",
      "available": "false",
      "lat": "-38.908124",
      "lon": "56.12345"
    }
  ],
  "smsLink": "https://www.liveconnect.com/message/companyA",
  "telephoneLink": "https://www.liveconnect.com/call/companyA",
  "mapImageLink": "https://www.liveconnect.com/map?lat=-38.9123&lon=41.7563"
}
```

```
                                                                    500
┌──────────────────────────────────────────────────────────────────────┐
│ Receive at a first server from a second server over a network a first│
│ request of a first user (e.g., visitor) for communicating with another│
│ user (e.g., an agent) concerning a content item of a presentation    │
│ (e.g., Ads) presented at the second server.                          │
│                                                                  501 │
└──────────────────────────────────────────────────────────────────────┘
                                    │
                                    ▼
┌──────────────────────────────────────────────────────────────────────┐
│ In response to the first request, identify from a client database one│
│ or more agents (e.g., specialists or SMEs) that are associated with  │
│ the content item.                                                    │
│                                                                  502 │
└──────────────────────────────────────────────────────────────────────┘
                                    │
                                    ▼
┌──────────────────────────────────────────────────────────────────────┐
│ Determine a status of each of the identified agents from an agent    │
│ database, including determining whether each of the identified users │
│ is available to communicate with the first user to discuss the content│
│ item at a point in time.                                             │
│                                                                  503 │
└──────────────────────────────────────────────────────────────────────┘
                                    │
                                    ▼
┌──────────────────────────────────────────────────────────────────────┐
│ Transmit a list of available agents, including their geographic      │
│ locations, to the second server indicating whether there is a user   │
│ available for the content item.                                      │
│                                                                  504 │
└──────────────────────────────────────────────────────────────────────┘
                                    │
                                    ▼
┌──────────────────────────────────────────────────────────────────────┐
│ Receive a second request from the first user, the second request     │
│ including an agent identifier identifying an agent selected by the user.│
│                                                                  505 │
└──────────────────────────────────────────────────────────────────────┘
                                    │
                                    ▼
┌──────────────────────────────────────────────────────────────────────┐
│ In response to the second request, transmit a first message to an    │
│ agent device of the selected agent, the first message including the  │
│ content identifier identifying the content item and the contact      │
│ information of the first user to enable the first and second users to│
│ communicate with each other.                                         │
│                                                                  506 │
└──────────────────────────────────────────────────────────────────────┘
```

FIG. 13

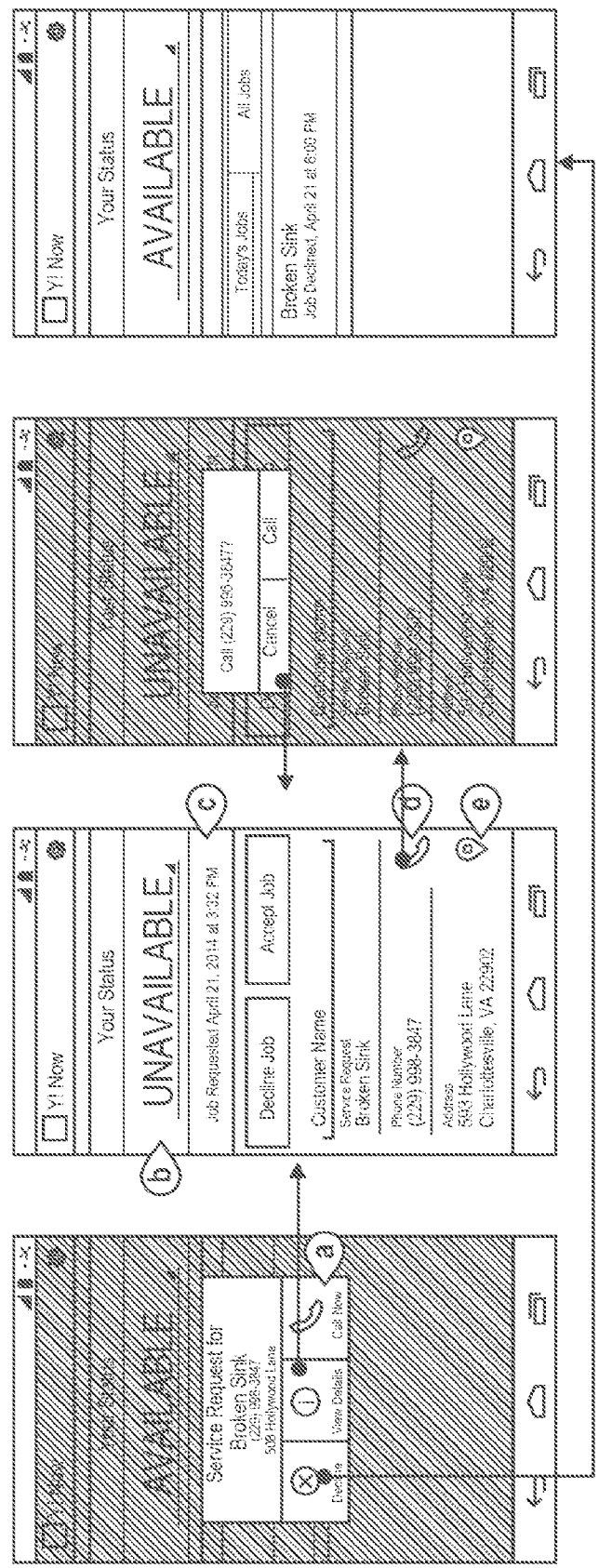

Business Settings

Set Up Custom Availability Status

Customize Y! Now to suit your business. Select how you'd like your services to be worded in the Y! Now system.

[ Create New Status ]

| Status Name | Available Status | Description | |
|---|---|---|---|
| On Break | Unavailable | Used while on-call or on-duty and taking a short break | Edit |
| Off for the Day | Unavailable | Used when clocking out for the day | Edit |

Group Settings
Terminology
Custom Status
Job States
Administrators

METHOD AND SYSTEM FOR ROUTING MESSAGES AND CONNECTING USERS ASSOCIATED WITH LIVE-CONNECTED CONTENT

RELATED APPLICATIONS

This application claims the benefit of U.S. Provisional Patent Application No. 61/895,963, filed Oct. 25, 2013 and U.S. Provisional Patent Application No. 62/014,434, filed Jun. 19, 2014. The disclosure of the above provisional applications is incorporated by reference herein in its entirety.

FIELD OF THE INVENTION

Embodiments of the present invention relate generally to content distribution. More particularly, embodiments of the invention relate to routing messages of the live connected content.

BACKGROUND

In online advertising, internet users are presented with advertisements as they browse the internet using a web browser. Online advertising is an efficient way for advertisers to convey advertising information to potential purchasers of goods and services. It is also an efficient tool for organizations such as non-profits and political organizations to increase their awareness in a target group of people. Ad (advertisement) serving describes the technology and service that places advertisements on web sites. Ad serving technology companies provide software and/or services to web sites and advertisers to serve ads, count them, choose the ads that will make the website the most money or the advertiser the best return, and monitor progress of different advertising campaigns. Ad servers come in two flavors: local ad servers and third-party or remote ad servers. Local ad servers are typically run by a single publisher and serve ads to that publisher's domains, allowing fine-grained creative, formatting, and content control by that publisher. Remote ad servers can serve ads across domains owned by multiple publishers. They deliver the ads from one central source so that advertisers and publishers can track the distribution of their online advertisements, and have one location for controlling the rotation and distribution of their advertisements across the Web.

Most of the conventional Ads are static in which certain information will be displayed and in some cases includes contact information of the service provider who is advertising. However, a viewer of this ad is not able to know whether the services described in an Ad can be provided in a time relevant way (i.e., within the hour, within the day). Today, for example, if one looks for a local orthodontist surgeon, one would type "local orthodontist surgeon" in for a search field of a browser. The search engine (e.g., Yahoo®) would come back with a list of orthodontist businesses that prescribe to this ads type. Depending upon the browser, a phone number of the business may or may not be clickable to establish the phone contact. If a user is using a Chrome™ browser, and if he/she has installed the Google Voice™ plugin of the case, then one can click the hyperlink, the Google Voice™ plugin will verify the phone number that the user would like to call, then initiate the dial for the user. The user will then be connected to the end point of that phone number—in this case it would likely be the orthodontist office receptionist assuming that person is available. If the user is using a Safari™ browser, the user will also be presented with a phone number, which the user can text to its iPhone using iMessage™. Once the user has received the text, you can dial the orthodontist office from the iPhone and conduct a conversation assuming there is someone who is able to answer the phone on the orthodontist's end. Although sometimes a map is also presented, however, the map is only related to static information such as an address associated with the Ad. It does not provide anything regarding the location of the service provider.

Such a limitation is sometimes unacceptable and problematic to some Ad visitors and/or providers. A visitor would not know whether there is actually a person or support person available and nearby. Similarly, an Ad will run regardless whether there is actually a person or support person available. The lack of a live, time-relevant, connection with an Ad provider may discourage a visitor from interacting with an Ad to inquire further information.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating a data structure to be used with one embodiment of the invention.

FIG. 6 is a block diagram illustrating a data structure to be used with another embodiment of the invention.

FIG. 9 is a block diagram illustrating an example of a data structure according to another embodiment of the invention.

FIGS. 13-14 are flow diagrams illustrating a method for providing live connect services according to certain embodiments of the invention.

FIGS. 16A-16J are screenshots illustrating an example of graphical user interfaces of a mobile application utilized by a specialist according to some embodiments of the invention.

FIGS. 19A-19H are screenshots illustrating an example of a management user interface for managing a business and its users according to one embodiment of the invention.

DETAILED DESCRIPTION

Figure 1:
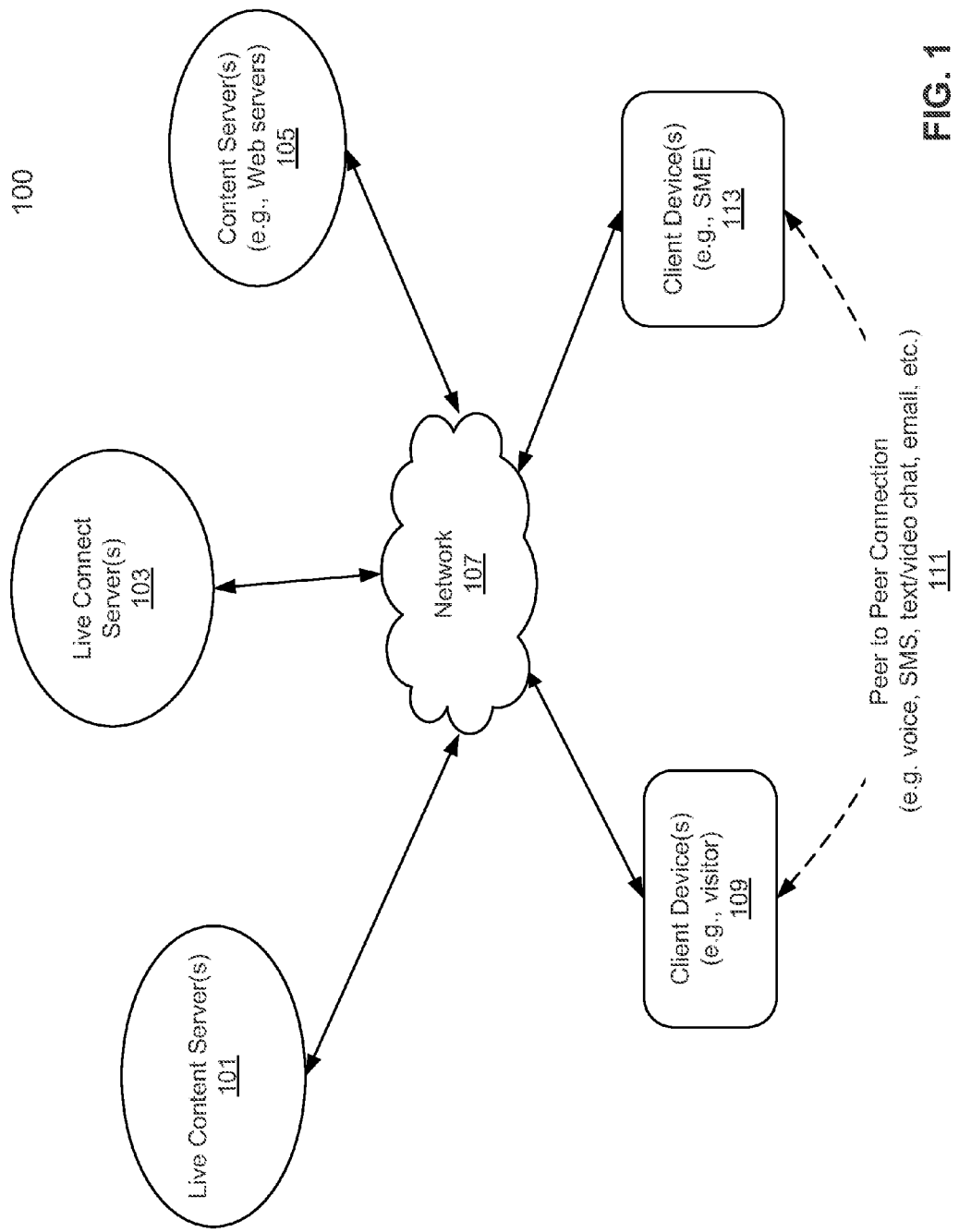
FIG. 1 is a block diagram illustrating a network system providing live connect services according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a live connect system is utilized to coordinate with content providers and content distribution systems to provide and distribute live content (also simply referred to as live connect content) to end users as visitors. With the live connect system, an end user (e.g., visitor) who accesses live content can establish a live communication session with another user (e.g., support agent, specialist) that is associated with the live content at the point in time, for example, for the purpose of discussing further detailed information concerning the content presented. The live content presented to the visitor includes information indicating that there is a support agent who is available at the point in time to have a live conversation with the visitor. The live content also includes information indicating a geographic location of that support agent with respect to the geographic location of the visitor (e.g., within a predetermined geographic proximity). As a result, the end user does not have to go through tedious manual operations in order to reach out someone who is nearby and familiar with the content in question or someone who he or she can talk to immediately concerning the content at the point in time.

According to one embodiment, when a user accesses content presented by a content server (e.g., Web server such as a Yahoo® or Google® Web server, also referred to as a content presentation server), the content server may communicate with a live content (also referred to as live sponsored content) server (e.g., Ad network) to request a list of live content (e.g., live connect Ads) that is associated with the information or content currently accessed by the user (e.g., search term, keyword, or search result). In response, the live content server identifies, for example, from its content database, a list of live content associated with the information the user is currently interested in (e.g., search information, user information). For each of the live content, the live content server communicates with a live connect server to determine whether there is another user or at least one specialist (also referred to as subject matter expert or SME, support agent or simply agent) currently available, who is familiar with the subject matter in question and who can communicate with the user at the point in time. For each of the inquired live content, the live connect server identifies zero or more specialists that are currently available, for example, based on the geographic locations, presence information, and status of the specialists, which may be stored and periodically updated in a user or specialist database associated with the live connect server.

The live connect server returns information indicating which of the live content that has at least one live support person or agent (e.g., specialist) available. In one embodiment, the live connect server returns identifying information of the live support persons that are associated with the live content being inquired (e.g., live Ads). For each of the associated support persons, for example, prior to presenting the live content, the live connect server further determines whether the respective support agent is currently available, and if the support agent is currently available, the respective geographic location (e.g., longitude and latitude data) with respect to the geographic location of the visitor. For each of the live content that has at least one support agent available, according to one embodiment, the live content may be presented to the user by the live content server and/or the content presentation server. In addition, each live content may be presented with a live connect button or control to enable the user to contact another user that is associated with the live content. In one embodiment, an available specialist may also be someone located within a predetermined geographic proximity with respect to a geographic location associated with the visitor. For example, an available agent can contact the visitor discussing the live content in real time or within a very short period of time, and potentially go to and arrive at a premises or property (e.g., house or building) of the visitor within a reasonable period of time, for example, to provide services related to the live content, which may also be desired or expected by the visitor.

Alternatively, according to another embodiment, each live content may be presented with identifying information of one or more support agents or specialists who can communicate with the visitor immediately or within a short period of time for discussing the corresponding live content. In one embodiment, the identifying information includes a name and/or a picture of the specialist and a geographical location of the specialist with respect to the user. One or more of the available specialists are presented to the user with a live connect button or control. The displayed live content may also indicate that the user can contact a specialist or agent associated with the live content in real time and guaranteed to reach a live person within a short period of time. The user can activate or click a live connect button or control to contact the corresponding specialist at the point in time, for example, based on the geographic location of the specialist or based on reputation of the company the specialist is associated with. If particular live content does not have at least one specialist that is currently available, that particular live content may not be presented to the user or the content is presented as static content without indicating that the user can contact an agent in real time. This ensures availability of both parties—the user who would initiate a connection and the specialist who must be available to accept/respond to communication—and is dependent upon the specific configuration or rules of the content server. Alternatively, that live content may be presented as regular static content, for example, without presenting the live connect button or control, when there is no specialist currently available. In such a situation if subsequently there is a specialist who becomes available, the live connect button or control is then presented to the user, again dependent upon the specific implementation or configuration of the content presentation server and/or content distribution server.

When the visitor activates or clicks on a live connect button of a particular live content, a connection request is transmitted to the live connect server. The request may include contact identifying information of the visitor (e.g., name, address, phone number, email, etc.) and other user information (e.g., search information, activities performed by the visitor, and/or a geographic location of the visitor). In response, the live connect server routes the visitor's information to a specialist who is associated with the live content and is also available. In one embodiment, a specialist may be selected, for example, based on its availability status and/or its geographic location, by the live connect server when the live content server requests for availability information. As a result, the identifying information of the selected specialist may have been embedded as part of executable code associated with the live connect button. Thus, when the visitor activates the live connect button, the underlying code is executed and a data message is transmitted to the live connect server, which in turn routes the information to the selected specialist. That is, a specialist has to be selected before the live content is displayed. That matters in two ways: (1) in order to display a map of specialists the specific and unique geographic information for each specialist must be ascertained; (2) chat or call information must be determined and embedded in part of the live content code. In this situation, the live connect server can automatically routes the request to the selected specialist without user intervention. The selected specialist can then respond to the connection request at the point in time. Alternatively, according to another embodiment, the visitor can initiate a contact request by activating the live connect button, as a general live connect button to connect with the live content owner, to communicate with a dispatcher or manager associated with that particular live content, which in turn selects and routes the contact request to a specialist who is available. In this situation, a dedicated person, such as an administrator, a manager, or a dispatch person has to be available to receive the request and determine to which of the available specialists the request should be routed. If a specialist becomes unavailable or is unwilling to accept the request, the request may be rerouted to the dedicated person, such as a dispatcher, manager, or a dedicated overflow specialist.

FIG. 1 is a block diagram illustrating a network system providing live connect services according to one embodiment of the invention. Referring to FIG. 1, system 100 includes, but is not limited to, one or more client devices 109, one or more service provider devices 113, live content servers 101 and content/data servers 105 communicatively coupled each other over network 107. Client devices 109 and/or service provide devices 113 may be any type of data processing devices such as a server, a personal computer (e.g., desktops, laptops, and tablets), a "thin" client, a personal digital assistant (PDA), a Web enabled appliance, a gaming device, a media player, or a mobile device (e.g., Smartphone), etc. Content/data servers 105 may include web servers, application servers, content servers or other servers providing remote services (e.g. Web search, cloud storages, gaming, social networking etc.) for users of client device 109. Network 107 may be any type of networks such as a local area network (LAN), a wide area network (WAN) such as the Internet/intranet, cellular networks, secured/open networks, wired/wireless networks or a combination thereof.

In one embodiment, live content server 101, as a content distribution server, provides live content services, such as, for example, Ad services, for content presentation servers 105 to leverage Ad opportunities via content or services offered to client devices 109. When content server 105 presents content to users, in addition to presenting regular static content (e.g., search result), content server 105 communicates with live content server 101 to inquire any live content of a specific type (e.g., content related to those the users are currently interested in). Live content server 101 in turn identifies a list of live content, which may be configured previously for participating in particular live content distribution (e.g., Ad campaign). For each of the identified live content, live content server 101 (e.g., Ad server) communicates with live connect server 103 to determine one or more specialists that have been registered with live connect server 103 and are currently available to contact the users who may be interested in the live content. In response, live connect server 103 identifies zero or more of the specialists that are available and their respective geographic locations. The information of the available specialists is then transmitted back to live content server 101 and the live content having at least one available specialist may then be presented to the users. The users can then access the live content and contact with the available specialists for further discussion about the live content Ad.

According to one embodiment, in the field of advertising, the live content may represent Ads from which a visitor can contact a specialist associated with the Ad. Live content server 101 may represent Ad infrastructure, Ad networks, Ad servers, and/or Ad exchanges for serving advertisements via content servers 105 to client devices 109. Live connect server 103 may offer live connect Ads via Ad services 101 to allow a user of client device 109 to communicate in real time (e.g. live) with a specialist of an advertiser of the live connect Ads. Live connect server 103 may include a live connect system to interface with live content server 101 and availability system to select/facilitate available specialists for establishing live communications, for example, between client devices 109 and service provider devices 113, to render an advertised or requested service to the user of devices 109 by a specialist using service provider devices 113.

The live content can be a variety of information, such as, for example, Ads sponsored by various Ad providers. The real-time live connect Ad service can provide a solution that allows a visitor (or a user) to access a live specialist (e.g. nearby a live person) via a communication link established from an advertisement presentation (e.g. live content) via a desktop device, a mobile device, a phone device or other devices. For example, a visitor may be presented with an Ad via a search on the network (e.g., Internet) from their desktop or mobile browser, for a specific support or service need. An Ad integrated into a real-time connected Ad service can be presented to the visitor. From interactions with the Ad presentation, the visitor can be connected with an available live support or service person to provide services. Live connect Ad services may be applicable for different kinds of services in various types of businesses.

In one embodiment, existing Ad services may be augmented with the live support and service capability when integrated with real-time live connect Ad service. A visitor can select a live connect Ad (or real-time live connect Ad) to automatically connect with a live person or service in real time without a need to make additional contact request. A registered specialist can be connected to the visitor when the Ad is selected (e.g. clicked) within a short time period (e.g. 5 or less minutes or other applicable specified time period) or a scheduled time period without requiring the visitor to wait for later and/or unspecified date/time by way of filling out a form or sending an email to the business advertising services. Live connect Ad service can perform analytics on data received from existing Ad services (e.g. originated from a client device used by a user or a visitor) to provide intelligent routing between the visitor and a highly skilled specialist. For example, the data may include presence and geo-location information to allow the live connect Ad service to present those specialists who can meet up with the visitor for specific services.

Live connect Ad solution (service) can make intelligent decisions to serve live connect Ads with a multitude of situational and presence based capabilities. For example, a live connect Ad of a company (or a service provider, a specialist) may be presented to a visitor at a specific day and time based on whether a live person of the company is available. A live connect Ad for a specialist may be presented (or served) when this specialist is available to talk real-time once the Ad is clicked through via the visitor (or user).

In one embodiment, the availability of a specialist for presenting a live connect Ad to a visitor may be determined based on (but not limited to) presence of the specialist, location of the specialist, geographic proximity between the visitor and the specialist, expertise of the specialist, and/or other applicable information made available. Presence of a specialist may be based on a presence indicator managed (or updated) by the specialist (e.g. when logging into a management system for the live connect Ad service management system). Location of a specialist may be based on the current geo-location of the specialist collected from an associated mobile device. Proximity between a visitor and a specialist may be determined based on geo-locations detected or collected from separate devices used by the visitor and the specialist.

In one embodiment, if the specialist and the visitor are in different geographic locations (e.g., different states) yet the specialist is present and available and can service the visitor (virtually) without meeting face to face, then a live connect Ad can be offered or served to the visitor to establish a communication link in real time between the specialist and the visitor on the visitor's request. However, if a face to face meeting is required for a service provided by the specialist, no live connect Ad of this remote specialist (with respect to the visitor) would be offered to the visitor. The live connect Ad system may include configurations or settings including business rules or knowledge, for example, specifying which specialists (or companies) can serve visitors remotely or face to face (i.e. locally) according to requirements of the services provided.

Service campaigns (or advertisements) for a specialist or a company may be configured with proximity settings, for example, to only allow face to face meet up with a visitor, only allow virtual meet up (e.g. online connections) with a visitor, allow a mix of face to face and virtual met up with a visitor, or apply other applicable constraints or requirements. If a face to face meet up is required, as an example, a live connect Ad for a specialist can be served to a visitor if the specialist and visitor are in the same state (within a specified distance from the visitor) and the specialist is present and available.

In some embodiments, availability of a specialist (or company) may depend on time (or schedule) required or indicated by a visitor to meet face to face with the specialist. The live connect Ad service can identify multiple factors, such as travel time, type of urgencies, etc. to determine whether a certain specialist can be available for the visitor. The live connect Ad service can extract a schedule request from a visitor (e.g. based on search terms) to select which specialists (e.g. via Ad campaign settings) are available for the requested schedule (e.g. day/time) to provide possible services to the visitor (e.g. face to face or online).

Figure 2:
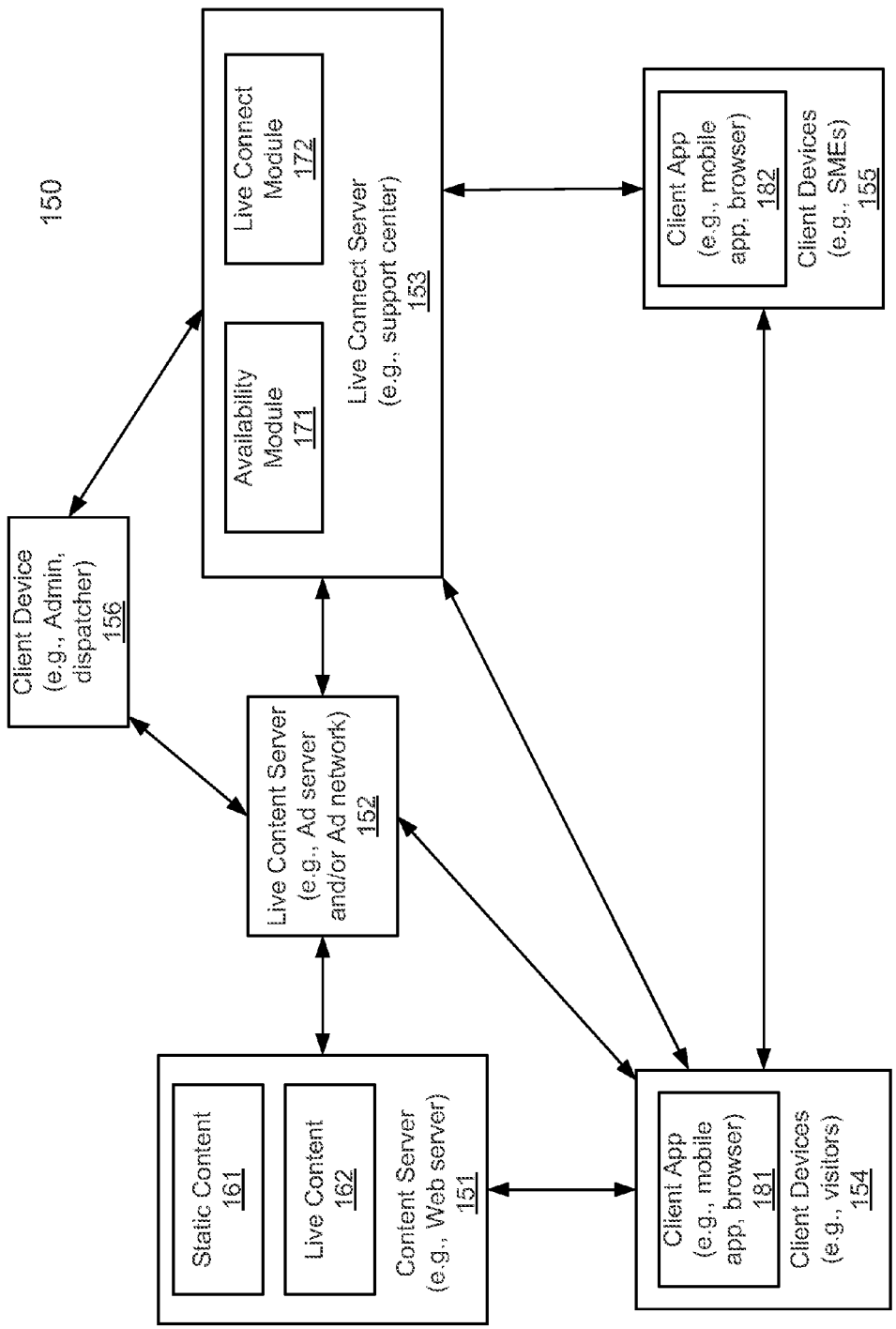
FIG. 2 is a block diagram illustrating a system providing live connect services according to one embodiment of the invention.

FIG. 2 is a block diagram illustrating a networked system for providing live content according to one embodiment of the invention. System 150 may be implemented as part of system 100 of FIG. 1. Referring to FIG. 2, system 150 includes, but is not limited to, content server 151 (e.g., content presentation server) to present content to end users or visitors who access the content from client devices 154. Content server 151 is communicatively coupled to a live content server 152, which is coupled to live connect server 153. Content server 151 may be a Web server that presents content to the client devices 154, such as, for example, Yahoo®, Google®, or social networking Web servers. The content presented by content server 151 may include regular static content 161 and live connect content 162.

According to one embodiment, when a visitor associated with client device 154 accesses, via its corresponding client application 181, content presented by content server 151, based on the user interaction with the content server 151, for example, interaction with static content 161, content server 151 communicates with live content server 152 to request live content, such as live content 162 to be presented to the visitor. In response to the request, live content server 152 identifies one or more live content that are eligible or related to the request. For each of the identified live content, live content server 152 communicates with live connect server 153 to determine whether there is at least one specialist or user that is currently available to have a live communication with the visitor.

Live content server 152 may maintain a content database that stores all the live content that have been registered and configured by different live content owners or administrators, in this example, represented by client device 156. In one embodiment, for each of the live content that is identified based on the request, live content server 152 transmits a request to live connect server 153, including a live content item identifier (ID). Based on the content ID, availability module 171 (also referred to as availability unit or logic) of live connect server 153 identifies a list of specialists or support agents who have been previously configured for providing live support to that particular content. For each of the specialists, availability module 171 determines whether that specialist is currently available to have a live communication session with the visitor at the moment and the geographic location of the specialist. The availability module 171 determines the availability of the specialists using presence services provided by a presence engine, which may be implemented locally or remotely via a third party vendor, status or state of the specialists, and/or geographic locations of the specialists.

In one embodiment, information indicating whether a particular live content has at least one available specialist is transmitted from live connect server 153 to live content server 152. Alternatively, a list of zero or more specialists that are currently available is transmitted from live connect server 153 to live content server 152, including the geographic locations of the specialists (also referred to as a subject matter experts or SMEs). In response to the list of zero or more specialists, live content server 152 selects an appropriate subset of the eligible live content and transmits the selected live content to content server 151 to be presented as part of live content 162 to visitors. Alternatively, the selected live content may be directly transmitted to client device 154, which may be integrated with the content delivered by content server 151 by client application 181. In addition, according to one embodiment, the list of one or more available specialists or support agents that are associated with the presented live content may also be presented, including their respective geographic locations. The geographic locations of the specialists may be presented in a map with respect to a geographic location of the visitor (optionally with a geo fence or predetermined geographic proximity). According to one embodiment, a live content owner may specify or configure a set of rules (not shown) under which the corresponding live content may or may not be presented. For example, if there is no specialist currently available, the content owner may decide not to present the live content or alternatively, the content owner may specify in the rules to allow the live content to be presented as static content (e.g., static content without presenting the live connect button or control) if no specialist is available.

According to one embodiment, for each of the live content 162 presented by content server 151, there is a corresponding live connect button or control to allow the visitor to contact the corresponding specialist for a live communication session discussing the subject matter of the live content 162. The live communication session can be established using a variety of communications methods or channels, such as, for example, voice, chat, text, Web conferencing, or social media, etc. The visitor of client device 154 may select and contact one of the presented specialists by activating or clicking the corresponding live connect button or control. In response to the activation or click of the live connect button, live connect module 172 (also referred to as live connect unit or logic) of live connect server 153 obtains user information associated with the visitor and routes the information of the visitor to a specialist currently available, in this example, represented by client application 182 of client device 155. The user information of the visitor may be collected from the visitor directly, for example, using an interview or dialog engine to prompt the visitor for contact information of the visitor. In response, the specialist can establish a live communication session with the visitor for discussing the live content in question. This is done by the SME clicking a button to accept the request and call (or message) the visitor. Alternatively, when the visitor clicks the live connect button, a call is directly made between client device 154 of the visitor and a dedicated person associated with the Ad (e.g., administrator or job dispatcher). The dedicated person can then select one of the available SMEs. If the selected SME accepts the assigned job, the user information is routed to the selected SME and a live communication session is established.

Since live content is presented dependent upon the availability of the associated specialists and the available specialists may become unavailable from time to time, the presented live content may become expired after a predetermined period of time if the visitor does not initiate a live contact by clicking the corresponding live connect button. The rationale behind it is that a specialist may support multiple live Ad campaigns or a single Ad campaign but presented at multiple content presentation servers and/or multiple live content servers. A specialist may accept a live communication request at any moment of any of the live content, which causes the specialist becoming unavailable. As a result, when a visitor clicks a live connect button, if the corresponding live content has expired, the live content may be refreshed by the content presentation server and/or live content server, in which the live connect server is invoked to determine the availability of the specialists for the same live Ads again.

According to one embodiment, system 150 may be utilized to provide live advertising from various advertisement providers. For example, live content server 152 may represent an Ad server and/or Ad network in which an advertisement owner can set up and configure an advertisement to be distributed by Ad server 152. The advertisement owner can also configure a set of one or more specialists in live connect server 153 that are associated with the advertisement presented by Ad server 152. Content server 151 may be a Web server that provides information accessed to a visitor represented by client device 154.

For example, content server 151 may be a Web server with a search engine (e.g., Yahoo or Google search Web site). As an Ad owner, a plumbing company may set up an Ad account in Ad server 152 having a plumber related advertisement. In addition, the Ad owner may further set up one or more plumbers as specialists or agents for the plumber advertisement in live connect server 153, including registering their client devices 155 and communication methods to contact them. When visitor 154 performs a search of a keyword, such as, "I need a plumber," via a search engine, the Ad server 152 will identify the Ad setup for "plumbing," and collect specialist availability from live connect server 153, pass information to content server 151 which would transmit information representing what the visitor is currently interested in, in this example, plumber, to live content server 152 for inquiring any advertisements related to plumber. Based on the request, live content server 152 searches in a live content database (which is stored in a persistent storage such as a hard drive of a data processing system) to identify a list of advertisements that have been previously registered and associated with the keyword in this example. For each of the identified advertisements, live content server 152, as an Ad network, communicates with live connect server to determine a list of specialists that are associated with the Ad in question. For example, server 152 may send an Ad ID to server 153 to request a list of specialists currently available for that particular Ad identified by the Ad ID. Sever 152 may further send user information of the visitor to live connect server 153, such as, for example, name, address, and/or geographic location of the visitor.

Availability module 171 of live connect server 153 determines zero or more specialists that are currently available based on their respective geographic locations. The list of available specialists and their geographic locations are sent back to live content server 152. Live content server 152 then transmits the live connect advertisement to client device 154 via content server 151 or directly to client device 154 to be integrated by client application 181 therein. A live connect Ad may be presented with a corresponding live connect button or control to allow the visitor to contact an available specialists. In one embodiment, only the advertisements that have at least one specialist available are presented to the visitor 154; otherwise, the advertisement may be presented as static advertisement, for example, without live connect buttons or suppressed all together based on the Ad configuration.

According to another embodiment, content server 151 may be social networking server (e.g., Facebook®, Twitter®) in which Ads are displayed to their users. Users may interact with the social networking server and based on the user interaction with the social network, server 151 may communicate with live content server 152 to obtain a list of live connect advertisements associated with available specialists. The users can contact the available specialists from the advertisements at the point in time. For example, when a visitor interacts with a social Web site, for example, by typing "need a plumber, can someone help?" the user interactions are monitored by the social Web site. In response, the social Web site creates a search package with one or more search terms, and pushes the search package back to a client device of the visitor prompting the visitor to click a search link presented by the search package. When the visitor clicks on the link, it causes browser to be displayed and a search is performed according to the search package. The search request is received by a predetermined search engine and the above processes are then performed amongst the search engine, the live content server, and the live connect server, as described above.

Note that the system configuration as shown in FIG. 2 is described for illustration purpose only. Other configurations may exist. For example, content server 151 and live content server 152 may be implemented as a single server or a cluster of associated servers (e.g., within the same domain). Live connect server 153 may be integrated with a server or a cluster of servers representing a support center. A multi-channel communication system associated with a support center can be utilized to establish a communication session between a visitor and a specialist. Similarly, an Ad owner can utilize other resources of the support center, such as, the infrastructure of the support service system (e.g., multi-channel communication system, support agent management and routing, data analytics capability, presence service, etc.), to provide support services to the advertisements.

Figure 3A:
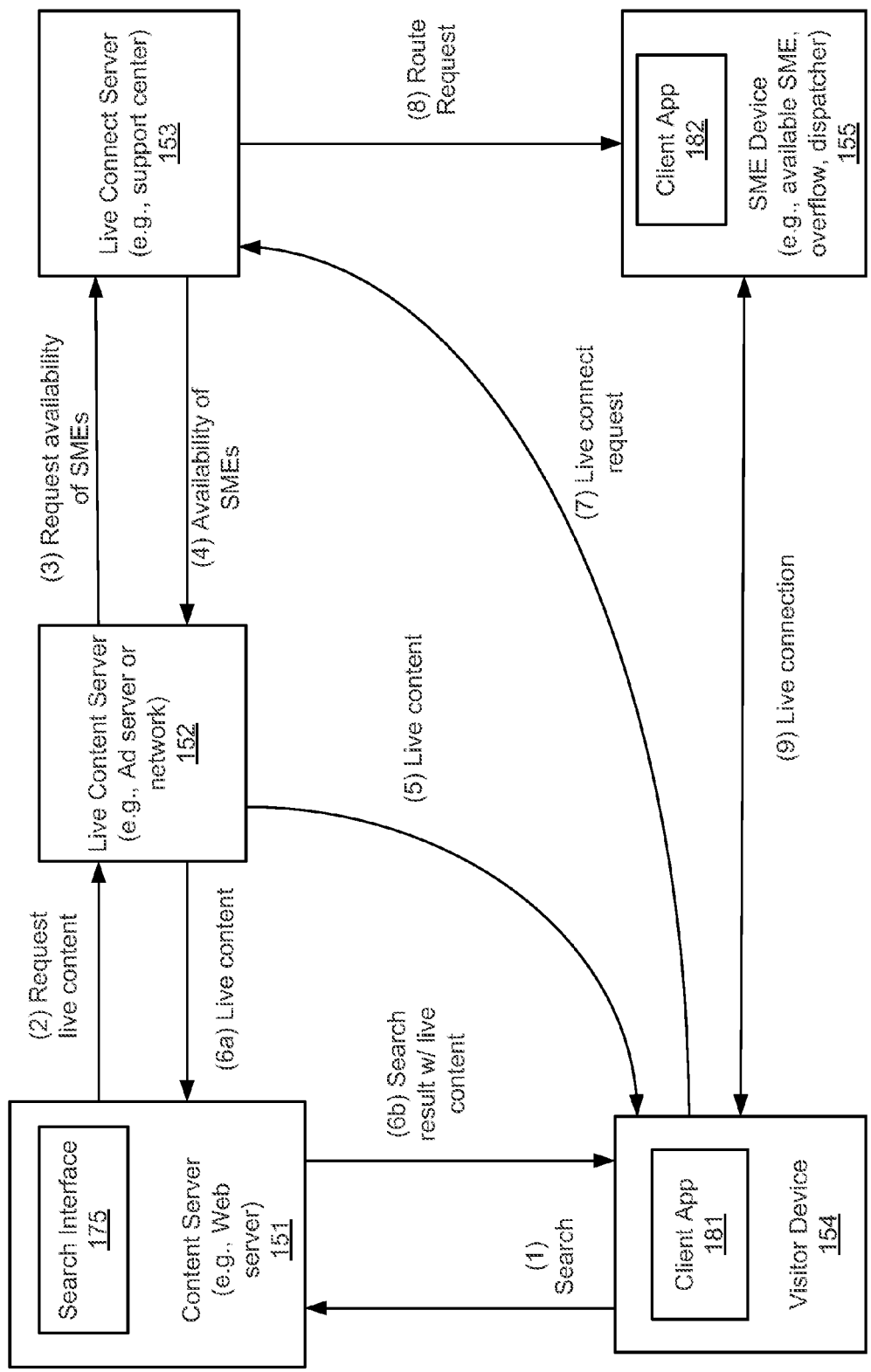
FIGS. 3A-3B are block diagrams illustrating a network system providing live connect services according to some embodiments of the invention.

FIG. 3A is a block diagram illustrating a networked system for providing live content according to another embodiment of the invention. The system as shown in FIG. 3A may be implemented as part of system 100 of FIG. 1 or system 150 of FIG. 2. Referring to FIG. 3A, in this embodiment, content server 151 represents a Web server having searching interface 175 and an associated search engine (not shown). For example, content server 151 may be a Yahoo®, Google®, or Microsoft Bing™ server. In this example, assuming a visitor visits a search Web page presented by search interface 175 of Web server 151 and submit a search query via transaction (1). Based on the search query, the search engine associated with Web server 151 performs a search to generate a search result. In addition, according to one embodiment, Web server 151 sends a request, via transaction (2), to live content server 152 for any live content that is associated with the search query (e.g., search term and other terms having the same or similar meaning).

In response to the request for live content, live content server 152 searches a live content database maintained therein (not shown) to identify a list of live content that is associated with the search information provided by content server 151. The live content has been previously configured or registered by the corresponding live content owners or administrators. For each of the identified live content, live content server 152 transmits a request to live connect server 153, via transaction (3), for availability information of SMEs associated with the specific live content. The request may include a content ID identifying the live content and optional some visitor information (e.g., geographic location of the visitor). In response, live connect server 153 identifies a list of zero or more of SMEs that are available at the point in time. Live connect server 153 may search in an SME or agent database (not shown) based on SME information, such as, for example, SMEs' status (e.g., SMEs with status of "available"), geographic location of the SMEs, and skill set (e.g., Ad campaign configuration), etc. Live connect server 153 returns the list of zero or more available SMEs back to live content server 152 via transaction (4).

Based on the available SMEs provided by live connect server 153, live content server 152 determines a list of one or more live content to be presented to the visitor. In one embodiment, only the live content that has at least one SME available will be represented to the visitor. Alternatively, if multiple live content having available SMEs are associated with the search information, live content server 152 may select a subset that are most appropriate under the circumstances. For example, if a search result page provided by content server 151 only has enough space for two Ads, live content sever 152 may select two of the multiple live content that have SMEs whose geographic locations closest to the geographic location of the visitor. The selection of the live content may also be upon other data or rules (e.g., privilege or membership level of the live content owners).

The search result, as well as the live content, is then delivered to client device 154 and presented to the visitor by client application 181. In one embodiment, the live content may be transmitted by live content server 152 to client device 154 directly via transaction (5), while the search result is delivered to client device 154 by content server 151 via transaction (6b). The live content is then rendered and incorporated with the search result by client application 181. In this embodiment, content server 151 may instruct client application 181 and/or live content server 152 by indicating in the search result the location and size of space for presenting the live content. In return, live content server 152 transmits executable code (e.g., HTML, XML, JavaScript, etc.) to client application 181 to allow client application 181 to render the live content and incorporate the live content with the search result. Alternatively, according to an alternative embodiment, live content server 152 sends information representing the live content to content server 151 via transaction (6a). Content server 151 integrates the live content with the search result and sends the search result with the live content integrated therein to client device 154 via transaction (6b). Furthermore, when content server 151 sends the request for live content via transaction (2), it may also send the search result page to live content server 152. The live content server 152 is responsible to render the live content with the search result and sends the integrated search result to client device 154 via transaction (5). Other configurations may exist.

According to one embodiment, when the visitor activates the live connect button presented as part of the live content, a live connect request is transmitted to live connect server 153 via transaction (7). That is, when the visitor clicks the live connect button, the underlying executable code is executed and as a result, the request is sent to a predetermined destination address, i.e., live connect server 153 or a specific SME (e.g., SME or agent device 155). The live connect request may request for a text, voice, chat communications session. If the live connect button has been configured as a voice connection, when the visitor clicks the live connect button, a data message is transmitted to live connect server 153 and routed to a predetermined SME, in this example, SME device 155 via transaction (8). The data message may include a phone number of the visitor. When client application 182 of SME device 155 receives the message, the SME can simply click the phone number to initiate a voice call with the visitor. For text or chat communications method, the SME can invoke the corresponding text/chat application to establish a text/chat communications session with the visitor, in this example, client device 154 via transaction (9). Alternatively, the live communications session may be established by a multi-channel communications system, for example, as part of a support center associated with live connect server 153.

According to one embodiment, if the SME becomes unavailable or is unwilling to accept the request, the request is routed to a preconfigured dedicated person, which may be an overflow SME, an administrator, or a dispatch person. If the request is routed to a dispatcher, the dispatcher can select another SME from a dispatch or SME management interface and causes the request to be routed to the alternative SME. The dispatcher can also accept the request and communicate with the visitor. When the SME accepts the request through client application 182, the client 182 may automatically communicate with live connect server 153 to change its status, for example, from "available" to "unavailable." By changing the status from "available" to "unavailable," a subsequent request will not be routed to the same SME. This may also change the availability of the associated live content to be presented to another visitor. The status and states of the SMEs are maintained by live connect server 153 in an SME or agent database (not shown).

In one embodiment, live connect server 153 further includes an SME management module or manager that is responsible for registering SMEs and tracking the status and states of the SMEs. A client application of an SME device (e.g., client application 182 of SME device 155) may periodically communicate with the SME management module to update the status and states of the SME, which will be stored in an SME database. The SME manager can access the information stored in the SME database and perform certain management actions, such as taskforce management by allocating different SMEs to different jobs or Ad campaigns for workload balance purposes.

The SME manager may further communicate with the customer in view of the status or states of the SMEs. For example, when an SME goes to customer's premises for performing a job that has been negotiated between the SME and the customer, the SME may set its state via its client application of the SME device to "on-the-way-job-site" state in the SME database. In response, the SME manager or some other components may dynamically set up a geo-fence (e.g., a geographic proximity with certain size) and tracking the physical movement of the SME. For example, the SME management system may periodically receive location information from the application running within SME device (e.g., client application 182 of SME device 155). The location information may be obtained by the client application from an operating system of the SME device. In one embodiment, when the SME enters the geo-fence, the SME management module sends or pushes SME information to customer's client device (e.g., visitor device 154). The SME information may include a picture of the SME and other identifying information of the SME and the job to be performed. As a result, the customer can positively know who he or she is dealing with for security reason. By monitoring the status and states of SMEs, the SME manager can proactively manage the availability of the SMEs and proactively engage with the customers to further improve customer's satisfaction.

Figure 3B:
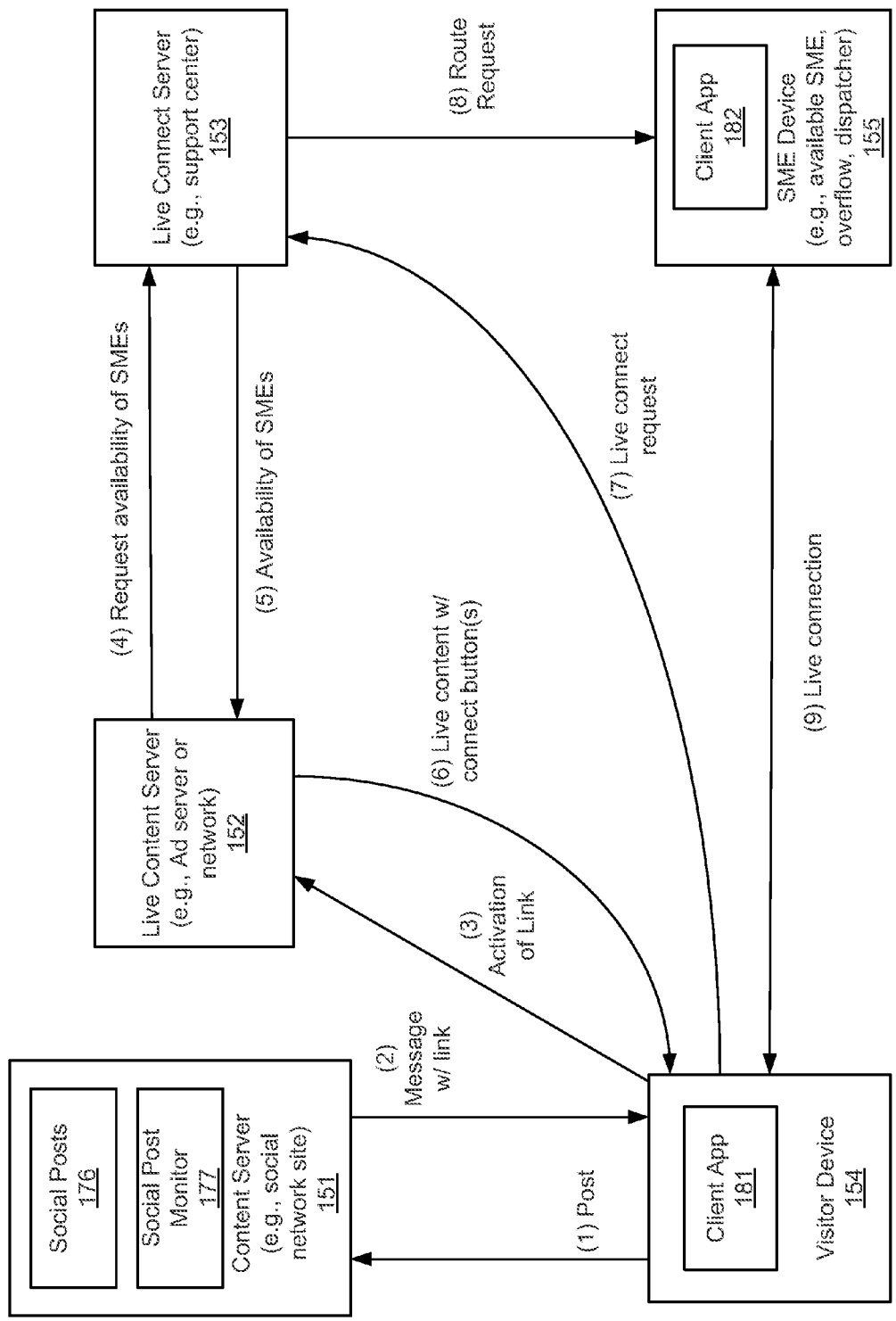

FIG. 3B is a block diagram illustrating a networked system for providing live content according to another embodiment of the invention. The system as shown in FIG. 3A may be implemented as part of system 100 of FIG. 1 or system 150 of FIG. 2. Referring to FIG. 3B, in this embodiment, content server 151 represents a social networking server (e.g., Facebook®, Twitter®) in which a user or visitor can post or receive a social post message, such as social posts 176. In one embodiment, social networking server 151 includes social post monitor 177 to monitor and analyze social posts 176. In one embodiment, when a visitor posts a social post via transaction (1), social post monitor 177 detects and analyzes the post and may determine that the visitor is looking for certain service such as plumbing services. For example, the visitor of client device 154 may chat with a friend concerning a plumbing problem at his or her house. Social post monitor 177 monitors, detects, and analyzes the chat information, and determines that the visitor may need a plumber coming to his or her house to fix the plumbing problem.

In response, social post monitor 177 sends a message with a link to client application 181 of client device 154 via transaction (2). The message may include a button, link, or control to prompt the visitor that the visitor can find a plumbing specialist who is currently available and possibly nearby. The visitor can activate the link or control, which in turn sends a message to live content server 152 via transaction (3). The link or control may be generated by social monitor 177 including underlying executable code, which when executed (e.g., by activating the link or control), sends a message to a predetermined destination, in this example, live content server 152). The message may include information describing the requested content information (e.g., plumbing and/or related services), as well as certain information concerning the visitor (e.g., geographic location of the visitor). The visitor information may also be obtained via information from the visitor's social networking account provided by social networking server 151. In response to the message received from client device 154, live content server 152 identifies a list of live content that have been registered with the live content server 152, and the rest of operations involved in transaction (4) to transaction (9) are performed similar to those involved in transaction (3) to transaction (9) of FIG. 3A. Note that an Ad is utilized as an example of a live content throughout this application. However, the techniques described throughout can also be applied to other types of content, such as, for example, media content, documents, presentations, etc.

Figure 4:
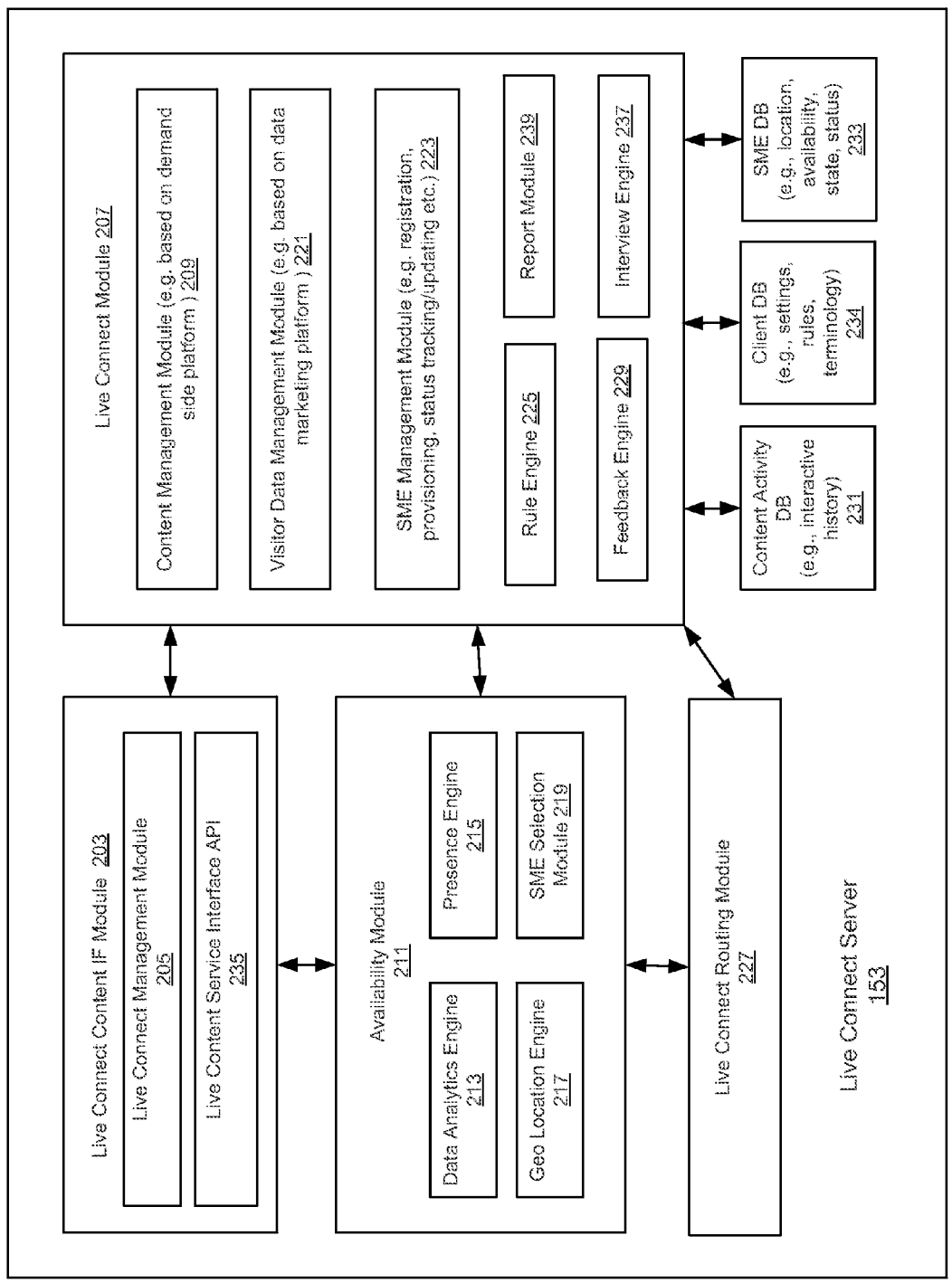
FIG. 4 is a block diagram illustrating an example of a live connect system for providing live connect services according to one embodiment of the invention.

FIG. 4 is a block diagram illustrating a live connect system for providing live connect services according to one embodiment of the invention. For example, the system as shown may be hosted in an operating environment or an operating system running in one or more server devices (or machines). For the purpose of illustration, live Ad services are utilized as examples of live connect services. In one embodiment, live connect server 153 may include live content interface module or logic 203 providing generic interface support to external Ad networks (or servers, infrastructures). For example, transactions or data/message exchanges between live content interface module 203 and external Ad servers may be based on live connect service API (application programming interfaces) 235. Visitor related data (e.g. IP address or other data extracted from client browsing activities) may be passed to system 153 via live connect service API 235.

Interface module 203 may include live connect live content management module 205 to manage content/data included in live connect Ads based on, for example, Ads templates stored in a database or storage device. Live connect management module 205 can filter a list of requests (e.g. each request associated with a business) for live connect advertising received from an external Ads network according to whether associated specialists are available (e.g. via availability module or logic 211) and/or other configured selection criteria (e.g. via live connect module or logic 207). No live connect Ads will be provided for these requests if no specialists are available at the time these requests are received. Note that live connect interface module 203 may also be implemented within an Ad server such as server 152 of FIG. 2.

In one embodiment, executable code (e.g. script or other applicable instructions executable in a client device) may be embedded in a user interface element (e.g. a button, link, or control) generated via live connect management module or logic 205 to allow establishment of live communications. The code may include timer mechanism that will automatically expire if the user interface element is presented to a client device for a specified period of time without receiving user inputs (e.g. clicking on a live connect button). When expired, the user interface element may be automatically updated, for example, to ask a user (e.g. a visitor) of the client device to cause a refresh of the user interface element (e.g. sending another request directly to system 201 or a web server coupled with system 201, etc.).

Availability module 211 can determine whether there is a match, no match or degrees of match between a specialist and a visitor. For example, presence engine presence determination logic 215 can determine whether a specialist (or a group of specialists) is currently registered for providing services via live communications and the current state of the specialist. A specialist may be available if this specialist is registered and also in an "available" state (which can change in real time). Geo location engine or location determination logic 217 can identify or track current locations of the visitor(s) and the specialists. In some embodiments, geo location engine 217 can provide routing guidance and/or dynamic vicinity area, such as geo fence of the visitor, to facilitate face to face meeting between a visitor and a specialist.

The geo location engine 217 may perform operations to capture, extract and or identify location and tracking information for both a visitor as well as specialists of the support or service. For example, geo location engine 217 can obtain geo location information of the specialists and visitors via external location service providers, through an interview with the visitors and/or specialists, and/or other user actions. Alternatively, geo location engine 217 may communicate with a client application running with a client device of the specialists and/or visitors to obtain geo location information and determine the geographic location in real time. The presence engine 215 may determine availability of a specialist or a group of specialists to support or service a visitor at the time a request is made, for example, via the visitor's clicking through on a custom ad (e.g. a live connect ad). Once a specialist is identified and selected, the live connect Ad system can route the visitor to the specialist to establish a communication link. The geo location engine 217 may perform operations to support Ad based live interactions by collecting location information for both the visitor and the specialist. For example, current locations of the visitor and specialists may be identified and/or updated (e.g. tracked, monitored) via the geo location module. A specialist that is located within a local vicinity of the visitor may be recommended based on an analysis (e.g. via DAE module) on the identified location information.

In one embodiment, the identified (e.g. real time monitored) geo location information of both the visitor and the specialist may be leveraged to provide navigational guidance for the specialist to travel to the visitor's location for face to face meetings, work to be performed, etc. A geo-fence may be created (e.g. dynamically via the live connect ad service) around the visitor's location to allow sending timely notifications to the visitor of the specialist's arrival at the meeting or work place. A specialist's information and photo may be sent to the visitor for verification and security purposes.

The presence engine 215 may identify whether a specialist is currently registered on the support center system for the live connect ad service and in which state (e.g. indicating availability) the specialist is currently. The live connect ad service may automatically include or exclude the specialist for establishing a communication link with a visitor based on the state of the specialist. For example, if the specialist is in a state (or status) other than "available", the visitor will not be informed of this specialist for further their interactions. States other than "available" or non-available states for the specialist may include, for example, not-available, on a call, in meeting, on job, off-site, in training, or other applicable states. The specialist may be associated with one single state at a time. A visitor may not be routable to a specialist currently in an unavailable state.

The state or status settings (e.g., terms for states and/or status) may be customized to the specific needs of an owner of specific live content (e.g., specific Ad campaign). Each company of the live content may have different state and/or status definitions and rules associated with the states and status. Each live content of the same company (e.g., Ad campaign) may have different states and status settings. The customized states and status may be presented and set via the client application of an SME who has been associated with or assigned to a specific live content. As described above, an SME may be associated with multiple Ad campaigns, dependent upon which of the associated Ad campaigns the SME currently logs into, the terms, definitions, and/or rules of the states and status may be the same or different. An administrator or owner of the live content can configure such terms, definitions, and rules via a management or administration interface or portal (not shown) of live connect server 153, and the terms, definitions, and rules of the states and status can be stored as part of a client account of client database 234 maintained by live connect server 153.

Data analytics engine (DAE) or data analyzer 213 can perform analysis operations on data collected for a visitor from various sources, such as visitor data passed via interface module 203 and/or visitor data identified via live connect management module 207. Data analytics engine 213 may include customized algorithms or rules selectively applied for the analysis operations as instructed. In one embodiment, SME selection module or logic 219 can determine which specialist(s) best match a visitor based on analysis results of data analytics engine 213. For example, SME selection module 219 can select a specialist from multiple specialists available for an onsite service requested by a visitor (e.g. via a live connect Ad) ranked by data analytics engine 213 based on closeness or accessibility of geo locations related to the visitor and the specialists.

DAE 213 can analyze available data to determine or select applicable live connect ads for a visitor. Data utilized by DAE may include data collected from a client device (e.g. used by the visitor) based on client actions (e.g. search actions or user behavior) via a client application (e.g. a browser), geo-locations of the client device, geo-locations of the specialist (e.g. via an associated mobile device), and/or other pertinent data. DAE module may be configured with different analysis algorithms for different live content to perform customized data analysis created for the corresponding businesses.

For example, DAE 213 can analyze Ads related data passed to the live connect Ad service (e.g. a support center) to determine a best route between a visitor and a specialist (e.g. to meet up with the visitor or establish a communication link with the visitor). Optionally or alternatively, DAE can analyze, in real time, data collected via interview engine 237, or interview data, geo information and/or presence information to identify the best route via custom models based on the details and/or output events interpreted by the system as navigation and/or routing instructions for the best skilled specialist matching the visitor's requirements. DAE may analyze combined Ads related data and interview data for the best route.

In one embodiment, live connect routing module or logic 227 may exchange messages with a client device, e.g. based on embedded code in a live connect button, used by a visitor to establish a real time live communication between the visitor and a specialist. For example, live connect routing module 227 may receive a message from the client device via the embedded code for presenting a live connect button of a live connect Ad to the visitor. Live connect routing module 227 may determine whether any specialist associated with the live connect Ad is currently available via availability module 211. Depending on whether there are live specialists available (e.g. available and local to the visitor), the live connect button may be presented differently. For example, the live connect button may not be presented if there is no specialist currently available. If there are specialists available, live connect routing module 227 may exchange messages with the client device to establish a live communication link between the client device and a device used by a specialist selected via, for example, availability handler module 211.

System 153 may include live connect module 207 to maintain/manage data related to visitors and specialists. For example, content (e.g., advertiser) management module or logic 209 can provide administrative interfaces for businesses or specialists registered for live connect Ad service. Content management module 209 may include or couple with a demand-side platform or DSP to interface with multiple external content (e.g., Ad) exchanges or infrastructures. Visitor data management module or logic 221 can extract visitor related data from requests received from the live content server, such as for example, Ad servers (e.g. live connect Ad requests) or visitor client devices (e.g. button clicks). In some embodiments, visitor data management module 221 may include or couple with a data marketing platform or DMP to identify visitor data from multiple sources, for example, applicable for availability decision and/or specialist selection in availability module 221. Interview engine or logic 237 may be activated to solicit (e.g. via user interfaces presented in a browser application of a client device used by a visitor) additional visitor information in real-time.

In one embodiment, rule engine 225 may include custom configurations or settings which can be leveraged or referenced for customizable data analysis and/or visitor routing to a specialist (e.g. matching the specialist with the visitor). Optionally, interview engine 237 may enforce custom interviews to be required of visitors to collect additional information that can be utilized for routing to a specialist or for information the specialist can leverage within the interaction with the visitor. Feedback engine 229 can facilitate social postings from a visitor. For example, comments, experience or a few words about their experience from a visitor upon completion of an interaction with a specialist (via a company's Ad) can be posted to a variety of social systems such as Facebook™, Twitter™, Instagram™, Linked In™, etc., via the social feedback engine.

According to one embodiment, live connect module or logic 207 may include SME management module or logic 223 for registering and tracking specialists providing services advertised over live connect Ad services. For example, SME management module 223 can provision a specialist for participating in live connect Ad service. SME management module 223 may track job status and/or current states of specialists via mobile applications running in client devices used by specialists. SME DB 223 may store registration information of specialists/businesses and/or current states or related information tracked real-time for the specialists. Business rule engine 225 may include configurable settings/rules to control operations performed in live connect Ad services.

For example, the business rules may be applied to determine (or enable/disable) visibility of the live connect button when no agents (or specialists) are present, visibility of the live connect button when no agents are available even though they are present, whether to enable or disable button image change based on specific prequalification states or values associated with the visitor (e.g. the user presented with the live connect advertisement). Different button image may be displayed based on analysis data via DAE and/or a visitor's prequalification.

Business rules may include setups or settings in the live connect Ad system to allow or restrict a specific capability or feature related to entities such as a visitor and/or a specialist. Exemplary setups may include enabling/disabling capabilities related to:

Geo-location of visitor and/or specialist:
    Using visitor location information
    Using visitor address on file in place of geo data
    Matching a visitor to a local specialist (located within a pre-specified local area)
    Geo-fence for system triggered specialist notifications to visitors Presence of specialist:
    Getting a named specialist
    Queuing a specialist specifically for more than one visitor at a time. Each visitor may be serviced in order of service requests received
    Changing states of a specialist for specific work modes (e.g. in meeting, unavailable, in-route to job, etc.)
    Voice Callback of a visitor
    Scheduling callbacks by visitors for specific business Ads in the system Data analysis:
    Analysis of "Ad data" collected from the Ad service
    Analysis of "survey" data collected by the (e.g. live connect Ad) system
    Analysis of both "ad data" and "survey" data combined
    Analysis of "geo" and "presence" data collected by the system
    Analysis of any data combination based on custom algorithms, including an additional source of data from the business
    Analysis of "NPS" data collected by the system Social network
    Visitor posting of a comment to a single social network of their choice
    Visitor posting of a comment to a single social network of the businesses choice
    Visitor posting of a comment to multiple social networks of their choice
    Visitor posting of a comment to multiple social networks of the businesses choice
    Visitor taking NPS satisfaction survey Live connect button states
    Button visibility if NO agents (or specialists) are "present" on the system
    Button visibility if NO agents are "available" even though they are present on the system
    Button image change based on specific visitor prequalification value (e.g. an attribute value assigned for the specific visitor)

Activities of live connect Ad services provided in system 153 may be captured/logged in content activity DB 231. The logged activities may indicate, for example, a history of requests received from external Ad servers (or Ad networks), corresponding live connect Ads served, visitor data, live communications established and/or attempted between a recorded visitor and a specialist(s), job history, job statues, visitor comments, or other applicable transaction data. Report module 239 may generate various reports based on or derived from data captured in log/report DB 231. For example, history of live connect services may be analyzed to reveal a variety of statistics related to a business participating in a live connect Ad services. The statistics may include number of times or frequencies live Ads were served, number of specialists responded, number of live conversations/communications established, number of jobs completed, or other applicable service characteristics etc.

As described above, live connect server 153 may be integrated or communicatively coupled to a server or a cluster of servers (e.g., cloud servers) representing a support center. In one embodiment, data communications and routing request logic may include a set of java script code (or other applicable script code to be executed in a client device) to enable communications to the support center. When executed, the logic can provide a button for the visitor to click to engage with a specialist. The logic may communicate the necessary data from an Ad system to the support center for analysis. The channel/skill specified in the code may be updated based on a response received back from the live connect Ad service (e.g. based on the data analysis by the DAE 213) to change the route to a skilled specialist for a live communication to be established for the specific visitor. The logic may communicate to the support center the initiation (e.g. via the visitor) of a request for the associated channel and skill to establish the live communication (e.g. predominantly voice or chat).

Once a live communication session has been established, the support center may collect or log interaction activities between the visitor, the specialists, and the live connect Ad system. This information can be stored into a database (e.g., database 231) for operational reporting and analysis of the efficiency of the live connect ad system. The support center may perform data processing operations to enable interactive advertisement activities, message routing, data communication and data collection during the course of the interaction.

Photos from the visitor can be taken (e.g. dynamically via the live communication link) and communicated to the specialist allowing a remote view into the needs of the visitors issue. A specialist can then determine the scope of the job, the amount of work required to complete the job (e.g. short job or long job, one person or multiple-person job), whether the specialist/business has the exact expertise to perform the work or other characteristics/attributes of the job based on the visitor needs and the business's capabilities. As a result, the job may be agreed or declined between the specialist and the visitor in real time via the live communication link.

The live connect Ad service may work with Ad services to provide a variety of types of real time live connected advertisements. For example, a live connected advertisement may result from direct internet (or web) searches, landing pages of search results, landing pages of mapping related search results, web navigation from rich media advertisement (e.g. banner ads), video playing (e.g. video placement ads), video overlaying, TV (television) connection, mobile connections/navigations or other applicable advertisement triggering opportunities.

The live connect Ad services may perform routing operations after a form of analysis is completed to determine a route to a skill/channel in order to reach a specialist in support of visitors' needs based on live connect Ads clicked. The support center system of the live connect Ad services can support a number of routing or communications channels such as traditional voice, IVR (interactive voice recording) voice, traditional chat, Facebook™ chat, Facebook™ posts, Twitter™ posts, SMS (short message service) messages, or other application real time communication links etc. An Ad network associated with the live connect Ad services may set up advertising operations that leverage one or many of these channels. Each channel can be setup to show or hide the button a visitor would click based on availability of a specialist. The code behind or embedded in the button (or other UI elements) may include processing logic to communicate with the support center to determine such availability.

Referring back to FIG. 4, when an availability request for live content is received from an Ad server (e.g., server 152) via interface module 203, SME selection module 219 searches in SME DB 233 to identify a list of SMEs that are associated with the live content. For example, as shown in FIG. 5, SME selection module 219 examines table or data structure 251 to determine a list of SMEs and based on the SMEs, presence engine 215 and geolocation engine 217 determine whether the SMEs are online and their respective geographic locations. In one embodiment, based on the SME IDs, SME selection module 219 determines based on table or data structure 252 the availability of each of the SMEs that are associated with the live content in question.

In one embodiment, the request for live content received from live content server 152 may include a content ID identifying a specific live content (e.g., media content or media documents), in this example, a specific live connect Ad campaign. If there are multiple Ad campaigns associated with a particular live content owner, the request may further include a client ID identifying that client. The request may further includes certain user information of the visitor, such as a geographic location associated with the visitor, at which the requested service will be performed. Based on the content ID and/or client ID, SME selection module 219 accesses a client account based on the client ID or content ID in client DB to identify a list of SMEs that are associated with the client and/or requested content. For each of the SMEs, the SME selection module 219 accesses SME DB 233 to determine the states and/or status of the SMEs and to select the SMEs that are currently available at the point in time.

Figure 7A:
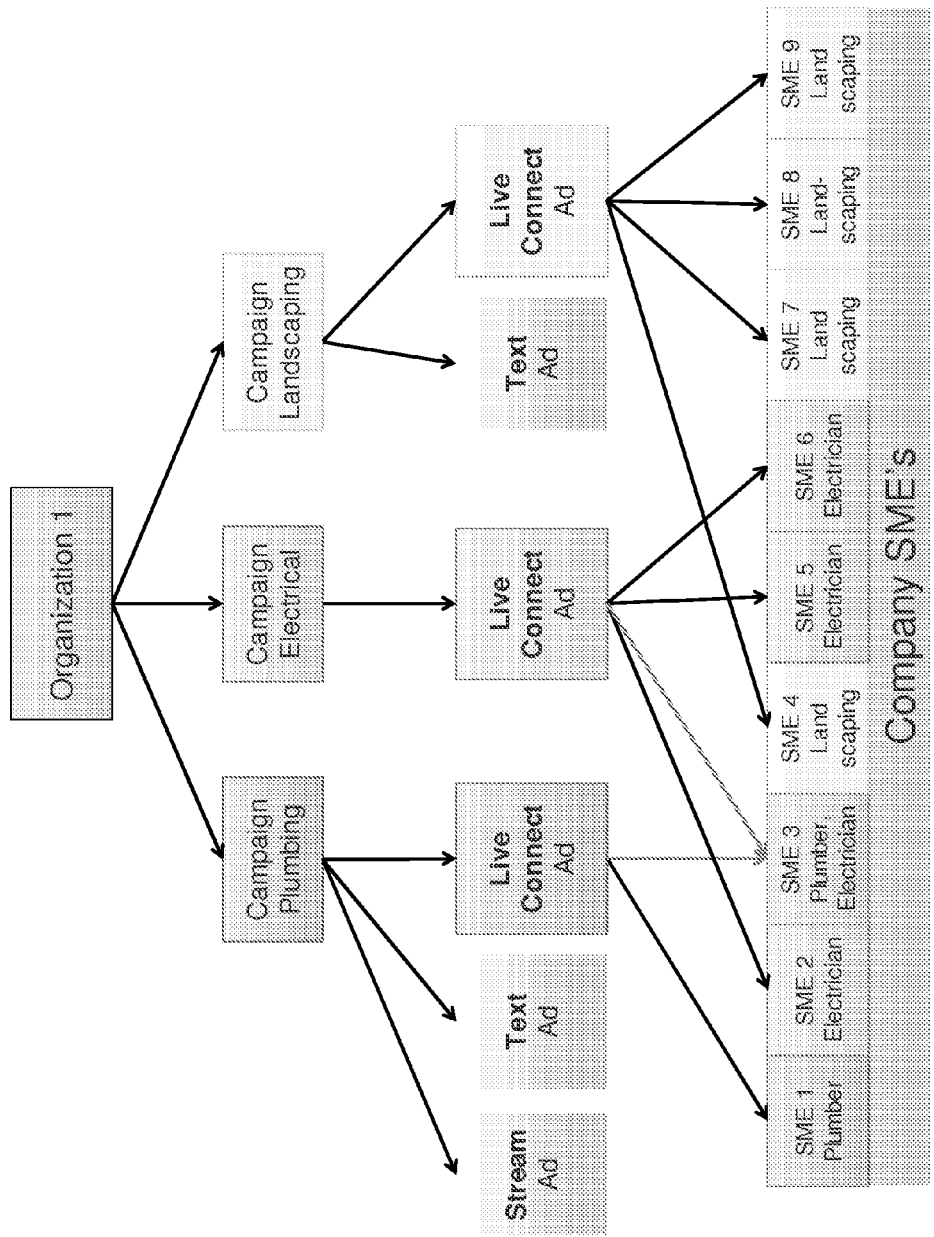
FIGS. 7A-7B are block diagrams illustrating examples of data structures according to some embodiments of the invention.
Figure 7B:
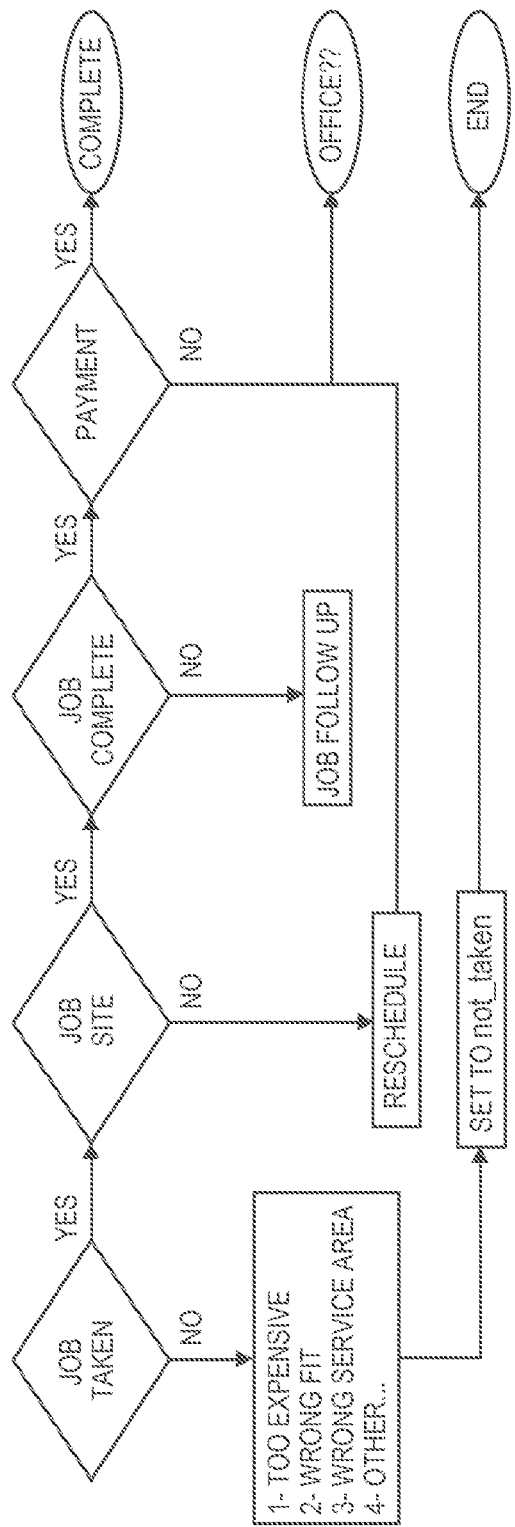

Referring now to FIG. 5, which represents at least a portion of client DB 234 as shown in FIG. 4. Specifically, data structure or table 251 may represent a client account or entry of a particular client (e.g., a live content owner) maintained as part of client DB 234. In one embodiment, data structure 251 includes one or more entries, each corresponding to a specific live content, in this example, a live connect Ad, which may be identified by content ID 253. Content ID 253 may be received from live content server 152 when an administrator of the client provisioned live content, for example, creating a live connect Ad. Each entry may further includes an optional group ID or name describing the live content, one or more SME IDs 255 identifying the SMEs that have been associated with the live content, ID 256 identifying an administrator, dispatcher, or an overflow SME for the live content, terminology 257 defined for that specific live content, one or more rules 258 governing the live content, and communications methods or channels 259 (e.g., voice, chat, text, email, social networking) to be utilized for supporting the live content. Terminology 257 includes the terms defining the states and status of the associated SMEs, such as "available" and "unavailable." An example of the terminology and rules is shown in FIG. 7B for a client providing plumbing services.

Note that the configuration as shown in FIG. 5 is described for illustration purposes only; other layouts, formats, and/or architectures may also be utilized. For example, data structure 251 may be indexed or sorted based on a client identifier identifying an owner or author of live content. Data structure 251 may also be indexed or sorted based content identifiers identifying the specific live content. Client database 234 represented by data structure 251 may further include a query interface that allows a component to query based on different types of query terms, such as, for example, client identifiers, content identifiers, etc.

Referring now to FIG. 6, which may be part of SME DB 233 and/or content activity DB 231, table or data structure 252 includes multiple entries. Each entry corresponds to an SME identified by SME ID 261. Each SME entry further includes one or more live content IDs 262 that the corresponding SME are associated with. For example, a single SME may be associated with multiple Ad campaigns as shown in FIG. 7A. An SME entry further includes geographic location 263 of the SME, current job state of the SME 264, current status of the SME 265, contact information of the SME 266, skill set of the SME 267, and other information such as user preferences or a picture of the SME 268. Status 265 may be one of "available" and "unavailable." Job state 264 may be one of "accepted," "in process," "on hold," "transferred," "canceled," and "completed." Note that the data structures as shown in FIG. 6 are described for illustration purpose only; other formats or layouts may also be implemented. Furthermore data associated with the SMEs and/or live content may also be stored therein.

According to one embodiment, referring to FIGS. 5 and 6, live connect content interface module 203 of live connect server 153 receives a request for availability information of SMEs associated with a live content. In response, availability module 211 is invoked to determine a client ID and/or a content ID identifying the requested live content of a particular client (e.g., a particular Ad of an Ad owner) from the request, as well as other user information of a visitor. In one embodiment, DAE 213 performs an analysis on the request, for example, determining the content ID and user information from the request. Geo location engine 217 is to determine a geographic location associated with the visitor based on the analysis of the user information. SME selection module 219 accesses client DB 234 to identify based on list of one or more registered live content of the client based on the client ID and/or content.

Specifically, in one embodiment, SME selection module 219 identifies a client account based on the client ID, for example, client account data 251 as shown in FIG. 5. Based on content ID 253, SME selection module 219 identifies a list of one or more SMEs 255. For each of the identified SMEs 255, SME selection module 219 accesses SME DB 233 and determines the states 264 and/or status 265 of the identified SMEs (from the client account of FIG. 5), for example, based on SME IDs 261 as shown in FIG. 6. SME selection module 219 selects one or more SMEs that are currently available at the point in time, where the availability of the SMEs may be determined by presence engine 215. SME selection module 219 then transmits, via interface module 203, to live content server 251 the SME information, such as, for example, SME information as shown in FIG. 9, including, but is not limited to, an indicator indicating whether an SME is currently available and the geographic location of the SME. Similarly, the configuration as shown in FIG. 6 is described for illustration purposes only; other layouts, formats, and/or architectures may also be utilized. Data structures 251 and 252 may be maintained in a single database or multiple databases.

According to one embodiment, referring back to FIG. 4, the list of available SMEs is transmitted to the Ad server via interface module 203. The Ad server (e.g., server 152) can then decide what live connect Ads will be presented to the visitors, for example, based on the availability of the SMEs and other factors (e.g., geographic locations of the available SMEs), which may be configured as part of rules or configurations at the Ad server. Subsequently, when the visitor clicks a live connect button of an Ad, a request is received at live connect server 153, where the request includes identifying information of the visitor (e.g., visitor's contact information). In response, live connect module 207 selects an available SME and informs live connect routing module 277 to route the visitor's information to a selected SME's client device to allow the selected SME to establish a live communication session with the visitor, which can be a voice, text, video chat, social forum etc. The availability of the communications methods or channels may be determined based on the client's settings and/or individual live content settings (e.g., settings 259 of FIG. 5), which may be the same or different from one client to another client or from one live content to another live content of the same client.

According to one embodiment, when a selected SME becomes unavailable or unwilling to accept a live connect request from the visitor, live connect routing module 227 routes the request to a pre-configured overflow SME, such as, one or more overflow SMEs specified in field 256 of FIG. 5. There may be multiple overflow SMEs configured including, but are not limited to, a primary overflow SME and a secondary overflow SME. The overflow SME(s) 256 may be specified by an administrator of the live content and stored in the corresponding client account 251 of client DB 234. In addition, SME management module 223 may automatically set the state of the SME from "available" to "unavailable." Alternatively, in response to a rejection from the assigned SME, the request may be routed to a preconfigured administrator (or dispatcher, manager). The administrator then dispatch the request to another SME who is available and willing to accept the request. The administrator can also accept the request, operating as an SME. The rerouting of the request may be performed according to a specific set of rules (e.g., rules 258) associated with that specific live content owner. Note that any of the components as shown in FIG. 4 can be implemented as logic in software, hardware, or a combination thereof. The content activity database 231, SME database 233, and client database 234 may be maintained in a persistent storage device such as a hard drive. Data stored in these databases can be loaded by a processor into a memory to be accessed by other components as shown in FIG. 4.

Figure 8:
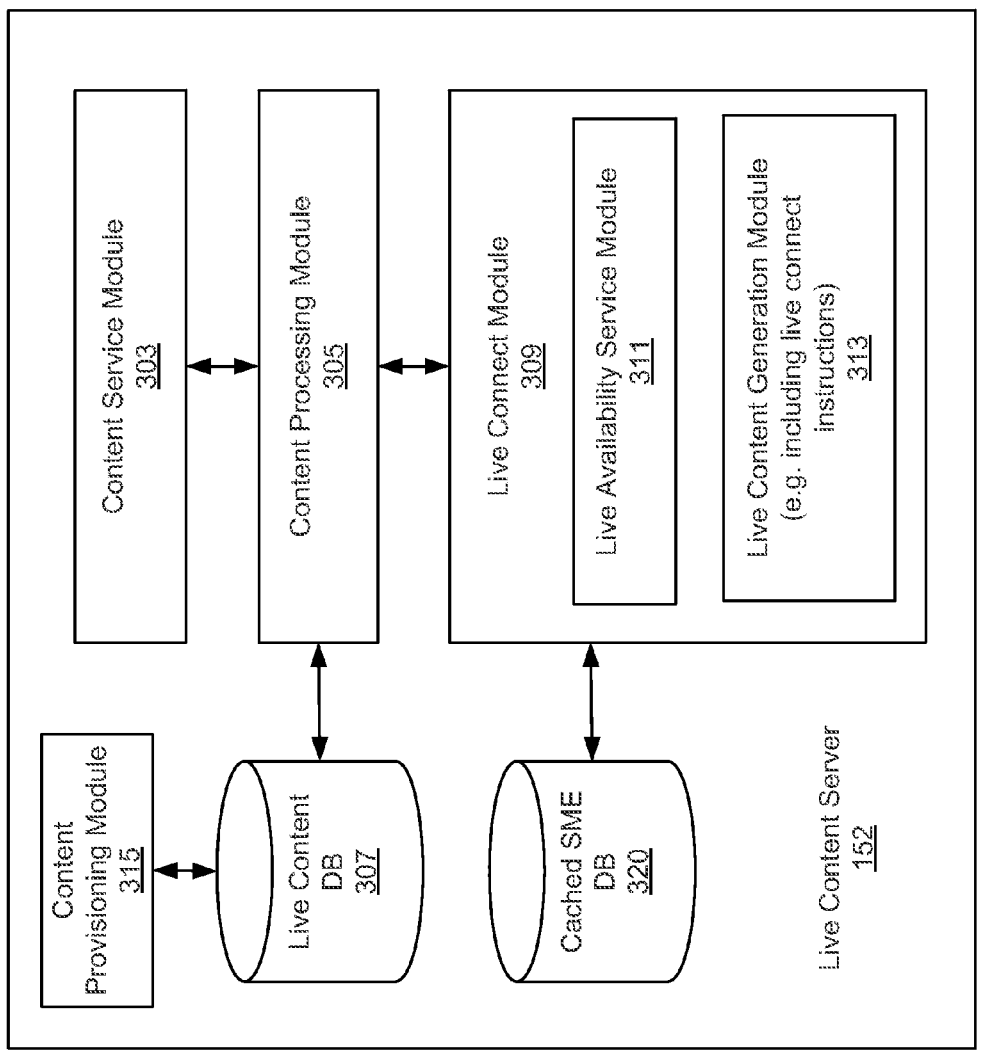
FIG. 8 is a block diagram illustrating an example of a live content server according to one embodiment of the invention.

FIG. 8 is a block diagram illustrating an example of live content server according to one embodiment of the invention. In one embodiment, live content server 152 includes content service module 303 providing remote services for client devices, such as device 109 of FIG. 1. Content service module 303 can include a search engine, a gaming engine or social networking engine or other content/data processing components to offer free or subscribed services to client devices. Content service module 303 may be capable of serving advertisements (or ads) along with the services via advertisement handler module 305.

In one embodiment, content processing module 305 can identify a list of possible live content, in this embodiment, advertisements (e.g. identified by advertiser identifiers) from content DB 307 based on client data extracted from client service requests (e.g. a search term, geo location, network address, etc.) One or more of the possible advertisements may be registered with live connect capability (e.g. live connect advertisers) in the content DB 307, for the purpose of illustration, an advertisement DB. Live connect module 309 can determine or select which of the identified live connect advertisements are currently available to offer live connect Ads according to the live connect capability.

For example, live availability service module 311 can determine locally or remotely "availability" states of specialists associated with the identified live connect advertisers. In some embodiments, live availability service module 311 may be notified (e.g. pushed), for example, from a remote or locally coupled live connect service, with changes of availability states of specialists related to live connect advertisers registered in advertisements DB 307. The information of the specialists may be stored and/or cached in SME or agent database 320 from SME agent database 233 of live connect server 153 of FIG. 4. Live connect module 309 can select a number of the identified live connect advertisements who are currently available (e.g. having specialists with "available" states) for content processing module 305.

Live content generation module 313 can generate or retrieve live connect Ad content for selected live connect advertisers. Live connect Ad content may include, for example, a live connect button or other applicable user interface element indicating to a visitor that a live person is available to offer a service in real time. Live connect Ad content may include instructions (e.g. script code or other applicable processing specifications) embedded with a user interface element (e.g. a button) to be executed in a client device when activated by user actions to cause establishment of live connections between, for example, the client device and devices used by specialists with "available" states. In some embodiment, the embedded instructions may cause the client device to notify (send requests to) the content presentation server to refresh, for example, the live connect Ad content after a specified time period (e.g. 20 seconds or other applicable time out period). Changes of availability states of related specialists may update the user interface elements of the live connect Ad. For example, if the specialists are no longer available, the live connect button may be removed or disabled from the live connect Ad displayed in the client device in real time.

According to another embodiment, an administrator of a company may configure or set up an Ad a configuration user interface (e.g., Web interface), not shown. The administrator may utilize standard Ad templates provided by live content server 152 and the Ads are stored in content database 307. In response to a request received from a content presentation server (e.g., Yahoo or Google search engine), content processing module 305 searches in content DB based on the information obtained from the request (e.g., search term) to identify one or more live Ads that have been previously registered with server 152. An intelligent analysis may be performed to identify the related Ads. For each of the identified Ads, live availability service module 311 communicate with another server, i.e., live connect server 153, to obtain a list of zero or more SMEs that are available at the point in time, including their respective geographic locations. Based on the available SMEs, the live Ads are then transmitted to the visitors, optionally via the content presentation server.

According to one embodiment, availability service module 311 transmits a query to live connect server 153 to inquire whether a particular content or Ad has at least one SME currently available. The definition of "available" refers to an SME has logged into the live connect server and set its status "available." Merely logging into the live connect server only indicates that the SME is presence, not necessarily available. In one embodiment, the query message may include one or more Ad IDs representing the live Ads that have been registered and found in live content DB 307. In response, live connect server 153 identifies a list of zero or more SMEs for each of the Ads being queried and return a result back to live content server 152.

According to one embodiment, as shown in FIG. 9, the returned message or data packet includes one or more segments or data structures corresponding to the one or more Ads being query. Each data structure includes one of the Ad ID (e.g., Ad ID 351) identifying a corresponding Ad and an indication (e.g., indication 352) indicating whether the Ad is available or alive. If the corresponding Ad is available or alive, the data structure also includes a list of one or more SMEs that have been configured and associated with the Ad. Each SME in the list includes an SME ID (e.g., SME IDs 353-355) identifying the corresponding SME, an indication (e.g., indications 356-358) indicating whether the SME is available, and geographic location information of the SME. The geographic location of an SME may be presented by longitude data and latitude data that are compatible with GPS data. For each of the Ads that is available or live (e.g., with at least one available SME), the return information further includes a communication link for each of the communication methods (e.g., text, voice links 359-360) and a map link (e.g., map link 361) linking with a geographic location of the Ad. For example, if the Ad supports both text and voice communication methods, there will be two links presented, one for each of the methods. The link or links include embedded therein executable code and to be associated with a live connect button or buttons (e.g., buttons or controls 613-614 of FIG. 15B) to allow a visitor to contact the live connect server in real time when the corresponding Ad is presented. In this example as shown in FIG. 9, SMEs "1234" and "1235" are available and SME "1236" is unavailable. Note that if an Ad is indicated as unavailable, the list of SME may not be provided by the live connect server. According to one embodiment, live connect server 153 may periodically send or push updated availability information to live content server 152 to be cached in SME DB 320, using the similar protocols or data structures as shown in FIG. 9. Furthermore, the detailed information of the specialists may also be periodically synchronized between live content server 152 and live connect server 153.

Figure 15A:
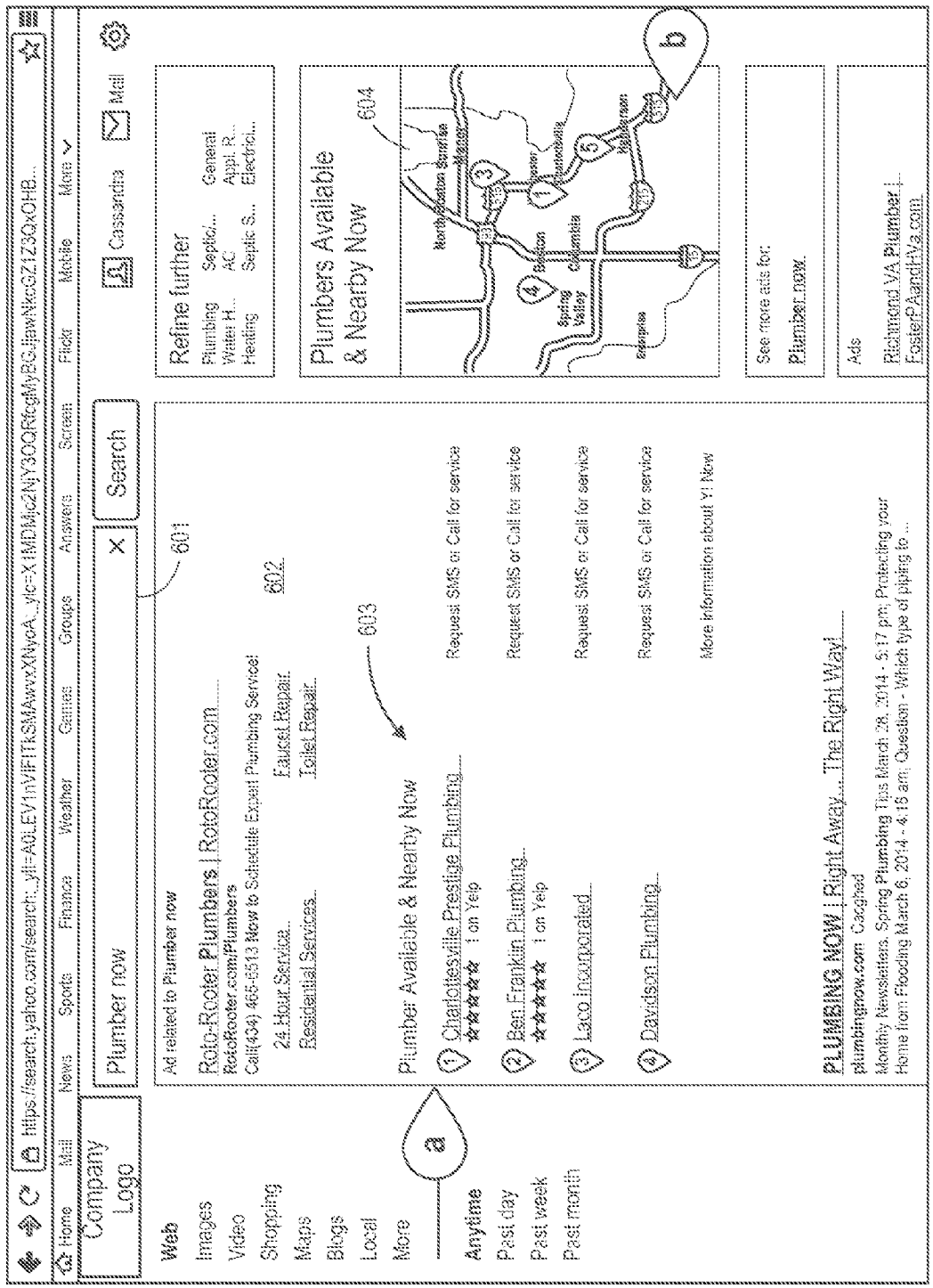
FIGS. 15A-15C are screenshots illustrating an example of a graphical user interface for providing live content according to some embodiments of the invention.
Figure 15B:
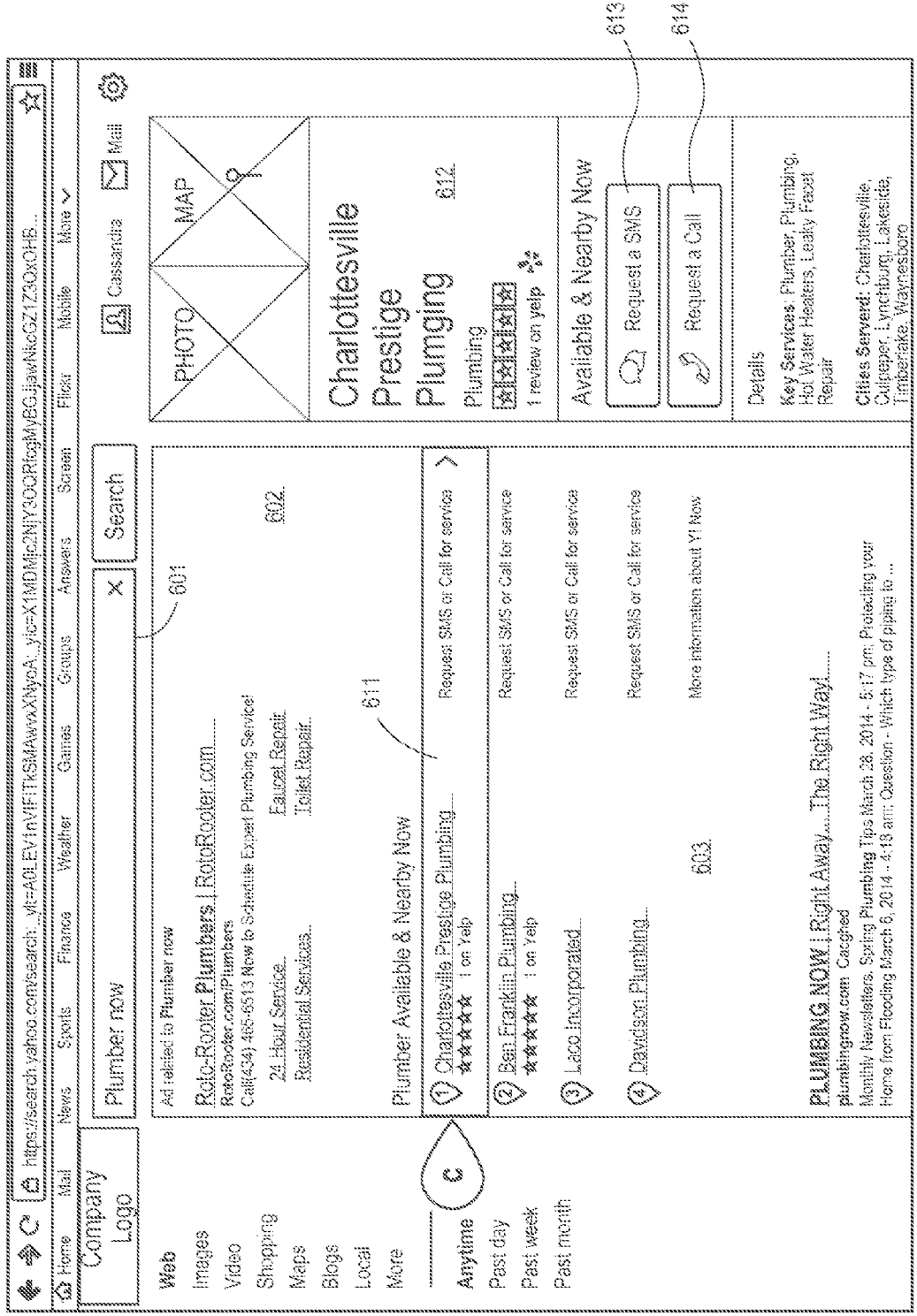
Figure 15C:
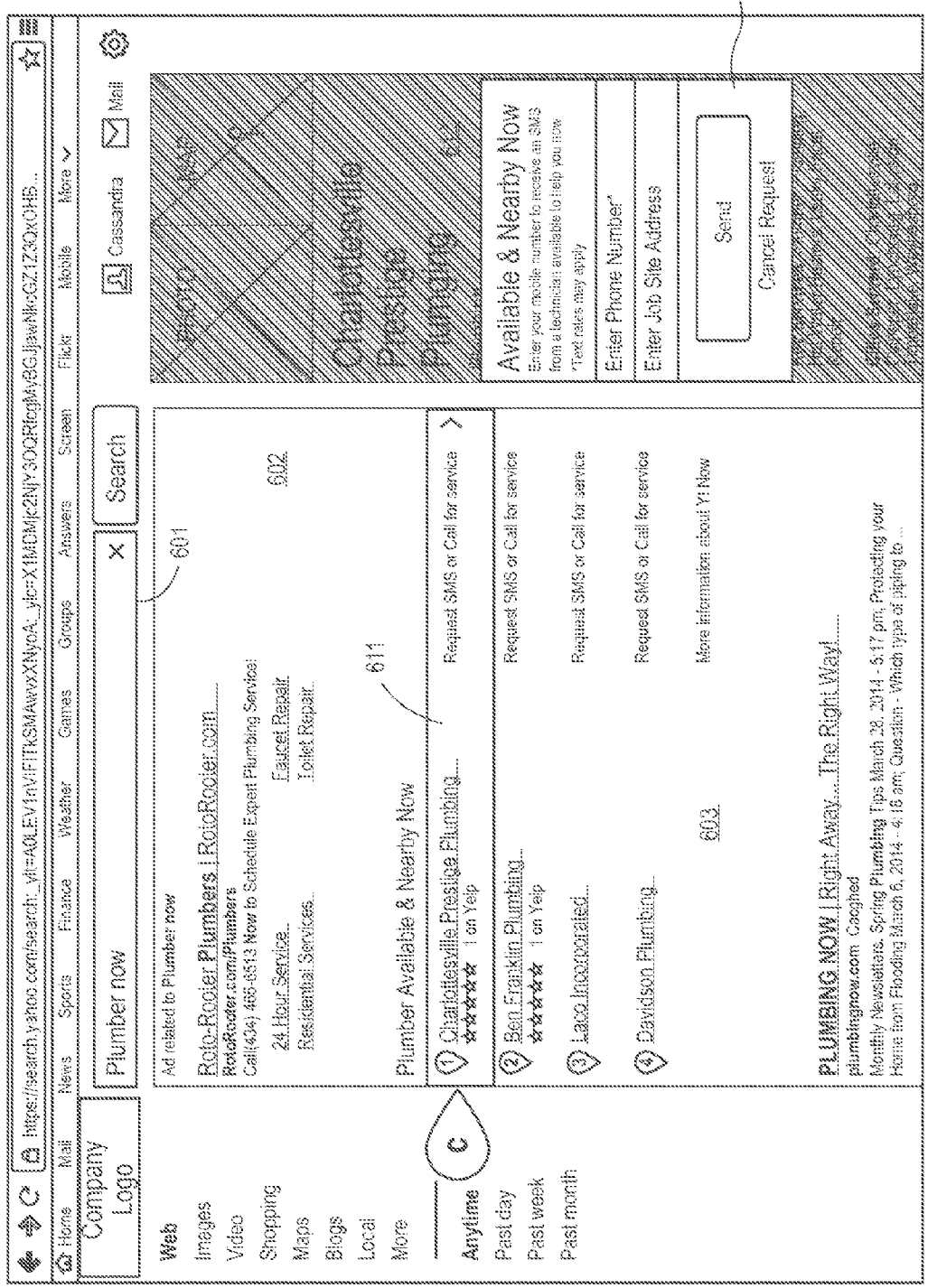

According to one embodiment, live content server 152 further includes content provisioning module 315 to provision or configure live content stored in live content database or store 307. Provisioning module 315 may provide a content provisioning interface (not shown) to allow a content owner or administrator to provision live content. For example, a user may create a live content account stored in live content database 307 and provision one or more live content, such as, for example, live connect Ads. The user may use a live content template such as an Ad template to create a live connect Ad. An example of Ad templates are shown in FIGS. 15A-15C. Once the live content has been provisioned and stored in content database 307, content provisioning module 315 transmits the identifying information (e.g., a live content ID) of the live content to live connect server 153 of FIG. 4 to be populated or incorporated into a live connect account associated with the live content owner. As a result, the live content account maintained in live content server 152 is linked with a live connect account maintained in live connect server 153.

According to one embodiment, live content server 152, as an Ad server, may be communicatively coupled, for example, via a set of agreed upon application programming interfaces (APIs) or protocols, to a specific Ad network, being one of the Ad server members of the Ad network. Alternatively, according to an alternative embodiment, live content server 152 may be communicatively coupled to multiple Ad networks, for example, using multiple Ad network interfaces (not shown), each corresponding to one of the Ad networks, such as, for example, Yahoo, Google, Microsoft Bing, etc. According to a further embodiment, there may multiple live content servers, one for each of the supported Ad networks, communicatively coupled to the live connect server 153.

An Ad network represents an entity that connects advertisers to Web sites that want to host advertisements. The key function of an Ad network is aggregation of Ad space supply from publishers and matching it with advertiser demand. The phrase "Ad network" by itself is media-neutral in the sense that there can be a "Television Ad Network" or a "Print Ad Network", but is increasingly used to mean "online ad network" as the effect of aggregation of publisher ad space and sale to advertisers is most commonly seen in the online space. An Ad server is a computer server, specifically a Web server backed by a database server, that stores advertisements used in online marketing and delivers them to website visitors. The content of the webserver is constantly updated so that the website or webpage on which the ads are displayed contains new advertisements—e.g., banners (static images/animations) or text—when the site or page is visited or refreshed by a user. The purpose of Ad serving is to deliver Ads to users, to manage a websites advertising space and (in the case of advertiser Ad servers) to provide an independent counting and tracking system for advertisers.

Note that any of the components as shown in FIG. 8 can be implemented as logic in software, hardware, or a combination thereof. Live content DB 307 and cached SME DB 320 may be stored in a persistent storage device such as a hard drive. Data stored in these databases can be loaded by a processor into a memory to be accessed by other components as shown in FIG. 8. Also note that although a live connect Ad is utilized as an example of live content throughout this application, however, it will be appreciated that the techniques described throughout this application can also be applied to other types of content, such as, for example, media content, media presentation, or media documents, etc.

Figure 10:
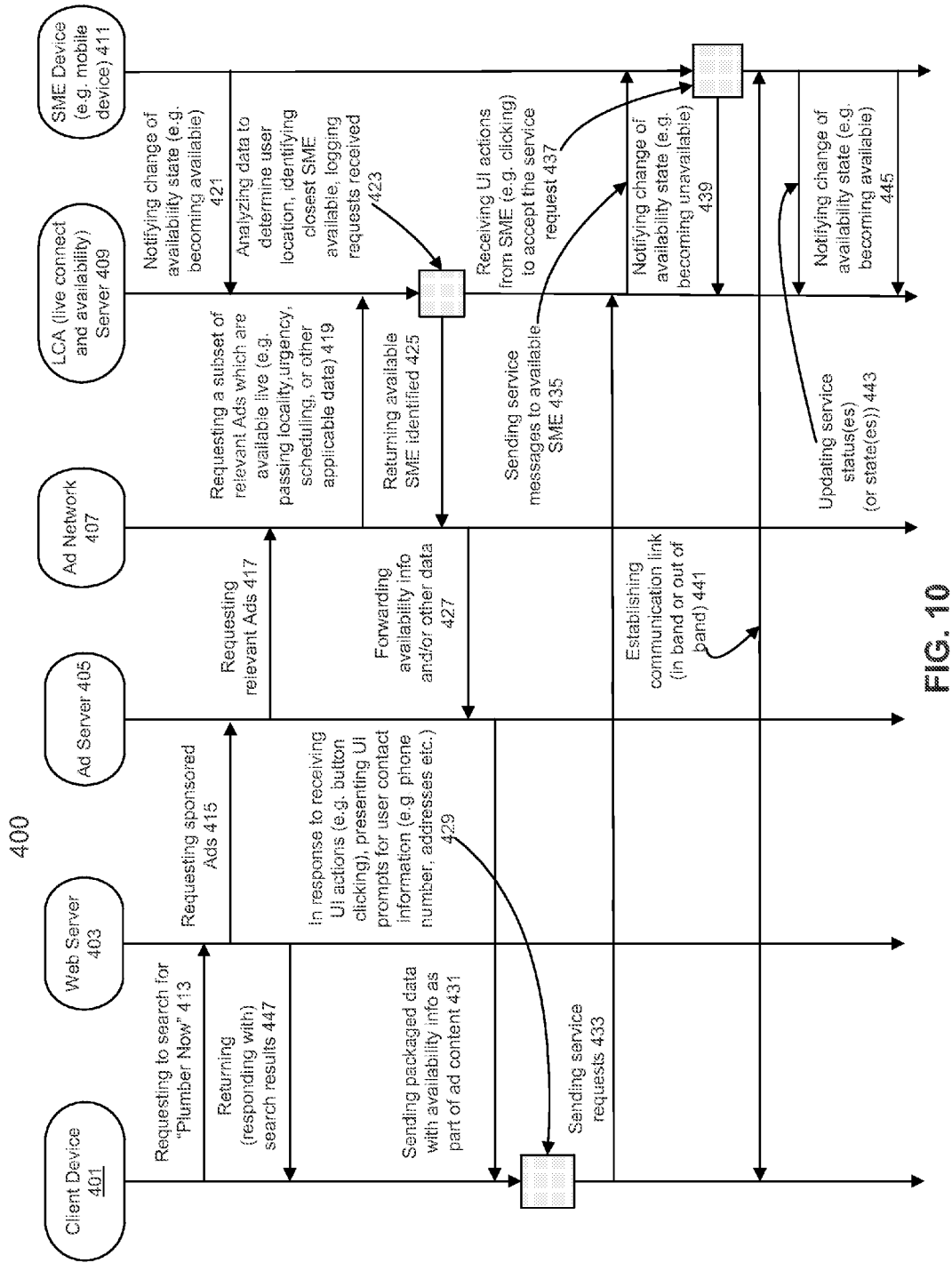
FIGS. 10-12 are process diagrams illustrating sample transactions to establish communication links for live connect Ads according to some embodiments of the invention.

FIG. 10 is a process diagram illustrating sample transactions to establish communication links for live connect Ads according to one embodiment of the invention. Sequence 400 may be implemented based on some components of the system of FIG. 4 or the system of FIG. 8. In one embodiment, at transaction 413, client device 401 may send a search request including the terms, such as "Plumber Now," to web server 403. Device 401, such as device 109 of FIG. 1, may be used by a visitor to access remote services, such as web search service of content/data service 105 of FIG. 1, offered by web server 403. In response, at transaction 415, web server 403 may request sponsored ads from Ad server 405 passing along visitor data including, for example, the search terms. Ad server 405 may look for or request relevant Ads via Ad network 407 at transaction 417 based on visitor data passed from Web server 403. Ad server 405 and Ad network 407 may be implemented as part of live content server 152. In response, Ad network 407 can identify a list of candidate Ads as requested from Ad server 405. A portion of the candidate Ads identified may be registered as live connect Ads.

In one embodiment, at transaction 419, Ad network 407 can request LCA server 409 to determine which of the live connect Ads are live (e.g., there is at least one SME currently available). For example, Ad network 407 can forward a list of identifiers of the candidate live connect Ads to LCA server 409 for providing a specified number (e.g. 2 or other number) of live connect ads which are currently available. LCA server 409 may provide live connect service, such as live connect service 103 of FIG. 1. Ad network server 407 may pass visitor related data, such as geo locations, urgency, schedule or other applicable data to LCA server 409 to identify availability of live connect ads.

Specialists may have availability states timely updated with LCA server 409 to indicate whether they are currently available for live connect services. For example, a change of state from "unavailable" to "available" of a specialist (SME) may be notified from SME or agent device 411, such as device 113 of FIG. 1, used by the specialist to LCA server 409 at transaction 421. Accordingly, LCA server 409 can maintain an up-to-date state for the specialist for possible participation in live connect Ads service.

At transaction 423, in one embodiment, LCA server may analyze data received from Ad network 407 to determine current availability of a list of candidate live connect Ads. LCA server may query currently available SMEs (e.g. based on availability states) and match geo locations to identify available SMEs based on visitor data received. At transaction 425, the identified SMEs may be returned to Ad Network 407. In turn, Ad Network 407 can forward identified SMEs as selected live connect Ads and other applicable data to Ad Server 405 at transaction 427. At transaction 431, Ad sever 405 can send packaged data (e.g. for creating Ad content) with availability info as part of Ad content (e.g. live connect Ads) to client device 401 via web server 403.

The visitor may select live connect Ads presented in a returned search result, for example, by clicking on a live connect button in the live connect Ads. Embedded code in the live connect button may be executed in client device 401 to exchange messages with LCA sever 409. At transaction 429, client device 401 may present a user interface (UI) prompt for user contact information (e.g. phone number, address or other visitor data). The visitor may fill out the contact information for a mobile browser of client device 401 to send out service requests to LCA server 409 at transaction 433.

LCA server 409 may identify and/or select available SMEs (e.g. SMEs currently available for establishing live connections) and send service messages to SME device 411 (e.g. via a mobile application for live connect Ad services) used by the selected SMEs at transaction 435. SME device 411 may receive user interface actions from SMEs to accept the service request at transaction 437. For example, SMEs may click on "call now" button to accept the service request. In one embodiment, SME device 411 may notify LCA server 409 changes of availability state of the SME (e.g. becoming "unavailable") at transaction 439. A live communication session may be established between SME device 411 and client device 401 at transaction 441. The live communication session may be established based on existing communication networks (e.g. phone network, messaging network etc.) out of band from advertisement connections sending live connect Ads. Alternatively or optionally, the live communication session may be established based on connections established for serving live connect Ads (e.g. in band).

The visitor and the SME may converse to determine if the SME will receive the work or not. The visitor may decide to contract the SME and the SME heads to the visitor's location. The live communication link (e.g. a call) between the visitor and the SME may then be disconnected. At transaction 443, messages may be sent from SME device 411 to LCA server 409 to update service status or job status (e.g. "in progress", "complete", "on job" etc.) for the job requested by the visitor via live connect Ads. At transaction 445, in one embodiment, after the job is completed, a notification may be sent from SME device 411 to LCA sever 409 for a state change of the SME to become available again for receiving additional service requests.

Figure 11:
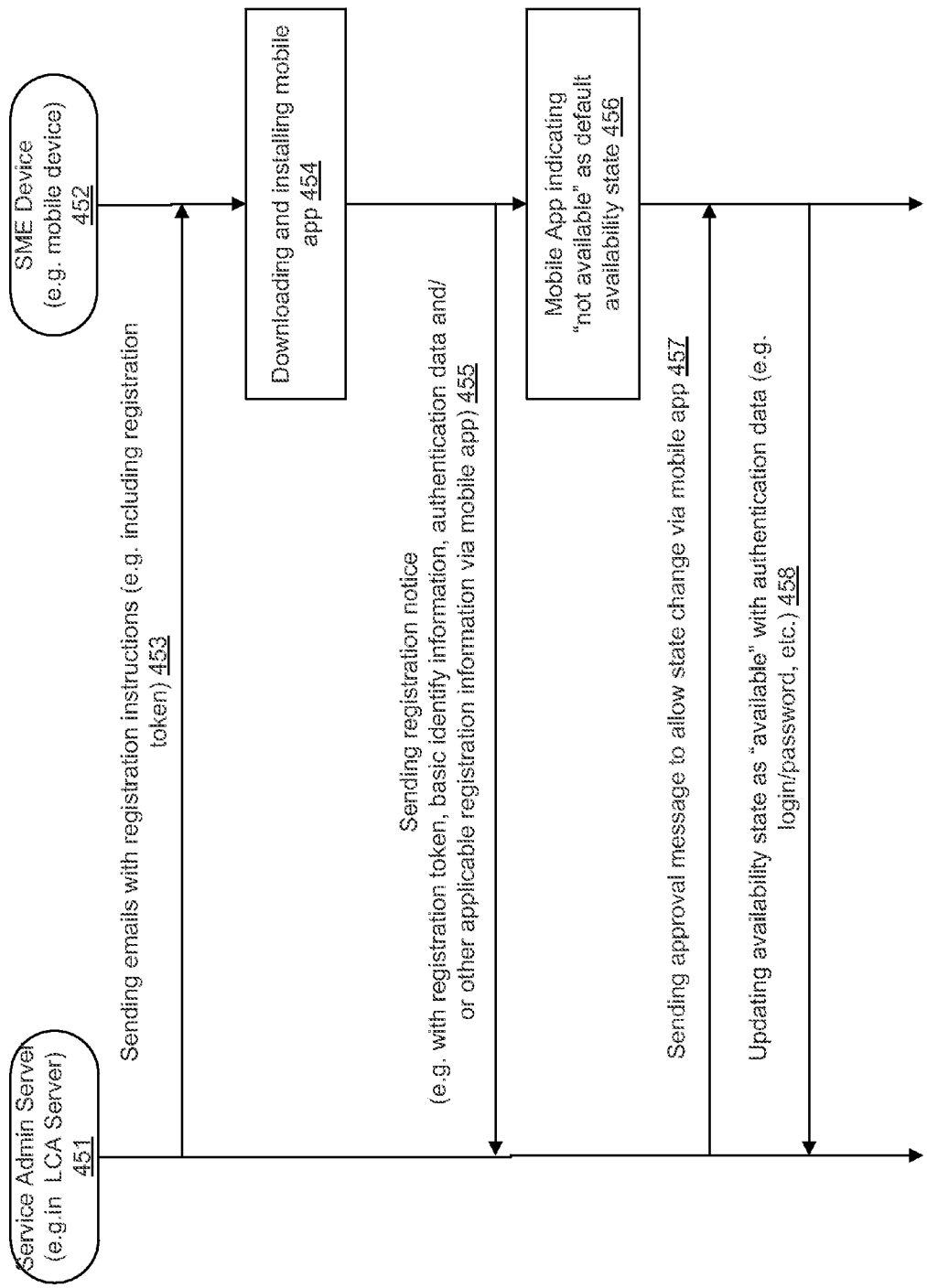

FIG. 11 is a sequence diagram illustrating sample transactions to provision a service provider for live connect Ad services according to one embodiment of the invention. In one embodiment, at transaction 453, service admin server (e.g. LCA server) 451 sends an email or other applicable notifications with registration instructions to a specialist using SME device 452 to participate in live connect Ad campaign. Registration instructions may include a registration token or code dynamically generated for secure authorization purposes. At transaction 454, a mobile application for the live connect Ad service may be downloaded and installed in SME device 452. For example, the registration instructions received by the specialist may include a link to download the mobile application from a remote server, such as service admin server 451 or other applicable servers for the live connect Ad service. At transaction 455, SME device 452 sends a registration notice via the mobile application to service admin server 451 to request to participate in the live connect Ad campaign. The registration notice may include a registration token or code previously received by the specialist. At transaction 456, SME device 452 may indicate a default availability state of the specialist as "pending approval" to participate in the live connect Ad campaign.

At transaction 457, in one embodiment, in response to an approval of an administrator, service admin server 451 may send an approval message to SME device 452 to approve participation of the specialist, for example, via the mobile application, to the live connect Ad campaign or service. The mobile application may allow change of states of the specialist after receiving the approval from service admin server 451. At transaction 458, SME device 452 may send a message (e.g. in response to UI instructions received from the specialist) to service admin server 451 to update availability state of the specialist as "available" to participate in the live connect Ads service. The message may include authentication data such as login/password to authenticate the specialist in service admin server 451.

Figure 12:
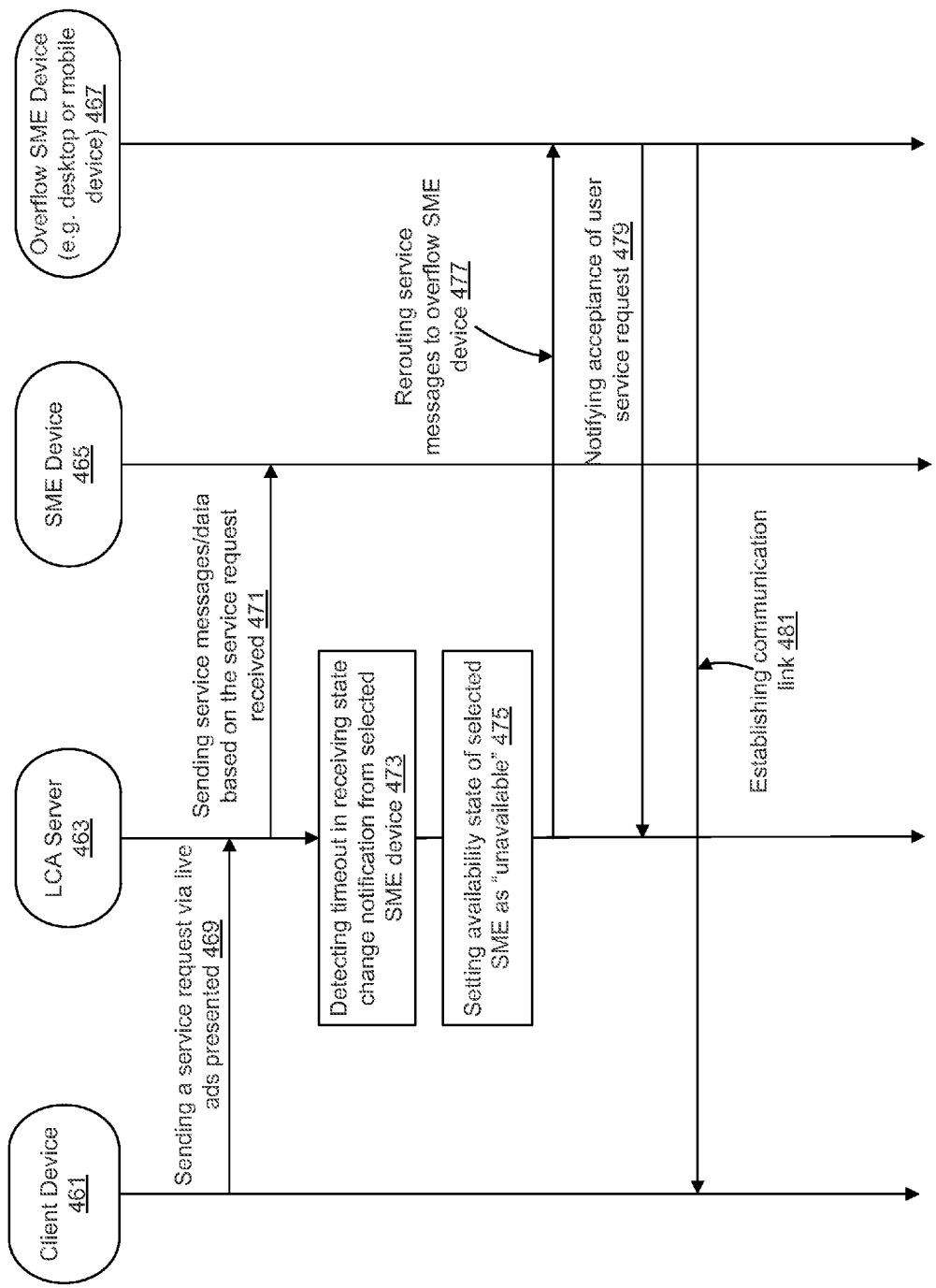

FIG. 12 is a sequence diagram illustrating sample transactions to guarantee live communications for live connect Ad services via an overflow provider according to one embodiment of the invention. In one embodiment, at transaction 469, client device 461, such as client device 109 of FIG. 1, of a visitor, may send a service (e.g. live connect service) request via a live ads presented on client device 461. For example, the visitor may click a live connect button of the live ads to issue the service request. In one embodiment, LCA server 463 can identify currently (when requests are received) available specialists for the live connect service requested from client device 461. A specialist associated with SME device 465 may be selected for the live connect service request. At transaction 471, LCA server 463 sends service messages and/or visitor related data to SME device 465 to notify the specialist. The visitor related data may be extracted or derived from the received service requests. LCA server 463 may start a timer to ensure that the selected specialist responds to the service request within a certain period of time (e.g. predefined short period with liveliness).

At transaction 473, in one embodiment, LCA server 463 detects timeout waiting for an indication that the selected specialist associated with SME device 465 has responded to the service messages. The indication may include, for example, a state change notification from SME device 465 to make the specialist unavailable for new service requests. LCA server 463 may automatically set (or force) a change of availability state of the specialist to become "unavailable" when no response was received within a certain period of time for the timeout. A specialist with the "unavailable" state may not be selected to provide live connect services. At transaction 477, LCA server 463 reroutes service messages received from client device 451 to an overflow SME device used by an overflow specialist designated to provide live service as needed (e.g. when a selected specialist fails to respond to service requests or cannot be contacted in real time). A notice of acceptance to the service requests may be sent out from overflow SME device via the overflow specialist. As a result, live communication link 481 may be established between client device 461 and overflow SME device 467 even when an originally selected specialist is not available and/or when no available specialists can be identified.

FIG. 13 is a flow diagram illustrating a method for providing live connect services according to one embodiment of the invention. Method 500 may be performed by processing logic which may include software, hardware, or a combination thereof. For example, method 500 may be performed by live connect server 153 of FIG. 2. Referring to FIG. 13, at block 501, processing logic receives at a first server (e.g., live connect server) from a second server (e.g., live content server) over a network a first request of a first user for communicating with another user (e.g., agent) concerning a content item of a presentation (e.g., live connect Ad) presented by the second server. The first user accesses the presentation provided by the second server, for example, via a content presentation server (e.g., Web server with search engine or social Web site). The request may further includes a content ID that identifies the content item presented by the second server (e.g., Ad ID identifying a live connect Ad). The content ID may be provided by the second server by identifying a live content based on user interaction with the content server. The request may further include user information of the first user, such as, for example, geographic location of the first user. At block 502, in response to the first request, processing logic identifies from a database (e.g., client database) one or more users, agents, or specialists that are associated with the content item, for example, based on the content ID. The database stores agents or specialists that have been configured and associated with various content items identified by the respective content IDs.

At block 503, processing logic determines the status of each of the identified users or agents, including determining whether each of the users or agents is available to communicate with the first user to discuss the content item at the point in time. Processing logic may further determine a geographic location for each of the users or specialists that are available. If there is at least one user or agent that is available for the content item, at block 504, processing logic sends availability information to the second server for such an indication, optionally including a geographic location of at least one available user or agent. Alternatively, a list of user or agent IDs identifying available users or agents may be transmitted from the first server to the second server, optionally including their respective geographic locations. At block 505, a second request is received from the second server or from a client device of the first user for contacting an available user or agent that is associated with the content item. The second request may include a content ID identifying the content item and contact information of the first user. In response to the second request, at block 506, processing logic transmits a message to a second client device or agent device of a second user or agent that is associated with the content item and is available. The message includes contact information of the first user to allow the second user or agent to establish a live communication session with the first user.

Figure 14:
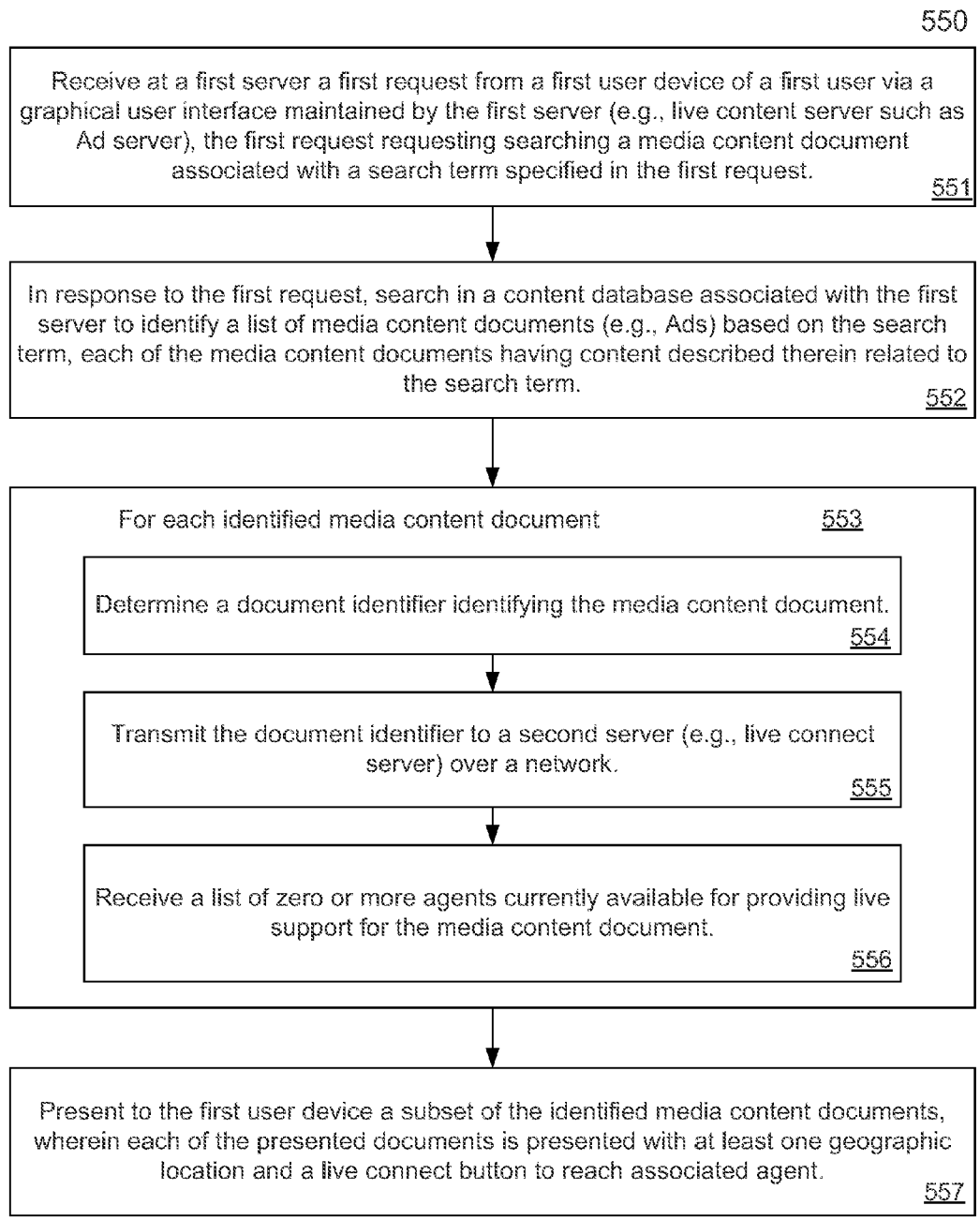

FIG. 14 is a flow diagram illustrating a method for providing live connect services according to another embodiment of the invention. Method 550 may be performed by processing logic which may include software, hardware, or a combination thereof. For example, method 550 may be performed by live content server 152 and/or content presentation server 151 of FIG. 2. Referring to FIG. 14, at block 551, a first request is received at a first server (e.g., live content server 152) from a first user device of a first user via a graphical user interface maintained by the first server. The first request requests searching content or media content documents (e.g., live connect Ad) associated with a search term specified in the first request. In response to the first request, at block 552, processing logic searches in a content database (e.g., live content database or live Ad database) to identify a list of media content documents (e.g., live content documents or live Ads) based on the search term. Each of the media content documents contains description related to the search term.

At block 553, for each of the identified media content documents, processing logic determines a document ID at block 554, transmits the document ID to a second server over a network at block 555, and receives an indication from the second server indicating whether there is at least one agent or specialist currently available for providing live support for the media content document at block 556. Alternatively, a list of zero or more available agents or specialist is received from the second server, as well as their respective geographic locations. At block 557, one or more of the identified media content documents that have at least one available agent or specialist are presented to the first user device of the first user. Each of the media content documents is represented with at least one geographic location of the agent or specialist and a live connect button or control to reach the agent or specialist.

FIGS. 15A-15C are screenshots illustrating an example of a graphical user interface for providing live content according to some embodiments of the invention. The graphical user interface (GUI) as shown in FIGS. 15A-15C may be presented by content server 151 and/or live content server 152 of FIG. 2 and displayed at a client device of a visitor or end user. Referring to FIG. 15A, in this example, a visitor has visited a content server (e.g., content presentation server 151) and typed in a search term "plumber now" in search field 601. In response to the search term, in addition to search and find static content 602, the server may communicate with a live content server (e.g., live content server 152) to obtain a list of live content that is associated with the search term. In addition to sending the search term to the live content server, the content presentation server may send user information of the visitor to the live content server, such as, for example, a geographic location of the visitor. The geographic location of the visitor may be obtained using a location service, which may be implemented locally or via a third-party service. For example, the geographic location of the visitor may be obtained based on its Internet protocol (IP) address (e.g., via a corresponding Internet service provider) or global positioning system (GPS) data obtained from its mobile device.

As described above, the live content server may perform an analysis on the search term, as well as the user data, to identify a list of live content that has been registered with the live content server. For each of the live content, the live content server sends a query to a live connect server (e.g., live connect server 153) to obtain the availability information of the live content. The live connect server determines zero to more specialists for each live content that are currently available and turns a signal for such an indication to the live content. Based on the availability information received from the live connect server, the live content server determines a list of live content to be sent to the content presentation server. For example, the live content server may decide (e.g., based on a set of rules configured by the live content owner) that only the live content that have at least one available specialist will be sent to the content presentation server to be presented to the visitor.

Referring back to FIG. 15A, in this example, it is assumed live Ads 603 are received from the live content server that has at least one specialist available. Furthermore, the geographic locations of the live Ads 603 are also shown in a map 604. In one embodiment, only the live Ads having at least one available specialist within a geographic proximity of the visitor are presented, which may be configured or specified by the Ad owners and/or the visitor. The visitor can select any of the displayed Ads 604 to evaluate the detailed information of the Ads. Referring now to FIG. 15B, it is assumed the visitor has selected Ad 611. In response to the user selection, the detailed information of the selected Ad is displayed in display area 612, including some pictures of the service or product provider associated with the selected Ad and a map showing its geographic location (e.g., geographic locations of its headquarter or specialists). The detailed information may be retrieved from the live content server in response to the user selection. For example, in response to the user selection, the content presentation server may send a request to the live content server to obtain the detailed information of the Ad. The live content server in turn sends a request to the live connect server to obtain the current geographic locations of the associated specialists.

In addition, according to one embodiment, one or more live connect buttons 613-614 are displayed for the selected live Ad. In this example, the visitor can click a live connect button 613 to initiate a chat session with an available specialist or click a live connect button 614 to initiate a voice conversation with an available specialist. Note that the live connect buttons 613-614 may only be displayed or enabled if there is at least one specialist available for that particular communication method (e.g., SMS or voice call). Otherwise, the corresponding live connect button may not be displayed or enabled. In one embodiment, some Ads may be defined to allow for either a voice communication or a chat communication, typically both will not be utilized together. This is defined by the business in which the Ad is displayed for.

In response to the activation of a live connect button, the visitor may be prompted for further user information as shown in FIG. 15C. Referring to FIG. 15C, the visitor is prompted via a dialog box 615 to enter contact information of the visitor, such as its phone number and address that a service will be performed. The user information is then transmitted to the live connect server in response to the send button in dialog box 615. The send button may include underlying executable code that in response to the activation of the send button, sends the user information to the live connect server. The live connect server then selects and distributes the user information to one of the available specialist to allow the selected specialist to contact the visitor for a live conversation. Note that the Ads displayed in FIGS. 15A-15C may be received directly from the live content server 152 or alternatively, from content presentation server 151.

According to one embodiment, in order for an SME to provide live support services to a visitor or customer of live content, the SME has to register with live connect server 153 and/or live content server 152. The registration of the SMEs can be done via a registration interface of live connect server 153 and/or live content server 152. In one embodiment, an administrator of an Ad owner or a company that provides products and/or services being advertised can set up and configure one or more SME for an Ad campaign. As described above and shown in FIGS. 5 and 6, a service or product provider can have multiple Ad campaigns and an SME can be associated with one or more Ad campaigns.

In one embodiment, an administrator can specify the specialists for each Ad campaign, including the contact information of the specialists in a specialist database such as SME or agent database 233 as shown in FIG. 5. Each of the specialists has to install a specialist mobile application onto its mobile device and log into the live connect server from the mobile application in order to communicate with the live connect server, such as registration, receiving notification, setting status of the specialist, etc.

According to one embodiment, during the registration of the SMEs, an administrator sends emails or other applicable notifications with registration instructions to mobile devices of the SMEs to invite them to participate in live connect Ad campaign. Registration instructions may include a registration token or code dynamically generated for secure authorization purposes. In response to the notification, an SME may download a mobile application for the live connect Ad service and install in the SME device. For example, the registration instructions received by the specialist may include a link to download the mobile application from a remote server specified in the link. The SME device may send registration notice via the mobile application to the live connect server to authorize a request to participate in the live connect Ad campaign. The registration notice may include registration token or code previously received by the specialist. In one embodiment, in response to an approval of an administrator, the administrator may send an approval message to the SME device to approve participation of the specialist, for example, via the mobile application, to the live connect Ad campaign or service. Thereafter, the SME can indicate whether he/she is available by changing the status through the mobile application, where the status is stored as part of SME or agent database as shown in FIG. 5.

According to one embodiment, the status of the SMEs can be utilized by live connect routing module 227 to determine whether an incoming contact request should be routed to the respective SME. For example, a request may only be routed to an SME that has an "available" status. The live connect routing module can automatically select and route an incoming request to any of the available SMEs. An SME can accept or deny an incoming request through its mobile application. If none of the SMEs is available or willing to accept an incoming request, the live connect routing module can route the request to a predetermined or preconfigured overflow SME, dispatch person, or a manager/administrator, such that the visitor will be guaranteed to talk to a live person.

FIGS. 16A-16J are screenshots illustrating an example of graphical user interfaces of a mobile application utilized by a specialist according to some embodiments of the invention. For example, the GUIs as shown in FIGS. 16A-16J may be presented by client application 182 of client device 155 of FIG. 2. Referring to FIG. 16A, in this example, assuming the corresponding SME has its status set to "available," when an incoming request is received at the live connect server, the routing module is to select and send a job offer to an SME that is available for that Ad for a client, the channel and the skill. In this example as shown in FIG. 16A, the GUI displays a message from the live connect server, including a brief description of the job offer. The SME can decline the offer by clicking a decline button, which may lead to a history page as shown FIG. 16D indicating that the SME has declined that particular offer, including the date and time of the decline. In addition, according to one embodiment, the SME's status is automatically changed to "unavailable." Since the SME declines the job offer, the system may consider that the SME is unavailable. However, the SME can manually set its status back to "available" or other statuses.

From the GUI page of FIG. 16A, the SME can accept the job offer by directly clicking a button to contact the customer, in this example, a call now button, which may lead to the GUI page as shown in FIG. 16C. In addition, the SME can clicks the view detail button which the GUI displays the detailed information of the job offer as shown in FIG. 16B. The detailed information may include the name of the potential customer, brief description of the job, contact information (in this example, a phone number), and an address of the potential customer. From the detailed information page, the SME can also decline or accept the job offer by clicking the respective buttons. In one embodiment, if the SME accepts the job offer, the application may automatically set the status of the SME as "unavailable" as shown in FIG. 16B, which will be transmitted back to the live connect server and stored in the SME or agent database 233 therein. The rationale behind it is that since the SME has accepted one job, it may take a while to complete the job and the SME is not able to accept another job. From the GUI page as shown in FIG. 16B, the SME can click the contact information (in this example, a phone number) to directly contact the customer. The SME can also click on the address to view geographic location of the job site, for example, before accepting the job.

Figures 16H, 16I, 16J:
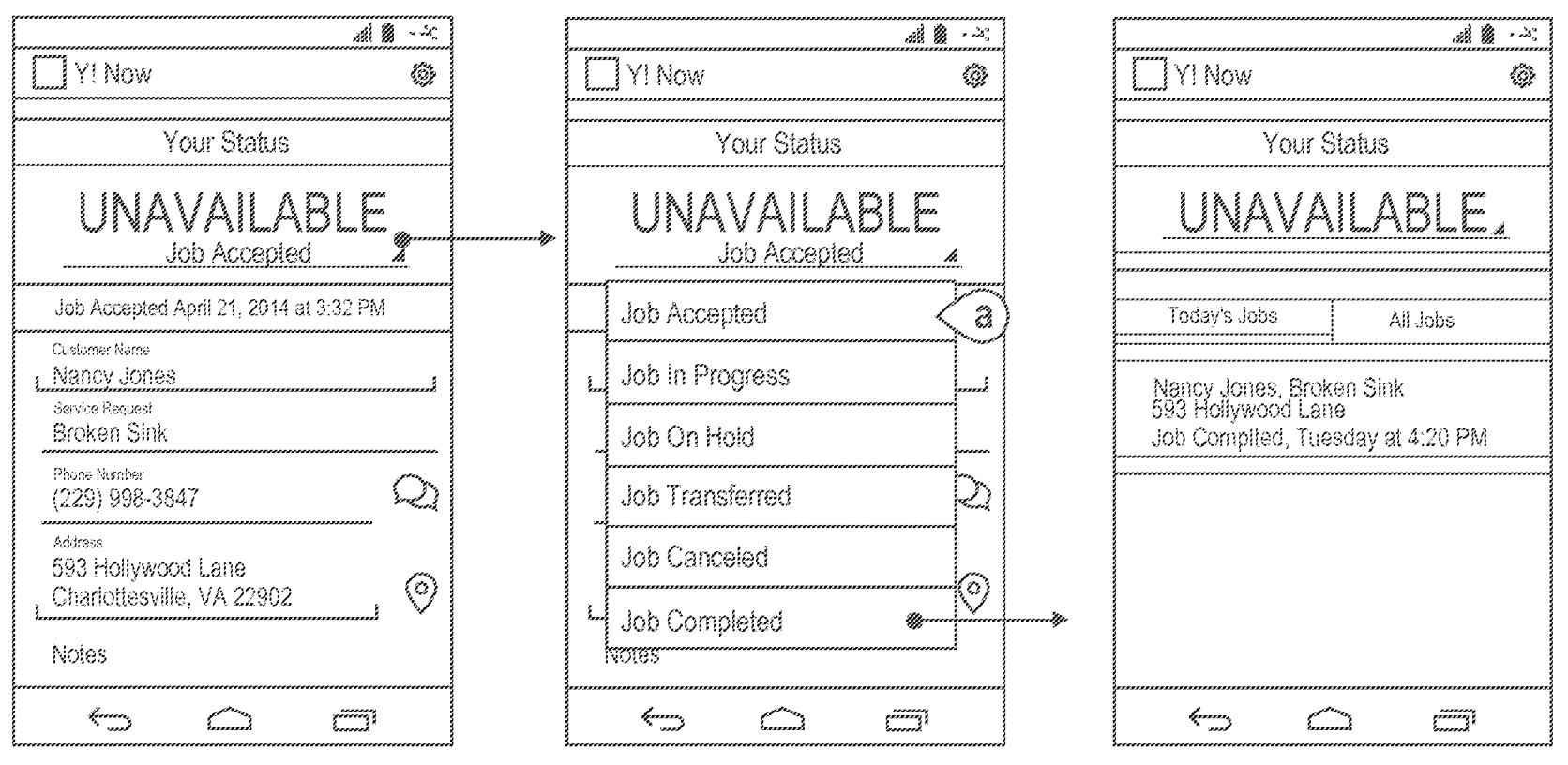

According to one embodiment, a job offer may be received from a dispatch or administrator instead of automatic routing by the routing module as shown in FIGS. 16E-16G. In this embodiment, a visitor may directly click the phone number shown in a live Ad, which is routed to a dispatch person or an administrator's device. The dispatcher can talk to the customer and then select and route a job offer to a selected SME as shown in FIG. 16E. Similar to the situation as shown in FIGS. 16A-16D, the selected SME can decline the job offer as shown in FIG. 16G or view the details of the job as shown in FIG. 16F. An SME can also set its status via the client application as shown in FIGS. 16H-16J, where the updated status information will be transmitted from the client application back to the live connect server to be stored in the SME or agent database.

Figure 17:
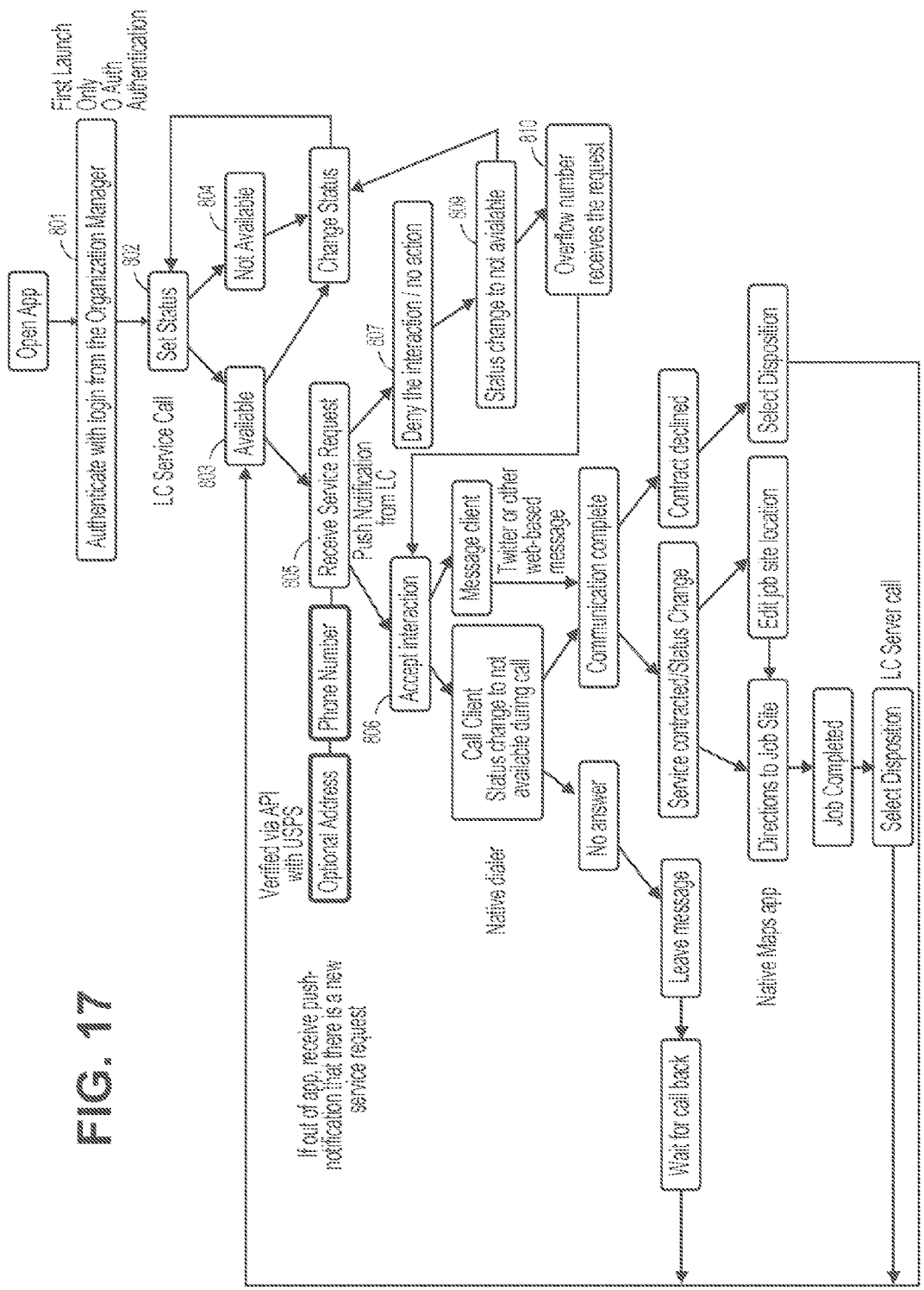
FIGS. 17-18 are process diagrams illustrating interactions between the live connect server and a client application of a specialist according to some embodiments of the invention.
Figure 18:
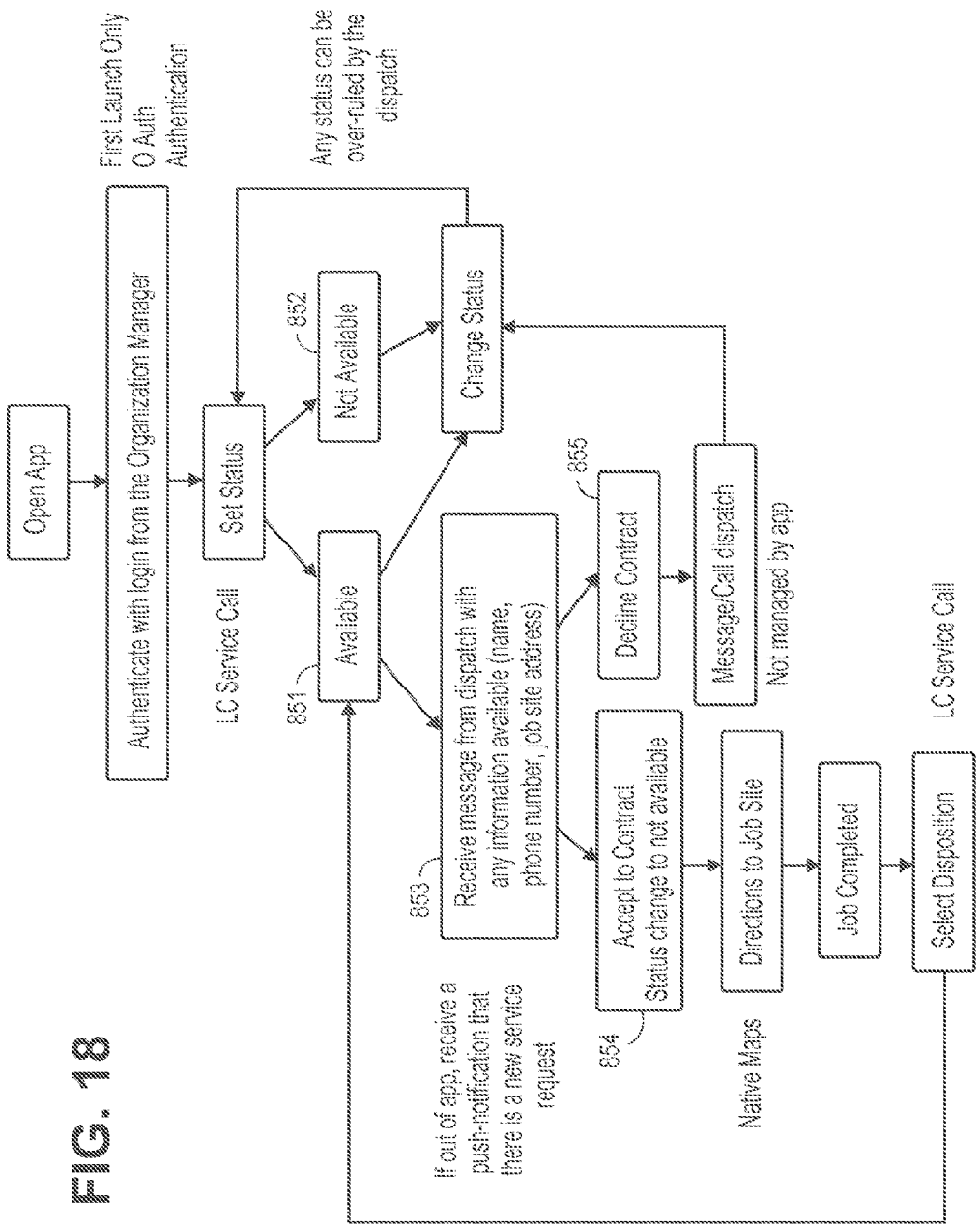

FIGS. 17-18 are process diagrams illustrating interactions between the live connect server and a client application of a specialist according to some embodiments of the invention. Referring to FIG. 17, in this example, after an SME launches the client application and logs into the live connect server at block 801, the SME can set or change its status via the client application at block 802, which can be available status 803 or unavailable status 804. If the status of the SME is set to "available" the SME can receive any incoming offer at block 805, including the contact information of the visitor of the Ad. The SME can either accept the job offer at block 806 or decline the offer at block 807. If the offer has been declined, the incoming request will be routed to another SME, an overflow SME, or a dispatcher at block 810, and its status may be automatically changed to "unavailable" at block 809. Once the SME accepts the offer, the SME can directly contact the potential customer for negotiate a service contract with the Ad visitor. If the SME reaches an agreement with the Ad visitor, the SME may change its status from "available" to another status such as "in process," and once the job has been completed, its status can be changed to "job completed" or back to "available." If the SME cannot reach a service agreement with the potential customer, he/she can decline the request and its status may be changed back to "available."

Referring now to FIG. 18, in this example, an incoming offer is received from a dispatcher. After the SME successfully logs into the live connect server, the SME can set or change its status, such as "available" status at block 851 or "unavailable" status at block 852, manually or automatically by the client application. For example, an SME can configure the client application to set its status to "available" by default once the SME logs in. The SME's status is updated at the SME or agent database at the live connect server and "seen" by the dispatcher. As a result, when an incoming query is received from the customer, the dispatcher can assign the offer to an SME that becomes available. When the SME receives the dispatched message from a dispatcher, at block 853, the SME can contact the customer to negotiate a service contract and once the agreement is reached at block 854, the SME can perform the job and its status is properly set. The SME can also decline the job at block 855 after contacting the customer, in which case, the message is routed back to the dispatcher.

Figure 19A:
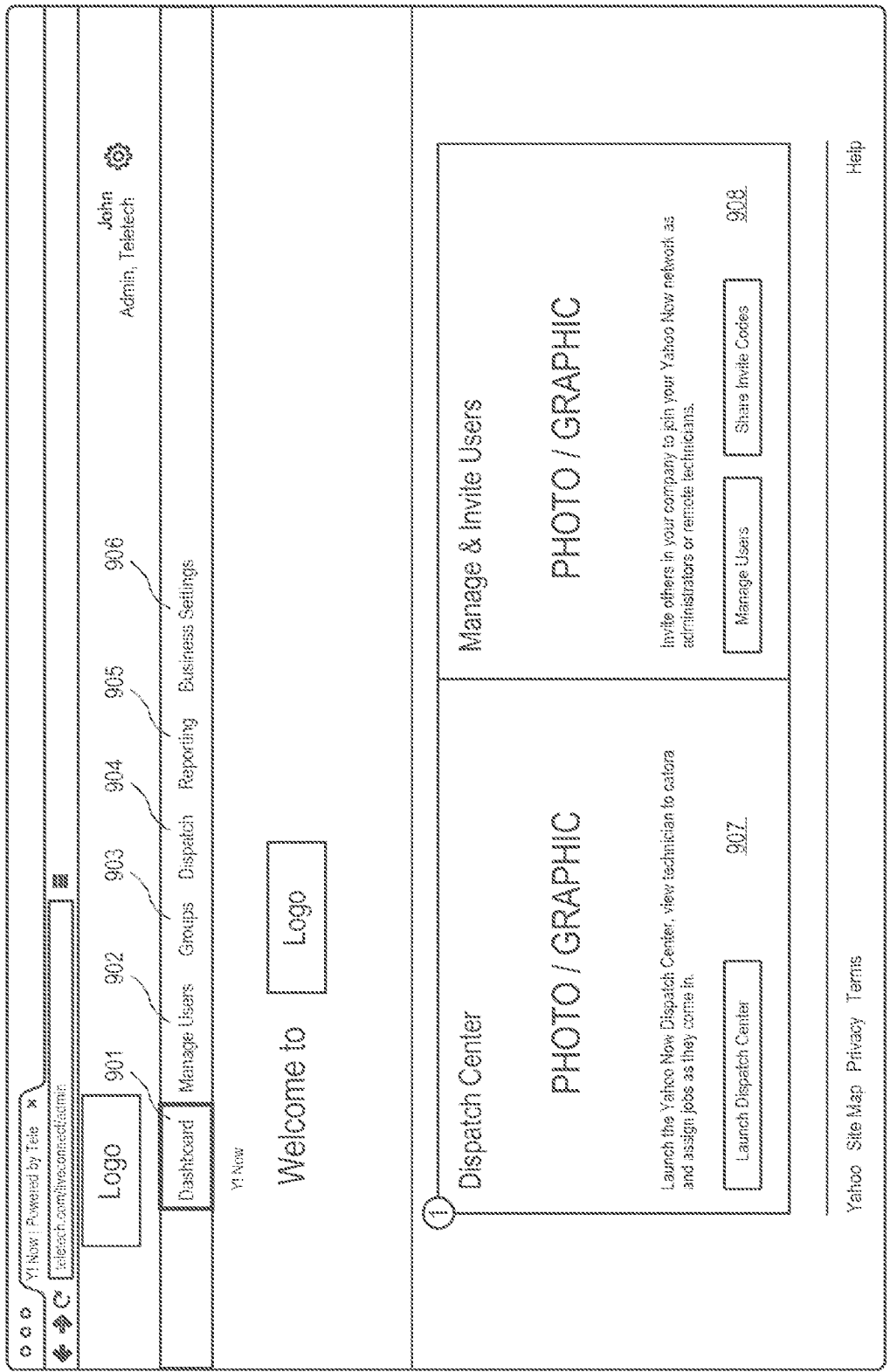

FIGS. 19A-19H are screenshots illustrating an example of a management user interface for managing users according to one embodiment of the invention. The GUIs as shown in FIGS. 19A-19H may be provided by a live content server and/or a live connect server as described above and displayed at a client application of an administrator or dispatcher of a live Ad owner (e.g., client device 156 of FIG. 2). Referring to FIG. 19A, which is a home page of the management interface, the GUI page includes several page selectors or tabs representing dashboard page 901, manage users page 902, groups page 903, dispatch page 904, reporting page 905, and business setting page 906. These pages can be displayed by clicking the corresponding page selectors or tabs 901-906.

Referring to FIG. 19A, the GUI page represents dashboard 901 as a home page. From the home page a user (e.g., administrator) can accesses a dispatch center from display area 907 to manage and dispatch incoming or queued service requests received from the live Ads to proper SMEs that are available. The user can also access SME management system from display area 908, for example, for managing the SMEs and inviting new SMEs to participate a live Ad campaign.

Figure 19B:
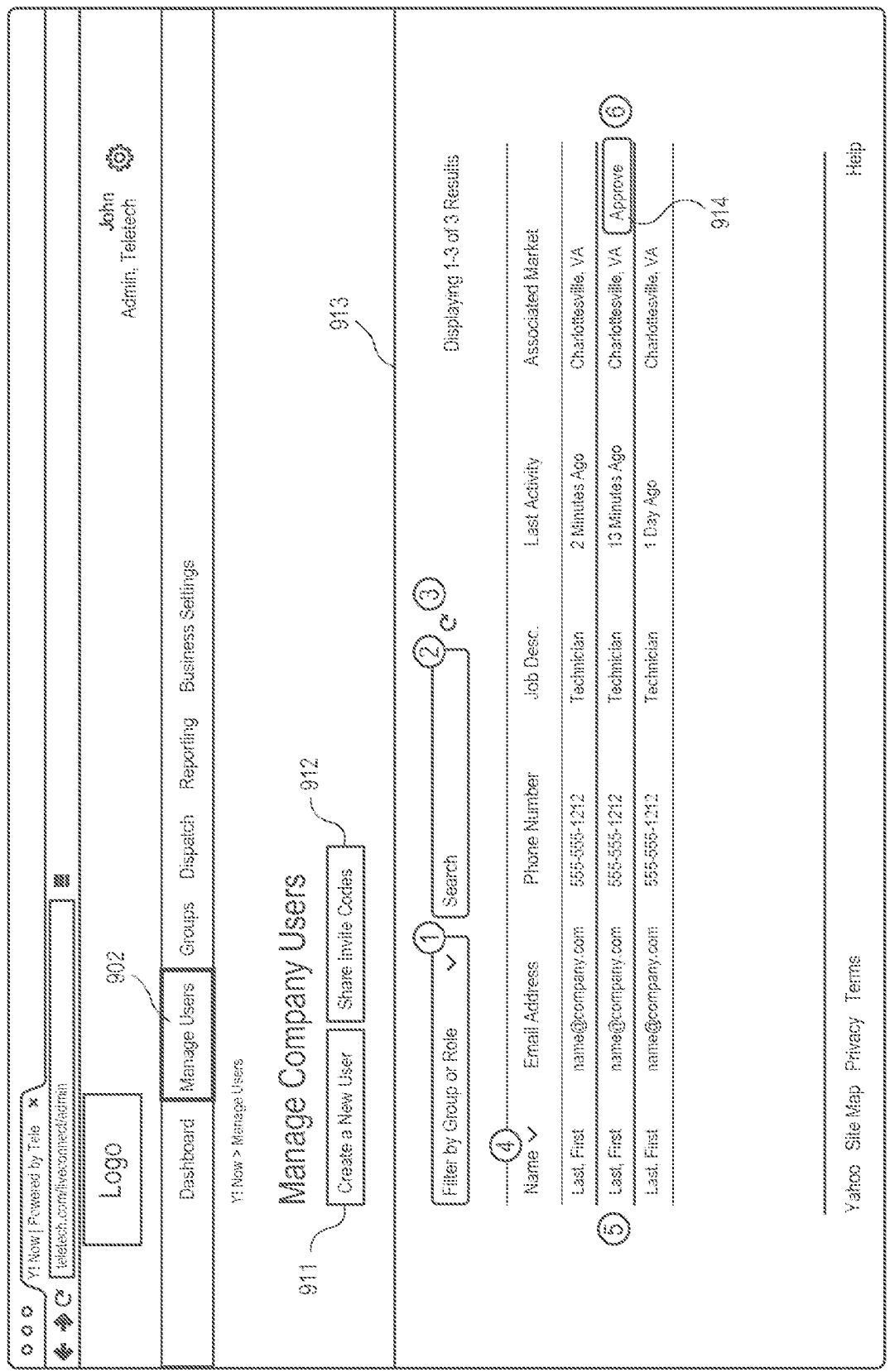

FIG. 19B shows an example of a page for managing users, which can be activated by selecting tab 903 from FIG. 19A. From FIG. 19B, the administrator can manage the SMEs that are associated with the owner of one or more Ad campaigns. The administrator can create a new user as an SME by clicking button 911 and send out an invitation code to a potential new user via button 912. The administrator can create a new user by specifying the name and contact information (e.g., phone and/or email address) of the new user. In addition, the administrator can associate the new user or any of the existing users to a particular group representing a particular Ad campaign. As described above, a user can be associated with multiple groups or Ad campaigns. A photo of the new user can also be uploaded into the system, such that when the user contacts a customer, its photo can be sent to the customer for security reason. The customer can expect the same person to come to his/her premises to perform the job. An invite code can also be sent to the new user, for example, via email or text, as a link to allow the new user to activate the link for registration. From the GUI, the administrator can generate a new invite code, which may be associated with that particular company or a particular one of the Ad campaigns associated with a particular company. The invite code may be valid for a particular period of time for security reasons during which the new user has to respond.

In addition, the administrator can display some or all of the users that are have been registered with the system. The users can be identified by searching based on a variety of categories, such as group or Ad campaign name. If there is a new user that is pending for approval, an approve button 914 will be displayed next to the corresponding new user. For example, if the administrator has sent (e.g., email or text) out an invite code to a new user via button 912 after entering all of the contact information of the new user via button 911, the new user may have received the invite code and registered with the system. That will require the final approval from the administrator after the administrator verifies the new user. The administrator can simply click the approve button to complete the registration of the new user. From FIG. 19B, the administrator can view the detailed contact information of the users, status of the users, recent activities of the users, and market sector or geographic location of the users. The administrator can also select any one of the displayed users to display further detailed information of the selected user.

Figure 19C:
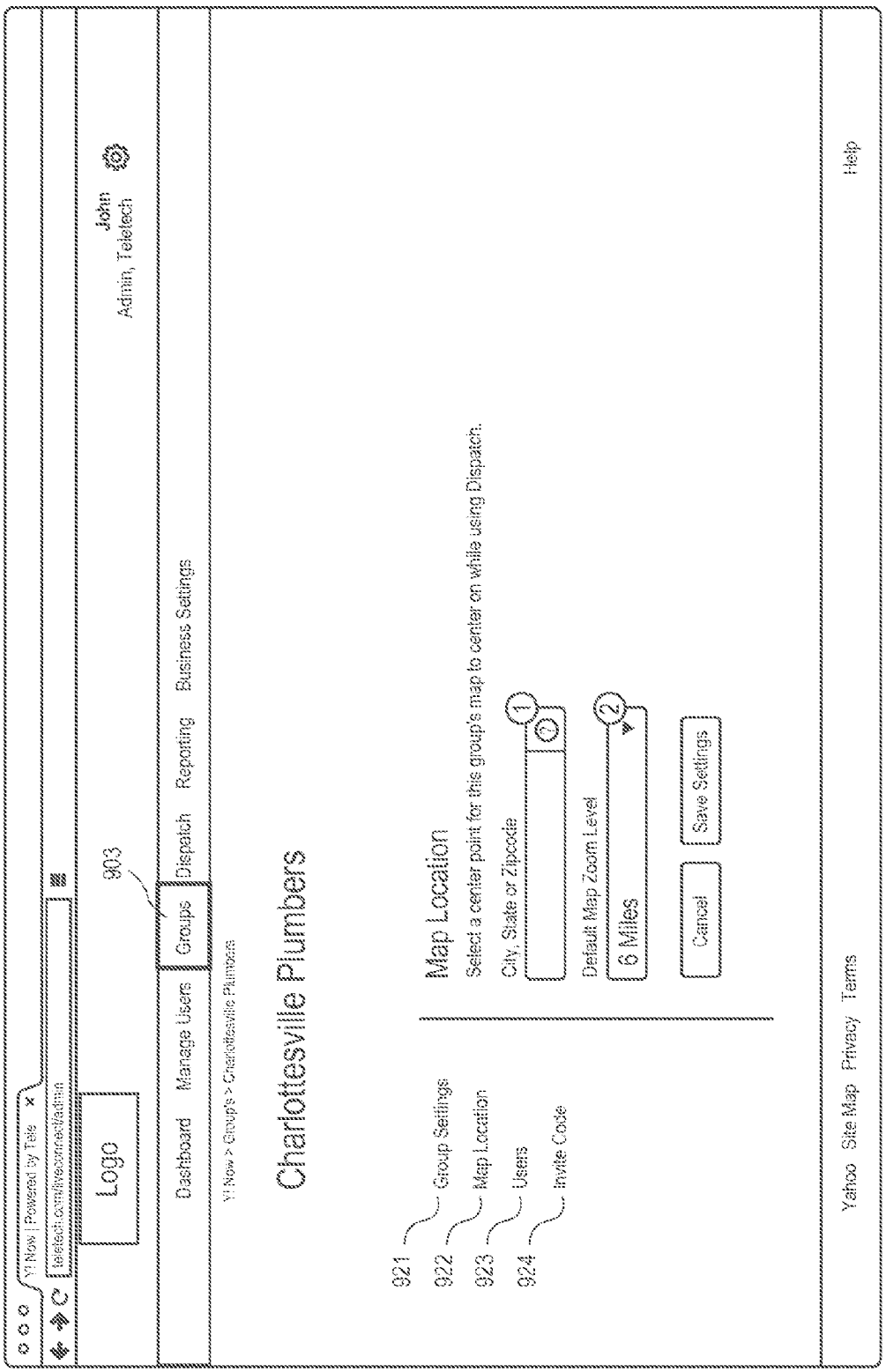

FIG. 19C shows a user interface for group management, where the GUI page can be displayed by clicking tab 903 from any of FIGS. 19A-19B. Referring to FIG. 19C, from the group management page, an administrator can create a new group or manage an existing group. The administrator can configure settings of a group via link 921. The administrator can create a new group or configure an existing group by specifying a name of the group and a brief description of the group. The administrator can also specify a geographic location or territory (e.g., market sector) of a group via link 922. For example, the administrator can provide an address or a zip code which mapped to a specific location of a map, using a location or map service. The administrator can also specify a default map zone level, such that a preconfigured zone level of a map is displayed when a customer selects the corresponding Ad campaign (e.g., FIG. 15A). According to one embodiment, the administrator can also select and associate one or more users or SMEs with a particular group (e.g., Ad campaign) via link 923. From users page 923, the administrator can specify detailed information of the users, including a name, role (e.g., technician), and contact information of the users. The administrator can also send an invite code to invite a new user to join a particular group via link 924.

Figure 19D:
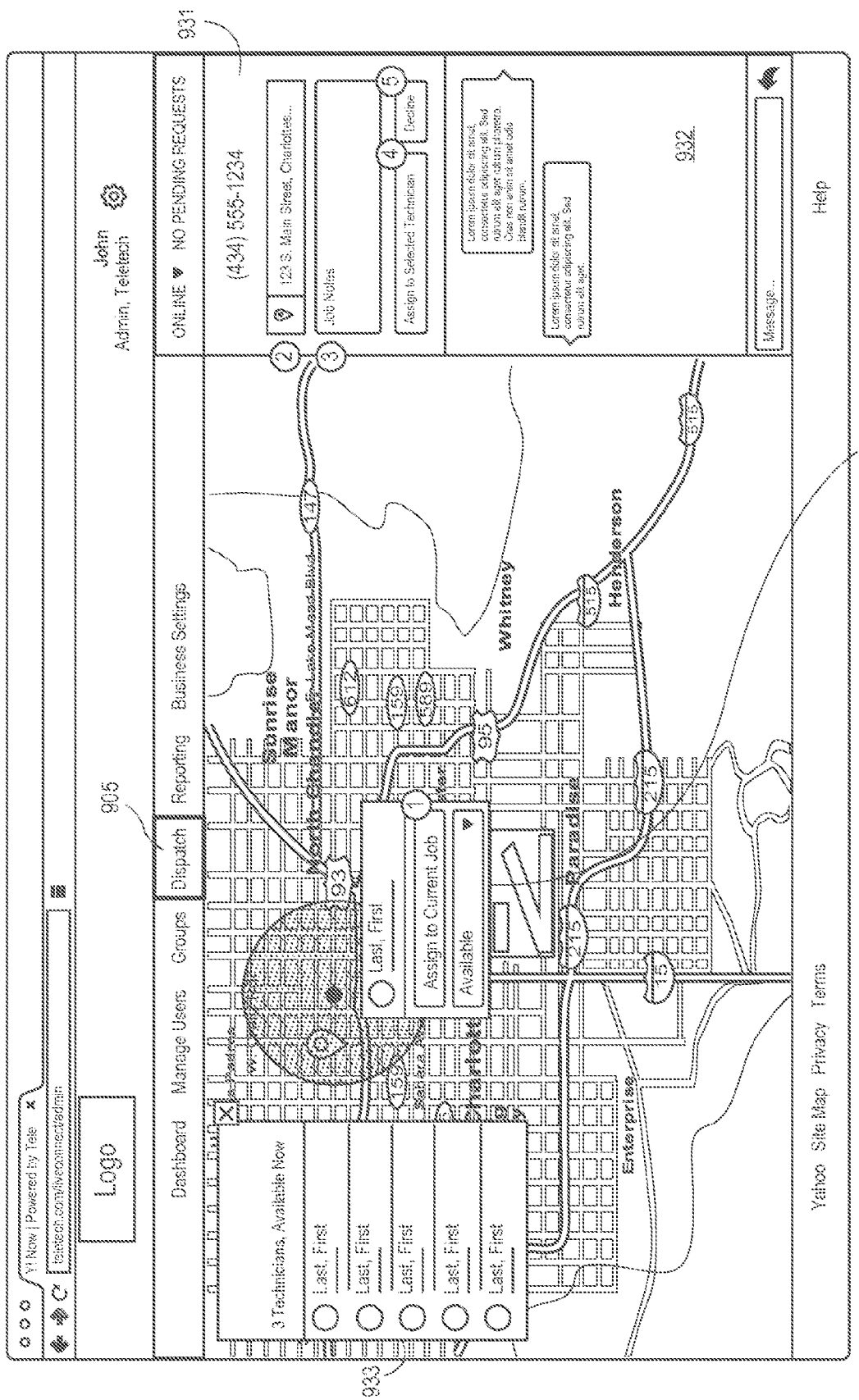

FIG. 19D shows a GUI page for dispatching incoming requests to one of the available SMEs of a particular Ad campaign. An administrator can log into a dispatch center for a particular group or Ad campaign. In this example, referring to FIG. 19D, it is assumed the administrator has logged into the dispatch center via a management interface of a live connect server. During the log in, according to one embodiment, the administrator may have to specify which of the Ads he/she wants to dispatch. In this example, as shown in FIG. 19D, there is an incoming job request that is received at the dispatch center. The detailed information of the job request is displayed in display area 931, including contact information, in this example, a phone number, of the customer and an address of the job site. The administrator can chat communicate, in this example, chatting, with the customer to obtain initial information of the requested job. The administrator can decline the job request or accept and dispatch the job request to one of the available SMEs displayed in display area 933. In this example, display area 933 may display all of the SMEs that are associated with the Ad campaign from the job request received. The statuses of the SMEs are also displayed. The administrator can select one of the SMEs from 933, which will display a geographic location of the selected SME with respect to the geographic location of the job site (e.g., geo fence) in a map, as well as other information of the selected SME in display area 934. From the detailed information of a selected SME in display area 934, the administrator can assign the job request to the selected SME. In response to the assignment, the live connect server routes the request to a client device of the selected SME.

Figure 19E:
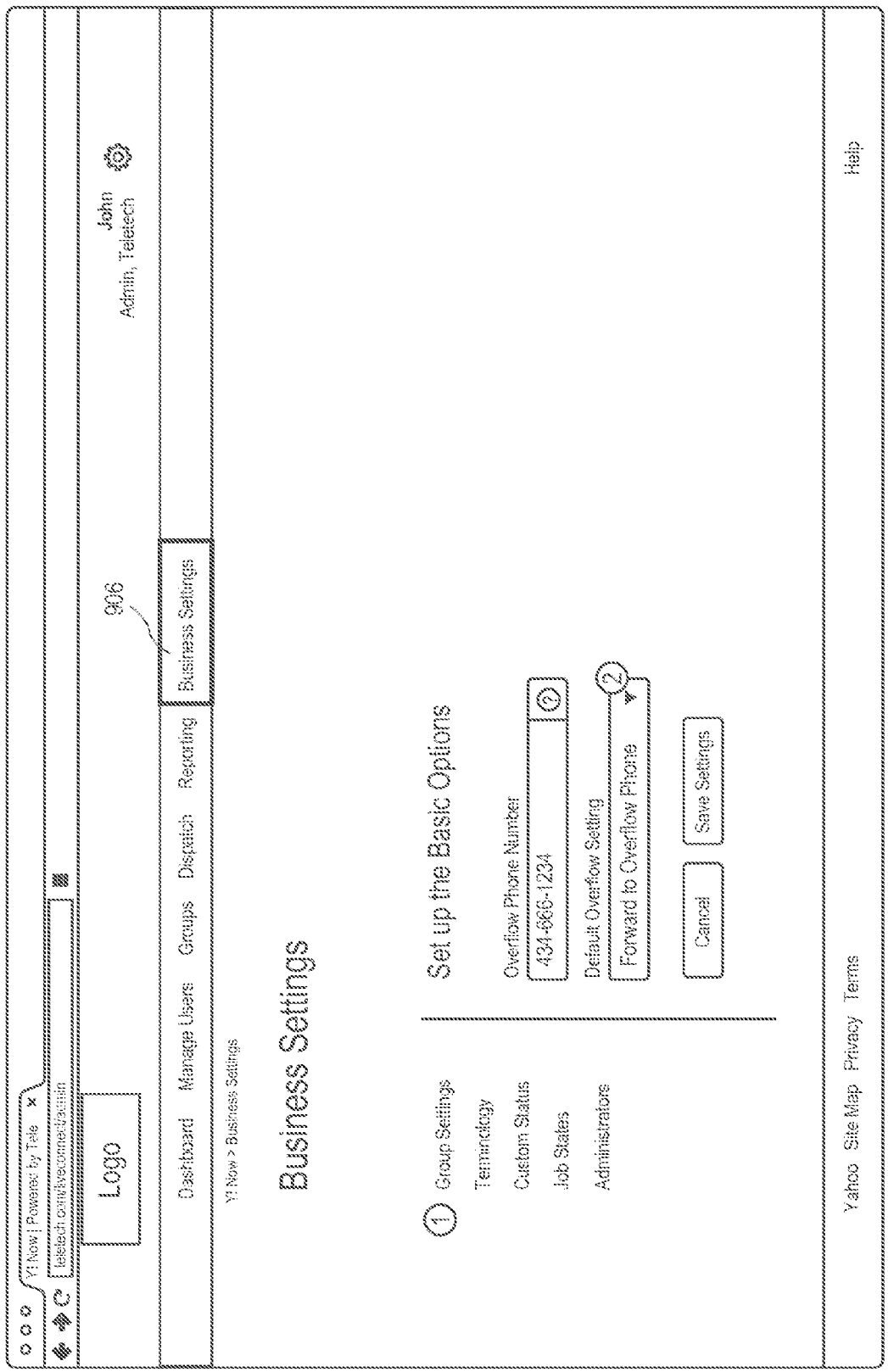
Figure 19F:
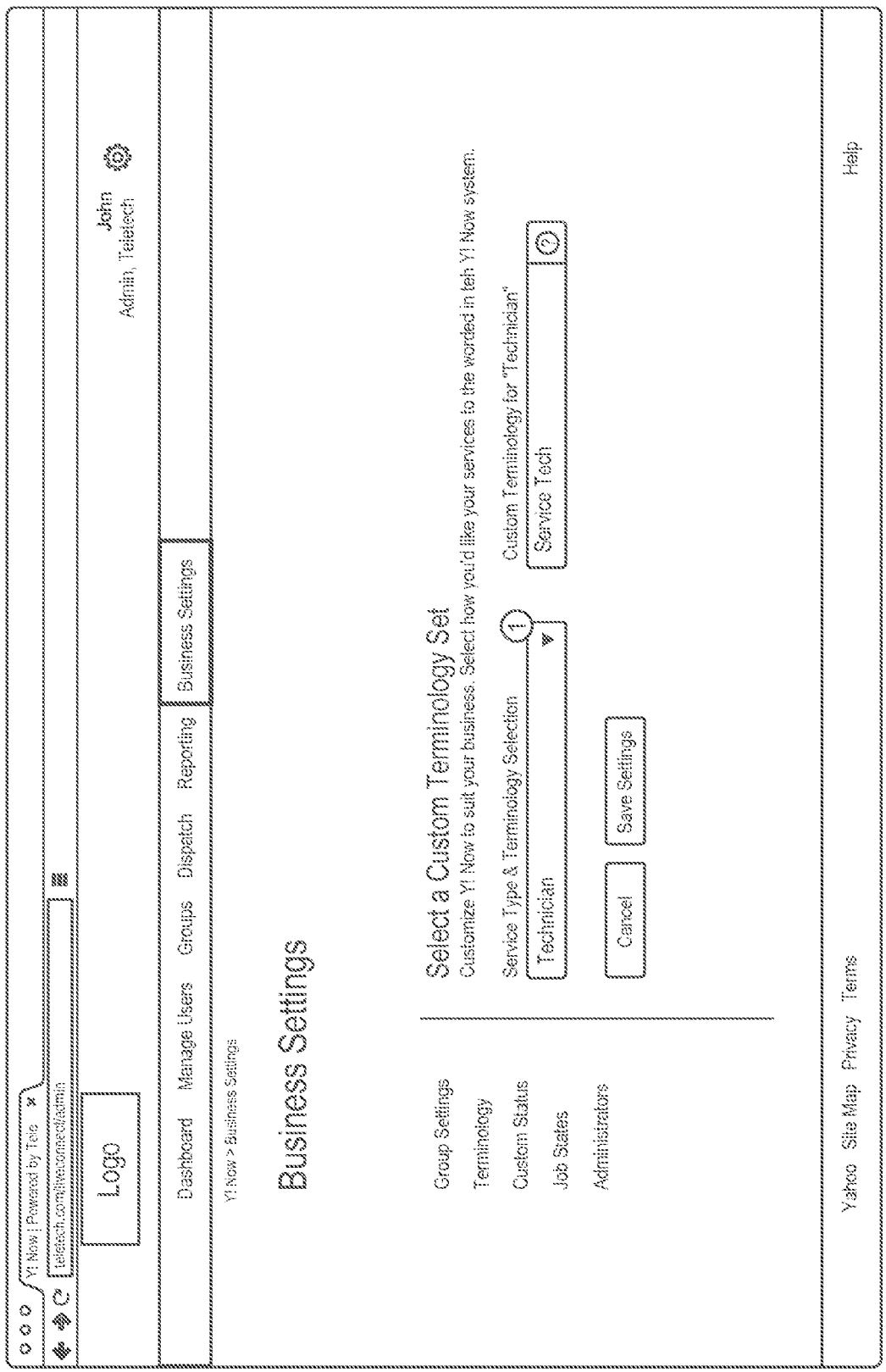

FIG. 19E shows a GUI for setting or configuration, which may be displayed in response to an activation of tab 906 of FIGS. 19A-19D. From the setting page as shown in FIG. 19E, an administrator can set up an overflow SME by providing contact information and/or communication method, such as a phone number or email address, and a default action if no regular SMEs are available or a previously selected SME declined the job offer. The default action can be forwarding to a preconfigured overflow SME or forwarding to another SME that is available. FIG. 19F shows an example of GUI that allows the administrator to define terminology specifically for a particular Ad campaign or a specific company. FIG. 19G shows an example of GUI to allow the administrator to set up certain available status, while FIG. 19H shows an example of GUI to allow the administrator to define customized states. Note that the GUIs as shown in FIGS. 19A-19H may be generated and received from live connect server 153 and/or live content server 152 and presented at a client device of an administrator 156 of FIG. 2, when an administrator log in from its client device. The user interaction with the GUIs as shown in FIGS. 19A-19H may be captured and transmitted from the client device back to the servers 152-153 or vice versa, for example, handled by SME management module 223, rule engine 225 of live connect server 153. Live content server 152 and live connect server 153 may periodically communicate with each other to synchronize the SME information and live Ad information using a variety of communications protocols.

Figure 20:
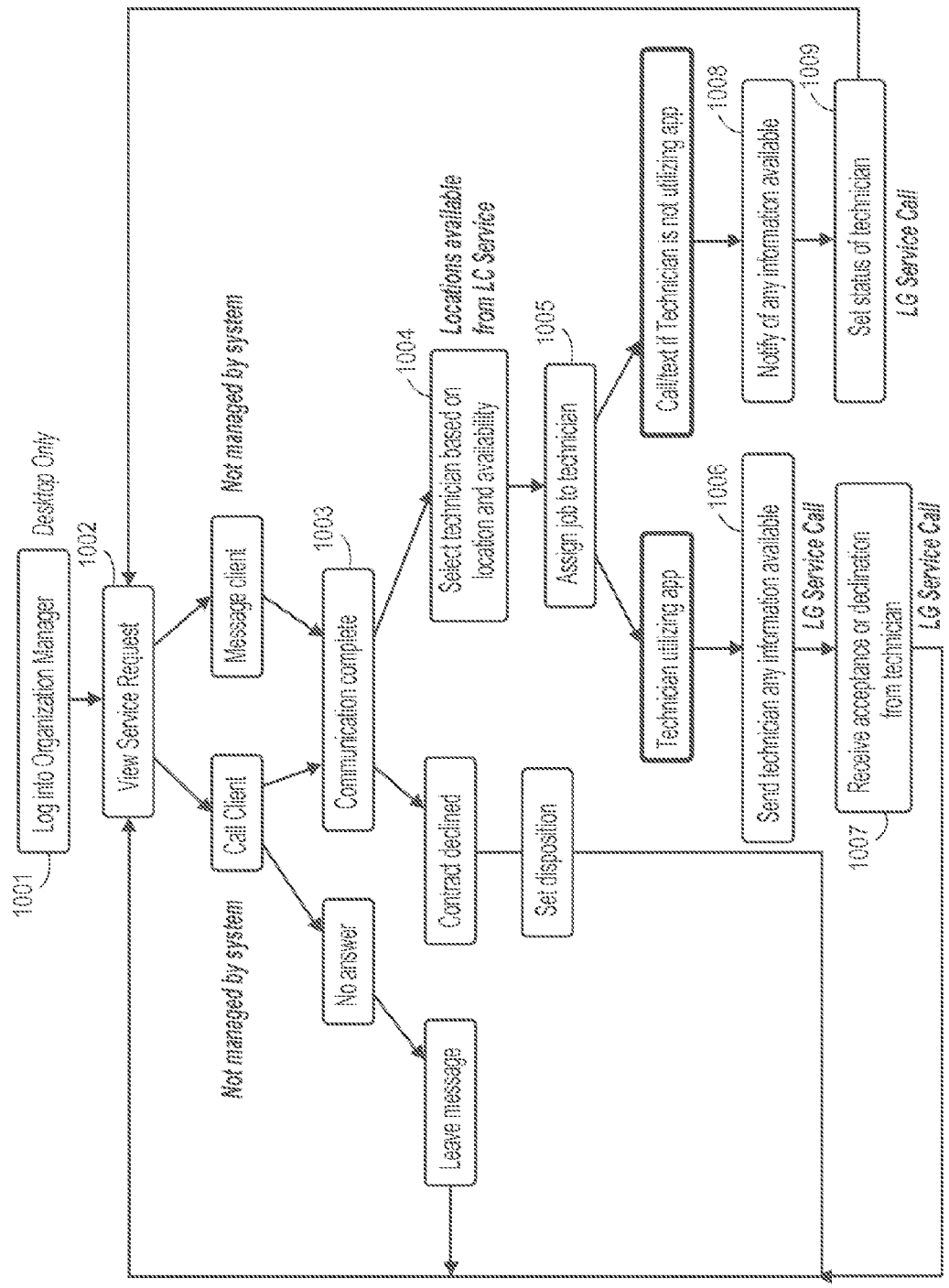
FIG. 20 is a processing flow diagram illustrating an example of administrative processes according to one embodiments of the invention.

FIG. 20 is a processing flow diagram illustrating an example of administrative processes according to one embodiments of the invention. The processes as shown in FIG. 20 may represent the processes represented by GUIs as shown in FIGS. 19A-19E. Referring to FIG. 20, when an administrator such as a dispatcher successfully logs into the live connect server at block 1001, the administrator can view one or more pending service requests from the customers pending to be dispatched to SMEs at block 1002. The pending service requests may be centrally received at the administrator account or alternatively, the pending service requests may be returned from previously assigned SMEs who declined the requests. The administrator can communicate with a customer (e.g., voice, text) of each of the requests at block 1003. If they reach an agreement on the service contract, at block 1004, the administrator can assign the job to one of the SMEs at block 1005. If the selected SME is online, the administrator sends the user information of the customer to the selected SME at block 1006 and a confirmation is received at block 1007. If the selected SME is not online, the administrator can try to contact the SME and set the user information of the customer available at block 1008 and set the status of the SME to unavailable at block 1009.

According to some embodiments, the techniques described above can be utilized in a variety of scenarios. For example, in one scenario, a visitor decides to research a jewelry company that can perform the custom creation of a ring. The visitor is not at home and decides to leverage a mobile device to start the research. A search portal system analyzes the visitor's search requests and provides optimized/refined results to the visitor via the mobile device. The visitor, while conducting the search, is presented with a specialized Ad that presents the types of services the visitor is looking for. The visitor clicks on a "Live Connect" button of the Ad.

In response, a live connect Ad system performs a query to identify a specialist slated to take personalized interactions. The system returns the name and location of an agent(s) who have been available, for example, for the longest period of time (among currently available agents). The visitor is prompted via a browser to talk directly to the available agent (e.g. represented via a name). Optionally, if the visitor selects "no" via the browser when prompted with the named agent, the visitor may be directed to generic advertisement related to "general jewelry" skill (e.g. without live connect features). Alternatively, if the visitor selects nothing via the browser when prompted, the visitor may also be directed to generic advertisement. Other interactions may be possible.

If the visitor selects "yes" via the browser when prompted, the visitor will be sent to the named specialist (or agent). The visitor may be prompted to enter a number to be contacted at (if none available). The system receives the information entered by the visitor and updates session record and processes the requests associated with the information entered.

For example, the system may send a live connect connection notification to the selected specialist in response to receiving the information from the visitor. As the specialist receives the notification, a screen pop up may be presented with the visitor data (if available) and results of an interview (e.g. collected visitor data, phone, etc.). The specialist may accept the notification and is placed into an "unavailable" state for any new requests from a different visitor. The system may call the visitor on the number provided to connect the visitor with the specialist.

The visitor and the specialist may work through steps to complete the visitor requests. The visitor or the specialist may disconnect from the call. The specialist may direct the system to perform operations for wrapping up interactions between the visitor and the specialist. Subsequently, the system may update records on interactions between the visitor and the specialist and closes the case.

In another scenario, a visitor may decide to research a jewelry company that can perform the custom creation of a ring. The visitor is not at home and decides to leverage a mobile device to start the research. A search portal system may analyze the visitor's search requests to provide optimized and/or refined results. The visitor, while conducting the search, may be presented (e.g. via the mobile device) with a specialized Ad that indicates the types of services the visitor is looking for. The visitor clicks on a "Live Connect" button included in the Ad.

The live connect Ad system (or the system) may collect the visitor's geo-location (if allowed by visitor) and other information provided. A business rule engine in the live connect Ad system may apply business rules triggered by the visitor's Ad selection (e.g. via the clicks) and require pushing an interview on the visitor for more detailed information to get to the exact specialist to service the visitor (based on an Ad campaign associated with the selected Ad)

In response, the visitor may be presented with user interfaces for an interview via a mobile browser. The visitor may complete the interview to submit additional information to the system. The system may process information received via the interview to identify the exact specialist for the visitor. For example, the system performs a query to identify specialists slated to take personalized interactions. The system can locate one or more specialists who are present and available. The system may return the name and location of a specialist (s) who have been available for the longest time period. The visitor is prompted via the browser to talk directly to the name specialist returned by the system. If the visitor selects "no" on the browser when prompted, the visitor may be prompted by the system to request a callback for a different day/time. If the visitor selects "yes" on the browser when prompted, information of the visitor may be sent to the named specialist for live connections. Other operations in response to these interactions may be possible.

Subsequent to the selection of "yes", the visitor is prompted to enter a number to be contacted at (if none available from visitor data). On receiving the number or other information from the visitor, the system may update session record and process requests from the visitor. For example, the system may reserve a specialist and send a notification to a device of the specialist. On receiving the notification, the device of the specialist may present a screen pop up indicating the visitor data (if available) and results of the interview (if available).

The specialist may accept the notification and is placed into an "unavailable" state for any new requests from a different visitor. The system can call (e.g. phone call or message push) the visitor on the number provided and establish live connections between the visitor and the specialist. The visitor and the specialist may work through steps to complete visitor requested services.

The visitor (or specialist) may disconnect from the live connections (e.g. a phone call). The specialist may direct the system to perform operations for wrapping up interactions between the visitor and the specialist. Subsequently, the system may update records on interactions between the visitor and the specialist and closes the case.

In another scenario, a visitor decides to research a landscaping company that can perform custom landscaping designs. The visitor is at home and decides to leverage a mobile device (or a desktop device) to start their research. A search portal system analyzes the visitor's search requests and provides optimized/refined results to the visitor via the mobile device. The visitor, while conducting the search, is presented with a specialized Ad that presents the types of services the visitor is looking for. The visitor clicks on a "Live Connect" button of the Ad.

The live connect Ad system (or the system) may collect the visitor's geo-location (if allowed by visitor) and other information provided. A business rule engine in the live connect Ad system may apply business rules triggered by the visitor's Ad selection (e.g. via the clicks) and require pushing an interview on the visitor for more detailed information to get to the exact specialist to service the visitor (based on an Ad campaign associated with the selected Ad)

In response, the visitor may be presented with user interfaces for an interview via a mobile browser. The visitor may complete the interview to submit additional information to the system. Exemplary information solicited via the interview may include a contact number (e.g. phone number), visitor (or customer) name, address of location where work is to be performed, access to location (open, locked, etc.), security or safety settings for accessing to the location (e.g. dogs to be aware of), budget for work to be performed, and/or other applicable information.

The system may process information received via the interview to identify the exact specialist for the visitor. For example, the system performs a query to identify specialists slated to take personalized interactions. The system can locate one or more specialists who are present and available. The system may return the name and location of a specialist (s) who have been available for the longest time period or based on other applicable analysis or selection criteria. The visitor is prompted via the browser to talk directly to the named specialist returned by the system. The visitor may select "yes" on the browser when prompted.

In response, the system may reserve the specialist and send the specialist a notification. On receiving the notification, the specialist may be presented with a screen pop up including data related to the visitor, such as the visitor (or customer) name and the budget for the work to be performed. The system can call (e.g. phone call or message push) the visitor on the number provided and establish live connections between the visitor and the specialist. The visitor and the specialist may work through initial talks and decide that they need to meet at the residence.

The specialist may request that the visitor take a photo of the landscape area and submit to the specialist. The visitor may then take a photo to be submitted. The specialist may receive the photo as a part of the custom (or visitor) data via a mobile application. The visitor may click an "accept" or "approve" button via a mobile browser to allow the specialist to see the additional data (address, access, pets, etc.) collected from the visitor.

The system may identify that the visitor is 5 minutes away from the job location and the specialist may be 20 minutes away from the job location (e.g. based on geo location information tracked). The system may perform scheduling operations to provide both the visitor and the specialist with a note indicating that a meeting time of 30 minutes out is recommended. Accordingly, the visitor may accept the recommended time via the mobile browser. The visitor may also issue permission via the mobile browser to allow the specialist to use GPS (global position system) information for navigation.

The specialist accepts from the mobile app the recommended time. The specialist changes job state (via the system) to "in progress" keeping the specialist "unavailable" from receiving a new notification from an Ad click by a new visitor (if no specialist available, Ad is not shown via search by visitors). The system creates a dynamic geo-fence at the residence (e.g. the job location) of the visitor for notification upon arrival of the specialist. The specialist may be prompted to load GPS application to navigate to the residence. Either the visitor or the specialist may disconnect from the live communication (e.g. a phone call).

On arrival of the specialist at the job location, the system can identify or detect that the specialist has reached the residence based on the crossing of the geo-fence placed around the residence. The system may send the visitor a notification (e.g. via a web browser app, SMS or other applicable messaging services) related to the specialist, such as credentials and a photo. The specialist and the visitor meet at the residence door and proceed to the back yard where the visitor would like to have the expected work done. The specialist proceeds to perform the work. When the work is completed, the specialist may initiate wrap up operations of the interactions between the visitor and the specialist.

For example, the system may update records on interactions. The visitor may be prompted by an application (e.g. via embedded code delivered by a mobile browser) to post comments to a social network about their experience with the specialist/business. The visitor is very happy with experience and posts comments to Facebook™, Twitter™, and/or other social network sites. The specialist may set the job state of the work to "complete" (based on the business taxonomy defined in the ad campaign) which makes them available for a new notification for another visitor ad click.

The system may perform follow on actions. For example, the system can send notification to the visitor with a thank you note from the specialist/business. The system may order and deliver quotes to the visitor for additional work. The system can create a case to kick off additional work to be done. Alternatively or additionally, the system may perform scheduling operations to create a timed plan for the work/order.

In a further scenario, a visitor decides to see what are being played at local theaters. The visitor is mobile using a mobile device for the search. A search portal system analyzes the visitor's search requests and provides optimized/refined results to the visitor via the mobile device. The visitor, while conducting the search, is presented with a "live connect" Ad related to the search via an Ad system integrated with a live connect Ad system (e.g. the system) providing the "live connect" Ad.

The visitor wanting to see the play clicks on the "live connect" Ad. In response, the system performs a query to identify a box office specialist present and available to take an interaction with the visitor. The system locates a specialist who is present and available. The system may return the name of the specialist who has been available longest or meets some analysis criteria (e.g. including geo location matching).

The visitor may be prompted via the mobile browser to talk directly to the available specialist (e.g. indicated by name). The visitor selects "yes" button via the mobile browser when prompted to proceed. The visitor may be further prompted to enter a number (e.g. phone number or other applicable contact information) to be contacted at (if none available from visitor data).

On receiving the information provided by the visitor, the system updates session records and processes the visitor's requests. The system can reserve a specialist and send a notification is sent to the specialist. A screen pop up with the visitor's data (if available) is presented to the specialist when the notification from the system is received. The system may initiate a call to the visitor based on the number provided to establish a live connection with the specialist.

The visitor and the specialist work through the ticket sale for play over the live connection. The system creates a dynamic geo-fence at the plays venue (or the theater). The visitor (or specialist) disconnects from the call. The visitor heads to the theater for the show.

Once the visitor is physically close to the theater, the system detects triggering of the geo-fence by the visitor's geo-location which has been tracked or monitored. The system can generate geo events based on the triggering of the geo-fence. The geo events may be forwarded to the theater's ticketing system to update inventory status of the tickets for the play.

For example, the theater is updated with information about the visitor's arrival and flags that the seat will be occupied. The theater can track all sales and visitor arrivals such that if the visitors are not present within a specific time close to show time of the play, the theatre can update the Ad to increase the discount in order to sell the seat for a higher yield by show.

After the play ends, the visitor is prompted by a client application (e.g. based on embedded code delivered via a mobile browser) to post comments to a social network about the play and their experience with the theater's ad service. The visitor is very happy with experience and posts comments to Facebook™, Twitter™, and/or other social network sites.

In some embodiments, a visitor selects a live connect Ad directed to a named specialist. Data analysis may be performed to identify a best route to provide requested service to the visitor. Business rules may be leveraged for soliciting additional data entered or volunteered by the visitor. The data analysis may be based on various data including geo locations of the visitor and available specialists. Pre-qualification information may be provided by the visitor via an interview mechanism, for example, to determine whether or which specialists are available to provide requested services.

Immediate live message communication (e.g. based on short messaging service) or live voice calls may be established via the visitor's selection. Multiple factors may be included in selecting which specialist and/or which route for providing the service. The factors may include current geo locations of the visitor and available specialists, business rules configured for specialist selection, applicable schedules provided by the visitor for a face to face meeting with the specialists, and/or other applicable criteria. Directions may be automatically provided in real time for the authorized (or selected) specialist to travel for scheduled meeting with the visitor for providing the requested service. For example, geo-fencing capability may be enabled (e.g. via business rules) for visitor notifications triggered by arrival of the selected specialist near the job location. Specialist specific information may be pushed to the visitor upon arrival at the visitor location. Interfaces for a real-time social feedback may be presented to the visitor via a live connected ad event regarding the specialist and business providing the requested service to the visitor.

Figure 21:
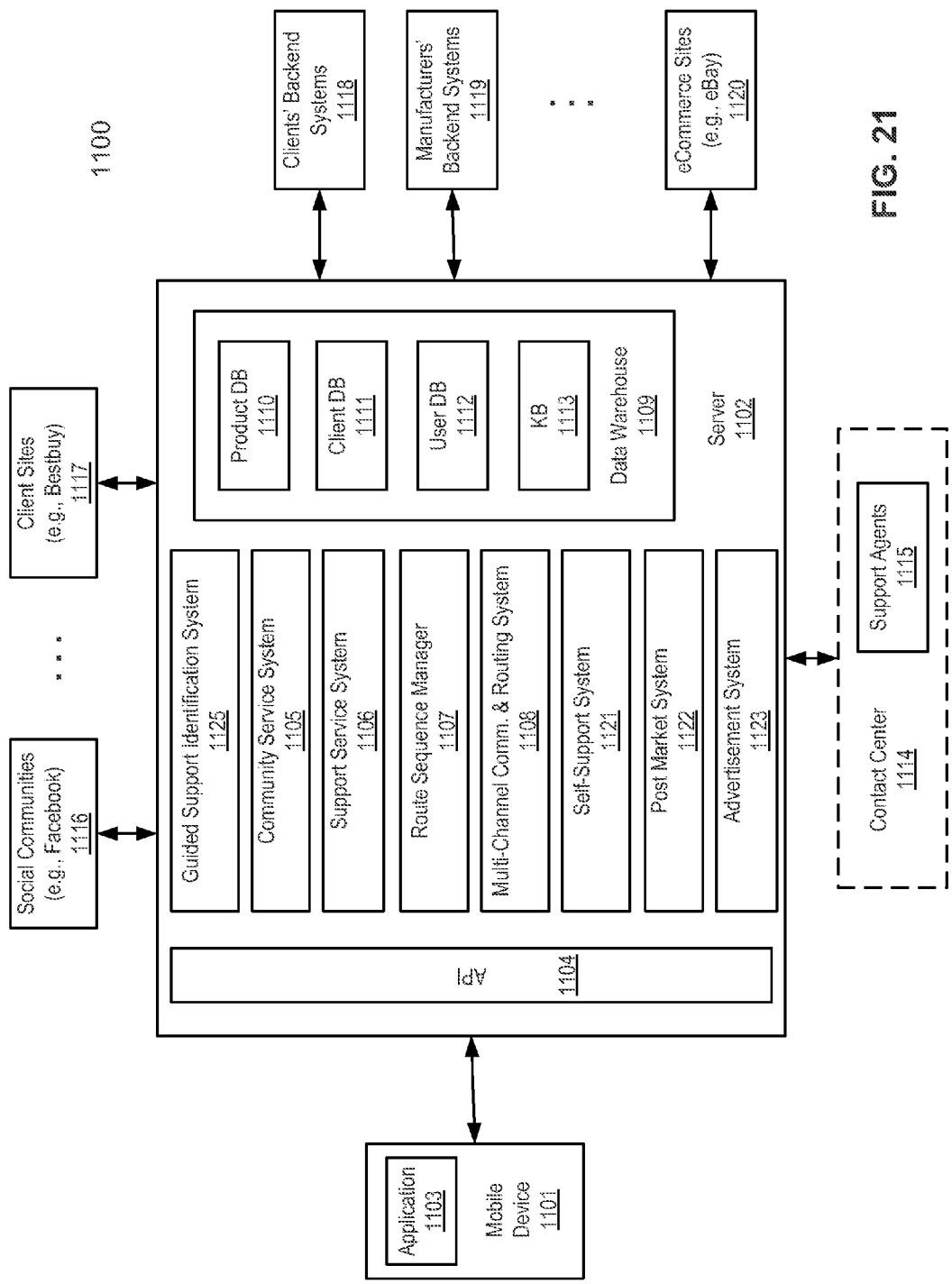
FIG. 21 is a block diagram illustrating a system for providing support services to products according to one embodiment of the invention.

As described above, a live connect server may be integrated with or communicatively coupled to another server representing a support center to utilize the existing or advanced resources or infrastructure. FIG. 21 is a block diagram illustrating a system for providing support services to products according to one embodiment of the invention. System 1100 can be implemented with a live connect server described above. Referring to FIG. 21, system 1100 includes a mobile device 1101 of a user, customer, or individual communicatively coupled to service center 1102 over a network. The network may be any kind of networks, such as a wide area network (WAN) (e.g., the Internet), a local area network (LAN), or a combination of both. Mobile device 1101 may be any kind of mobile devices including, but is not limited to, a laptop, mobile phone, tablet, media player, personal digital assistant or PDA, etc. Communication connections between devices can be established either by routing through the network or by direct initiation of calls from one end device to another by a mobile application communicating with a server who selects the target. For routed calls the network provides the state of the connection and hence the call state component of agent availability. For direct initiation, some device environments provide for notification of call state and others do not. The Apple Facetime™ implementation in the iOS operating system, for example, allows video calls to be established by API, but does not provide subsequent information about the call. In that case we deduce whether a call has been successful and when it ends from the behavior of the operating system. A timer is set when the FaceTime™ call is invoked by the application and examined when control is returned to the application. From the timer duration we determine whether the call was successful and when it ended. Note that throughout this application a mobile device is utilized as an example of a client device for the purposes of illustration only; other devices such as a desktop or server may also be applied herein.

Service center 1102 may be implemented in a centralized facility or server with data processing hardware. Alternatively, service center 1102 may be implemented in multiple facilities or servers in a distributed manner (e.g., cloud-based service platforms). Service center 1102 provides services to a variety of products or services from a variety of clients or vendors. For example, service center 1102 may be a caller center handling a variety of support call services on products or services for a variety of goods and service providers. A client may be a manufacturer, a distributor, a retailer, a service provider or broker, a purchasing facility (e.g., Amazon™, Expedia™, or ISIS™), or a combination thereof.

In one embodiment, service center 1102 includes one or more service application programming interfaces (APIs) 1104 to communicate, over a network, with other systems such as mobile device 1101, client's site 1117, social communities 1116, contact center 1114 including agents or experts 1115, client backend systems 1118, manufacturer backend systems 1119, eCommerce sites 1120 and other auxiliary systems (e.g., billing system). Service center 1102 can handle service requests from customers of multiple clients. For example, service center 1102 may handle customer service requests for a number of retail sales companies, sales/post sales calls for catalog sales companies, and patient follow-up contacts for health care providers. In such a structure, the service center may receive service requests directly from the customers or through client support management systems.

In one embodiment, service center 1102 further includes community service system 1105, support services system 1106, route sequence manager 1107, and data warehouse 1109. Support services system 1106 is responsible for handling support services requests from the users, including identifying and registering a product, creating an transaction case context, selecting and assigning a customer representative (also referred to herein as an agent, specialist, or expert) to provide support services to the users, and managing work flows, etc. An agent may be selected based on a skill set or expertise of the agent in a skill, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application.

Figure 22:
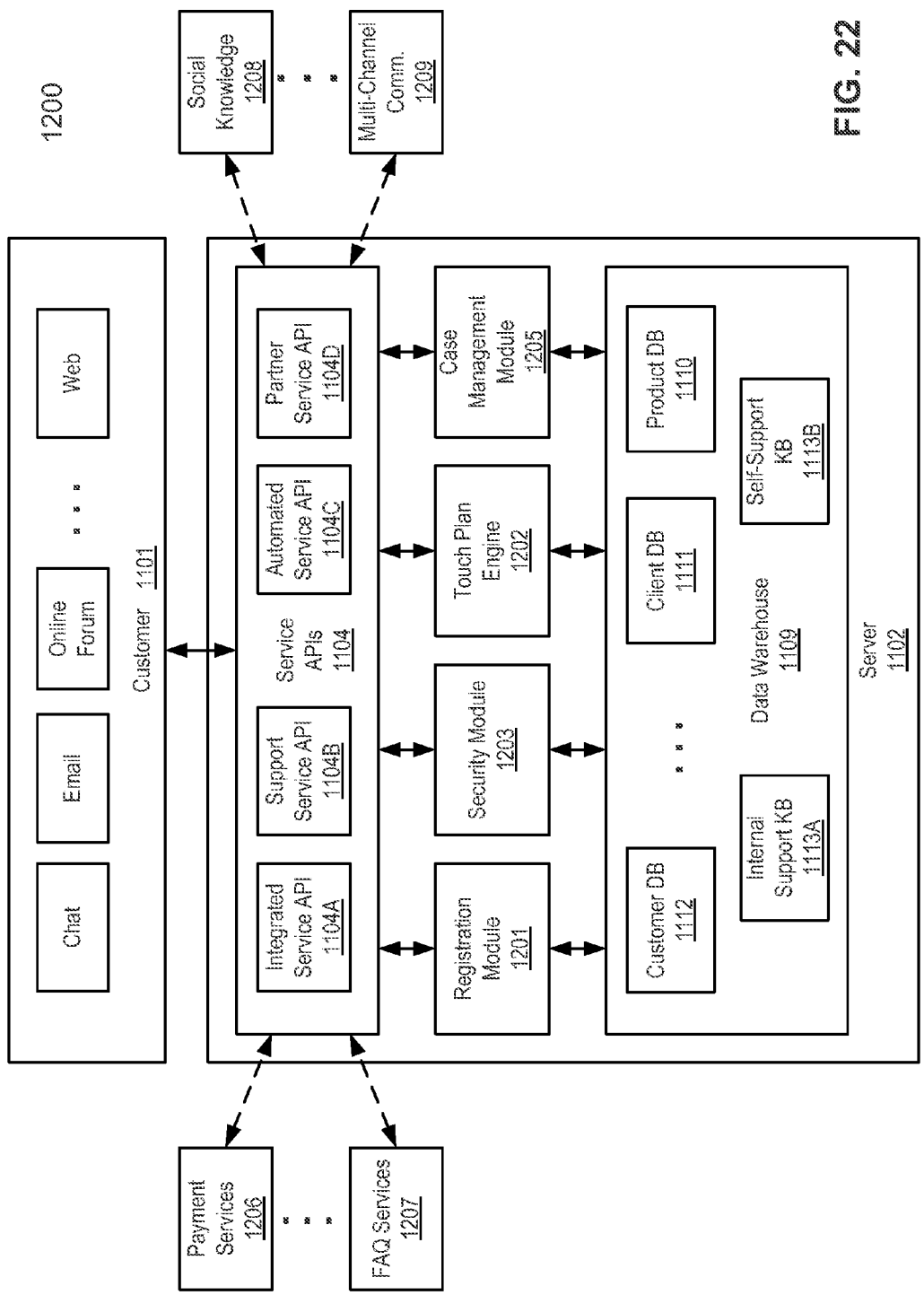
FIG. 22 is a block diagram illustrating an example of a support service system of a service center according to one embodiment of the invention.

FIG. 22 is a block diagram illustrating an example of support service system of a service center according to one embodiment of the invention. For example, system 1200 may be implemented as a part of system 1100 of FIG. 21. Referring to FIG. 22, system 1200 includes service APIs 1104 to allow customer 1101 to reach support center via a variety of communication mediums such as chat, email, online forum, Web, video, voice, etc. Customer 1101 may initiate a contact with support center 1102 via a mobile application (also referred to as a one-touch application) installed on the customer's mobile device as described above. Service APIs 1104 may include a variety of subsets of APIs such as integrated service API 1104A, support service API 1104B, automated service API 1104C, and partner service API 1104D. Some or all of these APIs 1104A-1104D may be implemented as cloud-based service APIs, where the service APIs may be maintained by a third party service provider as a part of software as a server (SaaS) on a subscription basis.

In one embodiment, integrated service API 1104A may be utilized by certain integrated service providers such as payment services 1206, dispatch services, location services, tracking and delivering services, short messaging services (SMS), social networking and blogging services (e.g., Twitter™), and customer relationship management (CRM) services (e.g., Salesforce™), etc. Automated service API 1104C may be utilized by AI Artificial Intelligence services, BOT services automated services (like roBOT) that mimic the actions or activity of a human processes or activities making the user think they are talking to a live person, frequently-asked question (FAQ) services 1207, survey services, eLearning services, etc. Partner service API 1104D may be utilized by certain partner entities of the support center such as social knowledge 1208, multi-channel communication system 1209, and social CRM (e.g., Lithium™) etc.

In one embodiment, support service API 1104B can be utilized by customer 1101 to reach the support center. Support service API 1104B may be utilized, for example, via a one-touch application launched from a mobile device, to register a user, register a product, access knowledgebase (e.g., KBs 1113A-1113B), and obtain a support service from an agent, AI, BOT service, etc. Initially, when a customer downloads and installs a one-touch application on its mobile device, the customer can access support center 1102 via support service API 1104B to create a user account, which may be performed by registration module 1201. Subsequently, the customer may also log into the account via support service API 1104B, which may be authenticated by security module 1203, to register a product and/or to retrieve a list of registered one or more products that have been registered with support center, using certain techniques described above.

When there is a need to contact support center 1102 on a product, the customer can activate the one-touch application from its mobile device or press a one-touch button from a Web site, which will access and log into support center 1102 via support service API 1104B, where the customer and/or the mobile device can be authenticated by security module 1203. In addition, case management module 1205 is configured to create a unique case ID that uniquely identifies the instant support case. The case ID may be created based on a combination of at least some of the product identifiers (e.g., serial number, barcode, quick response (QR) code, high capacity color barcode (HCCB) code, receipt transaction ID), client information (e.g., retailer ID, manufacturer product ID), customer information (e.g., personal information, username, password, mobile device ID), and other information (e.g., time, date).

In one embodiment, touch plan engine 1202 is configured to create a touch plan which is identified and tracked by the case ID. The touch plan may be created according to one or more business rules or templates of the client. The touch plan represents a roadmap, an outline, a tracking record, or case context for the instant support case. The touch plan may also include or reference to other aiding information, such as, product information, product intelligence information, customer history data, client information, and manufacturer information, etc., which may be retrieved and compiled from various informational sources such as customer database 1112, client database 1111, product database 1110, knowledgebase 1113A-1113B, client and/or manufacturer backend systems, etc. The touch plan is then forwarded to an agent that has been assigned to the instant case to allow the agent to have all the necessary information to enable the agent to provide the best customer experience. The agent may be assigned based on a variety of factors, such as, skill set, expertise, demographic location, language, prior customer relationship, etc.

Data warehouse 1109 includes, but is not limited to, self-support KB 1113B, internal support KB 1113A, client database (DB) 1111, product database 1110, and customer database 1112. Internal support KB 1113A may store any support information or communications between an agent and a customer. Self-support KB 1113B contains published information extracted from other informational sources, such as internal support KB 1113A and other systems (e.g., client backend systems and manufacturer backend systems). Self-support KB 1113B allows a customer to browse in an attempt to find a solution for the customer's problem, hopefully without having to contact a live support agent. Client database 1111 may store any client related information, including a client profile for each client supported by support center 1102. For example, client database 1111 may store client's preference of communication channels to be utilized between a customer and an agent. Client database 1111 may also contain membership information of the customers.

Product information store 1110 may store any user manual or technical manual of products. Product detailed information may further include complementary products and services, availability, etc. Such information may be drawn from external systems such as client's backend systems and/or manufacturer's backend systems. Customer DB 1112 may store any customer related information such as personal information (e.g., name, address, phone numbers, sex, age), security credential, device ID of its mobile device, etc. Customer DB 1112 may store any product that has been registered by a customer. Customer DB 1112 may further store information regarding any interaction between a customer and an agent of previous support sessions, such as topics, detailed discussions, time of the discussions, contact mechanisms used, reasons of the support, products or services involved in the discussions, last agent or expert the customer interacted with, etc.

Other databases may also be included and utilized. For example, an agent or expert database may be maintained for the purpose of selecting an appropriate agent or expert in response to a support service from a customer. An agent and expert information database may include a profile for each agent or expert, respectively, that includes individual agent or expert identifier, individual name, address, communication device information, personal information (e.g., age, sex, hobbies, physical condition, spoken languages, ethnicity, geographic area of expertise, etc.), individual skills and/or areas of expertise. The agent/expert database may further include day(s) and time(s) during which and/or areas in which the agent/expert may be contacted to service customer contacts and/or a number of times over a selected period in which the agent/expert may be contacted to service customer contacts (e.g., similar to presence information).

In addition, a service statistics database may also be maintained. A service statistics database may represent any database that stores data related to the operation and management of the support center system 1102. Data such as the number of customers in queue at a certain date and time, the duration of support contact in queue, the rate of contact abandonment, and the use of communication resources are stored in the statistics database. Note that the databases and data stores are shown and described for the purposes of illustration only. These databases and data stores can be implemented or configured in a variety of configurations, which may be implemented locally or remotely over a network. Note that some databases or data stores may be implemented as a single database or store or multiple databases or stores.

In one embodiment, registration module 1201 is responsible for registering a customer and/or a product of a customer, where the customer's personal information or preferences may be stored in a customer profile store as part of customer DB 1112, while the registered product information may be stored in customer DB 1112. For example, when a customer installs a one-touch application on its mobile device, the customer typically performs an initial login to set up a user account, including a username and/or password, as well as customer's preferences (e.g., communication channel preferences). In one embodiment, registration module 1201 can also be used to assist in registering a user for other accounts such as a loyalty account across one or more loyalty programs, a rewards program, etc. This information may be stored in customer DB 1112. In addition, a unique device ID such as a MAC address or IMSI code may be captured and stored in customer DB 1112. As a result, when the customer subsequently launches the one-touch application, the customer can be automatically authenticated by security module 1203 based on this information without requiring the customer to provide the same information again.

According to one embodiment, when a one-touch application is activated or launched from a mobile device by a user, the one-touch application is configured to communicate with service API 1104. Service API 1104 invokes security module 1203 to authenticate the user based on the information (e.g., MAC or IMSI) transmitted from the one-touch application without requiring the user to specifically provide user information.

Once the user has been authenticated, according to one embodiment, service API 1104 transmits a personalized page having a list of one or more products from a customer asset store (not shown) that have been registered to the user. The list of the registered products may be displayed on a display of the mobile device, where each product is associated with one or more communication channels that are available for the user to contact an agent of the support center. In one embodiment, the availability of the communication channels is determined based on the user preference obtained from customer DB 1112 and the client/vendor preference from client database 1111 at that point in time. Such user preference and client/vendor preference may be configured in a user profile and client/vendor profile, respectively, which may be maintained by the support center.

In response to a selection of one or more of the available communication channels received at the service API, according to one embodiment, a unique case identification (ID) is instantly created by case management module 1205 to uniquely represent a current instant of the support case. In addition, a touch plan is created by touch plan engine 1202 and tracked by the unique case ID, where the touch plan represents a roadmap or outline of the corresponding support case activities to be performed throughout the life of the touch plan. The touch plan is updated regarding all activity of the user and is forwarded to an agent assigned to the current case and a communication session is established between the assigned agent and the user via the selected communication channel. Throughout the session the touch plan is updated on all activity between the user, agent and their respective applications.

An agent may be selected based on a variety of considerations, such as a skill set or expertise of the agent, as well as whether the agent has previous experience with the same customer. The touch plan may include one or more references linked with all the information related to the current instant support service, such as related product information, client information, customer information, and support history with the customer, etc., such that the agent can provide the best possible services to the customer. The touch plan may further include suggestion or prediction of products or services that the agent can provide the customer an alternative solution. The suggestion or prediction may be generated by a persuasive engine (not shown) based on the product information and the customer's interactive history, etc. The interaction between the user and the agent is logged by a logging module (not shown) and tracked based on the touch plan and the unique case ID, which may be stored in an interaction history database, for example, for subsequent analysis by an analysis module.

Processing logic associated with the touch plan (e.g., touch plan engine, case management module, or some other logic) also monitors for positive and negative activities from the user, the agent and respective applications. If a negative event is occurring the processing logic can perform adjustments according to the touch plan in knowledge provided, agent scripting spoken to the user and many others in a manner such to turn the interaction positive (e.g., adapt to changing conditions and circumstances). If the activity is positive the processing logic can provide an additional activity in and around product or service upsell, cross sell, upgrades, and product sales, etc. The positive and negative activity monitoring and adjustments are not limited to a user and agent, they can support any form of interaction even long running interactions that exceed the user activity for any period of time.

In some situations, according to one embodiment of the invention, the touch plan may include information that identifies a relationship between two products or services that have been purchased via a client (e.g., purchasing house).

When a first product/service changes, the support center may determine that a second product/service may need to change as well based on the touch plan. Accordingly, a proactive service module (not shown) is configured to proactively notify the user regarding the possible change of the second product/service and offers support services for the second product/service, without requiring the user to initiate a support call. A suggestion or offer can be made to the customer by a persuasive engine based on the information obtained from databases 1111-1113 of data warehouse 1109.

According to one embodiment, prior to contacting an agent, a list of support options may be presented to the user, including a link to a publication forum that may contain one or more solutions to a problem associated with the user. Such solutions may be generated by a publication module (not shown) by extracting certain information from knowledgebase from a variety of informational sources, such as, for example, internal support KB 1113A, client/vendor KB (e.g., client database 1111 and client backend system), manufacturer KB (e.g., product database 1110 and manufacturer backend system), online community KB, and/or customer interactive history KB, etc. As a result, a user may find a solution from the publication forum and does not need to contact an agent of the support center, which in turn may lower the cost for the client and/or the customer. This is also referred to as a call avoidance feature. Certain information from data warehouse 1109 may be queried and reported by a reporting module.

Note that components or modules shown in FIG. 22 are described for the purpose of illustration only; more or fewer components or modules may also be implemented. For example, a customer satisfaction system (CSAT) may also be implemented within support center 1102. A CSAT system provides a feedback form to a customer, through a variety of communication channels at the completion of a request or a query made by the customer. The feedback form filled out and provided by customers is stored, reviewed, and analyzed by the CSAT system. All feedback forms stored in the CSAT system are used as a tool to conduct a customer service related survey. The feedback forms are, further used to enhance the service provided by support center 1102.

Referring back to FIG. 21, in one embodiment, community service system 1105 is responsible for communicating with social communities 1116 via an API, for example, to post a message received from a user and to route the responses received from social communities 1116 back to the user. Service center 1102 further includes other components such as a post market service system 1122, which is responsible for handling post market activities associated with the registered products, including selling a registered product on eCommerce sites 1120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, post market service system 1122 of service center 1102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for routing messages amongst multiple parties associated with a media presentation, the method comprising:
  receiving, at a first server from a second server over a network, a first request of a first user for communicating with an agent concerning a content item of a media presentation presented to the first user, wherein the first request includes a content identifier identifying the content item presented by the second server;
  in response to the first request, identifying from a client database one or more agents that are associated with the content identifier, the client database storing content identifiers identifying a plurality of media presentations, wherein the media presentations are owned by a plurality of media presentation owners as clients to the first server;
  determining a status of each of the identified agents from an agent database, including determining whether each of the identified agents is available to communicate with the first user to discuss the content item at a point in time, wherein the agent database stores agent information of a plurality of agents;
  transmitting a list of one or more agent identifiers to the second server, the agent identifiers identifying one or more agents that are available at real time to discuss with the first user concerning the content item, including a geographic location of each of the identified agents to be presented to the first user by the second server, wherein the one or more agents of the list are associated with an owner of the content item;
  receiving at the first server a second request from a first user device of the first user, the second request including an agent identifier identifying a first agent selected by the first user from the list and contact information of the first user; and
  in response to the second request, transmitting a first message to a first agent device of the first agent, the first message including the content identifier identifying the content item and the contact information of the first user, wherein the first agent is to establish a live communication session with the first user using the contact information of the first user for discussing the content item.

2. The method of claim 1, wherein the client database comprises a plurality of entries, each corresponding to one of the plurality of clients associated with the media presentations presented by the second server, and wherein each entry contains one or more agent identifiers identifying one or more agents in one of one or more groups, each group being associated with one of the plurality of media presentations presented by the second server.

3. The method of claim 2, wherein groups of agents are assigned to different media presentations by the owners of the media presentations via a user interface maintained by the first server and stored in the client database, prior to receiving the first request.

4. The method of claim 2, wherein identifying from a client database one or more agents that are associated with the content item comprises:
  extracting the content identifier from the first request, wherein the content identifier includes a resource link presented with the content item at the second server, wherein the resource link when activated causes the first request to be transmitted from the second server to the first server;
  performing a first lookup operation in the client database based on the content identifier to locate a first entry having a first field matching the content identifier; and
  retrieving the agent identifiers from a second field of the first entry, the agent identifiers identifying one or more agents that are associated with a content item identified by the first field.

5. The method of claim 2, wherein determining a status of each of the identified agents comprises:
  for each of the agent identifiers, iteratively performing a second lookup operation in an agent database, including
    locating a second entry having a third field that matches the agent identifier; and
    determining in a fourth field of the second entry a status of an agent identified by the agent identifier, including whether the agent is available to conduct a live communication session with the first user, wherein the status is one of available status and unavailable status.

6. The method of claim 5, further comprising:
  receiving a second message from the first agent device of the first agent in response to the first message, indicating that the first agent agrees to contact the first user; and
  in response to the second message, automatically setting the status of the first agent to the unavailable status in an entry of the agent database corresponding to the first agent.

7. The method of claim 6, further comprising:
  receiving a first signal indicating the first agent is traveling to a premises of the first user;
  in response to the first signal, dynamically configuring a geo-fence representing a predetermined geographical proximity with respect to the geographical location of the first user;
  periodically tracking a geographical location of the first agent device of the first agent;
  receiving a second signal indicating that the first agent device is within the geo-fence;
  in response to the second signal, transmitting identifying information of the first agent to the first user device of the first user, indicating that the first agent is about arriving at the premises.

8. The method of claim 5, further comprising:
  in response to the second request, determining from the agent database whether the first agent is still available at the point in time of receiving the second request; and
  in response to determining that the first agent is unavailable, transmitting the first message to a second agent device of a second agent to allow the second agent to establish the live communication session with the first user, wherein the second agent has been configured as a default agent if none of the agents in the list is available.

9. The method of claim 5, further comprising:
  in response to the second request, determining from the agent database whether the first agent is still available at the point in time of receiving the second request;
  in response to determining that the first agent is unavailable, transmitting the first message to a third agent, including information identifying remaining agents in the list that are available based on their statuses from the agent database and geographic locations of the remaining agents, to allow the third agent to select one of the remaining agents; and
  in response to a third message received from the third agent selecting a fourth agent from the remaining agents, transmitting the first message to a fourth agent device of the fourth agent to allow the fourth agent to contact the first user.

10. The method of claim 5, further comprising:
receiving a third message from the second agent device of the second agent in response to the first message, indicating that the second agent has denied to contact the first user;
in response to the third message, transmitting the first message to a third agent device of a third agent to allow the third agent to contact the first user, wherein the third agent has been configured as a default agent if none of the agents in the list is available; and
automatically setting a status of the second agent to unavailable in an entry of the agent database corresponding to the second agent.

11. The method of claim 1, wherein the first request further comprises a first geographic location of the first user, and wherein the agent identifiers transmitted to the second server are selected based on geographic locations of the agents identified by the agent identifiers in view of the first geographic location of the first user.

12. The method of claim 11, wherein transmitting a list of one or more agent identifiers to the second server comprises:
for each of the agent identifiers, obtaining via a location service a longitude and a latitude of a mobile device of an agent identified by the agent identifier; and
transmitting the longitude and a latitude of the mobile device to the second server to be presented as a part of a map with respect to the first geographic location of the first user.

13. A non-transitory machine-readable medium having instructions stored therein, which when executed by a processor, cause the processor to perform operations for routing messages amongst multiple parties associated with a media presentation, the operations comprising:
receiving, at a first server from a second server over a network, a first request of a first user for communicating with an agent concerning a content item of a media presentation presented to the first user, wherein the first request includes a content identifier identifying the content item presented by the second server;
in response to the first request, identifying from a client database one or more agents that are associated with the content identifier, the client database storing content identifiers identifying a plurality of media presentations, wherein the media presentations are owned by a plurality of media presentation owners as clients to the first server;
determining a status of each of the identified agents from an agent database, including determining whether each of the identified agents is available to communicate with the first user to discuss the content item at a point in time, wherein the agent database stores agent information of a plurality of agents;
transmitting a list of one or more agent identifiers to the second server, the agent identifiers identifying one or more agents that are available at real time to discuss with the first user concerning the content item, including a geographic location of each of the identified agents to be presented to the first user by the second server, wherein the one or more agents of the list are associated with an owner of the content item;
receiving at the first server a second request from a first user device of the first user, the second request including an agent identifier identifying a first agent selected by the first user from the list and contact information of the first user; and
in response to the second request, transmitting a first message to a first agent device of the first agent, the first message including the content identifier identifying the content item and the contact information of the first user, wherein the first agent is to establish a live communication session with the first user using the contact information of the first user for discussing the content item.

14. The non-transitory machine-readable medium of claim 13, wherein the client database comprises a plurality of entries, each corresponding to one of the plurality of clients associated with the media presentations presented by the second server, and wherein each entry contains one or more agent identifiers identifying one or more agents in one of one or more groups, each group being associated with one of the plurality of media presentations presented by the second server.

15. The non-transitory machine-readable medium of claim 14, wherein groups of agents are assigned to different media presentations by the owners of the media presentations via a user interface maintained by the first server and stored in the client database, prior to receiving the first request.

16. The non-transitory machine-readable medium of claim 14, wherein identifying from a client database one or more agents that are associated with the content item comprises:
extracting the content identifier from the first request, wherein the content identifier includes a resource link presented with the content item at the second server, wherein the resource link when activated causes the first request to be transmitted from the second server to the first server;
performing a first lookup operation in the client database based on the content identifier to locate a first entry having a first field matching the content identifier; and
retrieving the agent identifiers from a second field of the first entry, the agent identifiers identifying one or more agents that are associated with a content item identified by the first field.

17. The non-transitory machine-readable medium of claim 14, wherein determining a status of each of the identified agents comprises:
for each of the agent identifiers, iteratively performing a second lookup operation in an agent database, including locating a second entry having a third field that matches the agent identifier; and
determining in a fourth field of the second entry a status of an agent identified by the agent identifier, including whether the agent is available to conduct a live communication session with the first user, wherein the status is one of available status and unavailable status.

18. The non-transitory machine-readable medium of claim 17, wherein the operations further comprise:
receiving a second message from the first agent device of the first agent in response to the first message, indicating that the first agent agrees to contact the first user; and
in response to the second message, automatically setting the status of the first agent to the unavailable status in an entry of the agent database corresponding to the first agent.

19. The non-transitory machine-readable medium of claim 8, wherein the operations further comprise:
receiving a first signal indicating the first agent is traveling to a premises of the first user;

in response to the first signal, dynamically configuring a geo-fence representing a predetermined geographical proximity with respect to the geographical location of the first user;

periodically tracking a geographical location of the first agent device of the first agent;

receiving a second signal indicating that the first agent device is within the geo-fence;

in response to the second signal, transmitting identifying information of the first agent to the first user device of the first user, indicating that the first agent is about arriving at the premises.

20. The non-transitory machine-readable medium of claim 17, wherein the operations further comprise:

in response to the second request, determining from the agent database whether the first agent is still available at the point in time of receiving the second request; and in response to determining that the first agent is unavailable, transmitting the first message to a second agent device of a second agent to allow the second agent to establish the live communication session with the first user, wherein the second agent has been configured as a default agent if none of the agents in the list is available.

21. The non-transitory machine-readable medium of claim 17, wherein the operations further comprise:

in response to the second request, determining from the agent database whether the first agent is still available at the point in time of receiving the second request;

in response to determining that the first agent is unavailable, transmitting the first message to a third agent, including information identifying remaining agents in the list that are available based on their statuses from the agent database and geographic locations of the remaining agents, to allow the third agent to select one of the remaining agents; and in response to a third message received from the third agent selecting a fourth agent from the remaining agents, transmitting the first message to a fourth agent device of the fourth agent to allow the fourth agent to contact the first user.

22. The non-transitory machine-readable medium of claim 17, wherein the operations further comprise:

receiving a third message from the second agent device of the second agent in response to the first message, indicating that the second agent has denied to contact the first user;

in response to the third message, transmitting the first message to a third agent device of a third agent to allow the third agent to contact the first user, wherein the third agent has been configured as a default agent if none of the agents in the list is available; and automatically setting a status of the second agent to unavailable in an entry of the agent database corresponding to the second agent.

23. The non-transitory machine-readable medium of claim 13, wherein the first request further comprises a first geographic location of the first user, and wherein the agent identifiers transmitted to the second server are selected based on geographic locations of the agents identified by the agent identifiers in view of the first geographic location of the first user.

24. The non-transitory machine-readable medium of claim 23, wherein transmitting a list of one or more agent identifiers to the second server comprises:

for each of the agent identifiers, obtaining via a location service a longitude and a latitude of a mobile device of an agent identified by the agent identifier; and transmitting the longitude and a latitude of the mobile device to the second server to be presented as a part of a map with respect to the first geographic location of the first user.

25. A system for routing messages amongst multiple parties associated with a media presentation, the system comprising:

a processor;

a memory coupled to processor;

a storage device to store a client database and an agent database, which are loaded in the memory by the processor;

an availability module coupled to the processor and the memory to receive from a second server over a network, a first request of a first user for communicating with an agent concerning a content item of a media presentation presented to the first user, wherein the first request includes a content identifier identifying the content item presented by the second server, in response to the first request, identify from the client database one or more agents that are associated with the content identifier, the client database storing content identifiers identifying a plurality of media presentations, wherein the media presentations are owned by a plurality of media presentation owners as clients to the first server, determine a status of each of the identified agents from the agent database, including determining whether each of the identified agents is available to communicate with the first user to discuss the content item at a point in time, wherein the agent database stores agent information of a plurality of agents, and transmit a list of one or more agent identifiers to the second server, the agent identifiers identifying one or more agents that are available at real time to discuss with the first user concerning the content item, including a geographic location of each of the identified agents to be presented to the first user by the second server, wherein the one or more agents of the list are associated with an owner of the content item; and a live connect module coupled to the processor and the memory to receive a second request from a first user device of the first user, the second request including an agent identifier identifying a first agent selected by the first user from the list and contact information of the first user, and in response to the second request, transmit a first message to a first agent device of the first agent, the first message including the content identifier identifying the content item and the contact information of the first user, wherein the first agent is to establish a live communication session with the first user using the contact information of the first user for discussing the content item.

26. The system of claim 25, wherein the client database comprises a plurality of entries, each corresponding to one of the plurality of clients associated with the media presentations presented by the second server, and wherein each entry contains one or more agent identifiers identifying one or more agents in one of one or more groups, each group being associated with one of the plurality of media presentations presented by the second server.

27. The system of claim 26, wherein groups of agents are assigned to different media presentations by the owners of the media presentations via a user interface maintained by the first server and stored in the client database, prior to receiving the first request.

* * * * *